US009396391B2

(12) United States Patent
Navulur

(10) Patent No.: US 9,396,391 B2
(45) Date of Patent: *Jul. 19, 2016

(54) AUTOMATED GEOSPATIAL IMAGE MOSAIC GENERATION WITH MULTIPLE ZOOM LEVEL SUPPORT

(71) Applicant: DigitalGlobe, Inc., Longmont, CO (US)

(72) Inventor: Kumar Navulur, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,307

(22) Filed: Jun. 17, 2014

(65) Prior Publication Data

US 2015/0363641 A1 Dec. 17, 2015

(51) Int. Cl.
| G06K 9/40 | (2006.01) |
| G06K 9/00 | (2006.01) |
| G06T 11/60 | (2006.01) |
| G06K 9/52 | (2006.01) |
| G06T 3/40 | (2006.01) |

(52) U.S. Cl.
CPC .............. *G06K 9/00476* (2013.01); *G06K 9/52* (2013.01); *G06T 3/4038* (2013.01); *G06T 11/60* (2013.01)

(58) Field of Classification Search
USPC ................................................. 382/274, 284
See application file for complete search history.

(56) References Cited

U.S. PATENT DOCUMENTS

| 9,042,674 B2 * | 5/2015 | Padwick ................. G06T 11/00 382/274 |
| 2008/0129752 A1 | 6/2008 | Riley et al. |
| 2010/0171759 A1 | 7/2010 | Nickolov et al. |
| 2011/0243438 A1 * | 10/2011 | Hoppe ................. G06T 3/4007 382/167 |
| 2013/0336540 A1 | 12/2013 | Zhang et al. |
| 2014/0064554 A1 | 3/2014 | Coulter et al. |

OTHER PUBLICATIONS

Mateos, et al, "Relative Radiometric Normalization of Multitemporal Images," A Direct Path to Intelligent Tools, In: International Journal of Artificial Intelligence and Interactive Multimedia, vol. 1, No. 3, pp. 54-59 2014.
International Search Report for International Application No. PCT/US2015/035627, dated Sep. 22, 2015.

* cited by examiner

*Primary Examiner* — John Strege
(74) *Attorney, Agent, or Firm* — Marsh Fischmann & Breyfogle LLP

(57) ABSTRACT

Generation of a plurality of orthomosaic image layers for a geographical area, wherein the layers comprise different spatial resolutions and are radiometrically normalized to facilitate improved radiometric consistency when zooming relative to the geographic area. In applications that facilitate zooming with respect to a geographic area imaged by the orthomosaic layers, radiometric normalization of the orthomosaic image layers may reduce radiometric discontinuities when zooming in, zooming out, and/or panning a displayed portion that is output to the user. The orthomosaic layers may be generated based on one or more orthomosaic image layer or may be developed independently using a source images. In any regard, the radiometric normalization may include generating a normalization function based on image metadata that is calculated and may be independent of the spatial resolution of the image.

7 Claims, 30 Drawing Sheets

AUTOMATED GEOSPATIAL IMAGE MOSAIC GENERATION WITH MULTIPLE ZOOM LEVEL SUPPORT

BACKGROUND

The use of geospatial imagery has continued to increase in recent years. As such, high quality geospatial imagery has become increasingly valuable. For example, a variety of different entities (e.g., individuals, governments, corporations, or others) may utilize geospatial imagery (e.g., satellite imagery). As may be appreciated, the use of such satellite imagery may vary widely such that geospatial images may be used for a variety of differing purposes.

In any regard, due to the nature of image acquisition, a number of geospatial images may be pieced together to form an orthomosaic of a collection of geospatial images that cover a larger geographic area than may be feasibly covered with a single acquired image. In this regard, it may be appreciated that the images that form such a mosaic may be acquired at different times or may be acquired using different collection techniques or parameters. In this regard, there may be differences in the images to be used to generate a mosaic (e.g., radiometric distortion). As such, when generating a mosaic, differences in the images may become apparent to users (e.g., discontinuous color changes or the like).

Furthermore, when viewing such orthomosaic images, it is often desirable to provide a mechanism that allows for zooming in and out with respect to a geographic area covered by the mosaic. Accordingly, a plurality of zoom levels may be made available for viewing the geographic area. As may be appreciated, images corresponding to higher zoom levels (e.g., those levels where the view is from a higher elevation above the Earth's surface) may be of lower resolution that lower zoom levels (e.g., those levels where the view is from a lower elevation above the Earth's surface). This may be because the detail of the higher zoom levels may not be capable of being output with sufficient resolution to match the available resolution of the image (e.g., due to limitations in display or printing technology or even due to limitations in the human eye to perceive the details). As such, for efficiencies in data management or the like, lower resolution images (e.g., having potentially a much smaller size in memory) may be used for higher zoom levels. As may be appreciated, the images used for the plurality of zoom levels may have radiometric discontinuities as well. For example, when zooming in or out relative to an output of geospatial imagery including multiple orthomosaic image layers having different spatial resolutions, aspects of the image may not remain consistent between zoom levels when using a plurality of image layers, which may become apparent to users.

SUMMARY

In view of the foregoing, the present disclosure is generally directed to radiometric normalization of a plurality of mosaic image layers having different spatial resolutions for use when zooming, panning, or otherwise manipulating the image relative to a geographic area covered by the mosaic image layers such that portions of the image at different resolutions are to be displayed to a user. As may be appreciated, when zooming or panning relative to a geographic area covered by an mosaic image, it may be desirable to present images from layers having different spatial resolutions. As such, generation of these different layers may result in radiometric inconsistencies that are perceivable by a user when zooming or panning. Accordingly, described herein are techniques for radiometric normalization of such mosaic image layers.

Furthermore, the present disclosure describes techniques for generation of a plurality of mosaic image layers (e.g. an mosaic image layer set). This may include generation of a high spatial resolution mosaic image that is in turn downsampled to generate the remaining layers of the set. Alternatively or additionally, a different set of source images (e.g., separately acquired source images than those used for the high resolution image layer or downsampled versions of the source images used for the high resolution image layer) may be used to generate other layers in the mosaic image layer set. Regardless of the manner in which the layers are generated, radiometric normalization processing performed relative thereto may reduce radiometric inconsistencies between the layers. As such, when viewed by a user, the mosaic image layers may be more consistent and aesthetically pleasing to the user.

A first aspect includes a method for radiometric normalization of a plurality of mosaic image layers having different spatial resolutions. The method includes first calculating first image metadata for at least a first image portion of a first mosaic image layer having a first spatial resolution. The first image metadata is independent of the first spatial resolution. The method further includes second calculating second image metadata for at least a second image portion of a second mosaic image layer having a second spatial resolution different than the first spatial resolution. The second image data is independent of the second spatial resolution. The method further includes determining a normalization function based on a comparison of the first image metadata for the first image layer and the second image metadata for the second image layer and applying the normalization function to the second image layer to normalize at least a portion of the second image layer relative to the first image layer.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in an embodiment, the first image portion may include at least one geospatial image having a geographical extent and the second image portion may include at least one geospatial image that is geographically concurrent with the geographical extent of the first image. In an embodiment, the first image portion may include at least one geospatial source image, and the second image portion may include a downsampled version of the at least one geospatial source image. Accordingly, the method may also include downsampling the first mosaic image layer to generate the second mosaic image layer prior to the calculating.

In an embodiment, the method may include displaying at least a portion of the first mosaic image layer to a user when a first zoom level is selected by the user and displaying at least a portion of the second mosaic image layer to the user when a second zoom level is selected by the user. The zoom levels may be adjacent in a corresponding predetermined plurality of zoom levels. The first mosaic image layer may correspond to a lowest level zoom level of the predetermined plurality of zoom levels. In this regard, the method may further include generating a plurality of mosaic image layers by downsampling the first mosaic image layer such that each of the plurality of mosaic image layers each corresponds to at least one of the predetermined plurality of zoom levels.

In an embodiment, each of the plurality of mosaic image layers is downsampled to a different spatial resolution. In any regard, the second spatial resolution may be less than the first spatial resolution.

The first image metadata may include histogram data corresponding to the first image portion and the second image metadata may include histogram data corresponding to the second image portion. For example, the first calculating may include calculation of a first cumulative distribution function (CDF) for the first image portion and the second calculating may include calculation of a second CDF for the second image portion. In this regard, the determining may include comparing the first CDF for the first image portion to the second CDF for the second image portion to determine the normalization function. Further still, in an embodiment, the normalization function may be tabulated into a lookup table.

In an embodiment, the method may further include identifying at least one anomalous pixel and masking at least one of the first image portion or the second image portion prior to the calculating to remove the at least one anomalous pixel from the calculating. The at least one anomalous pixel removed from the calculating may be a pixel having a saturated pixel value (e.g., the saturated pixel value removed from the calculating by way of the masking may be identified as a pixel corresponding to water or a cloud). In an embodiment, the method may also include performing spectral flattening on at least one of the first image portion or the second image portion prior to the calculating. For instance, the spectral flattening may include calculating an average intensity for a plurality of spectral channels of the image.

A second aspect includes a system for radiometric normalization of mosaic image layers having different spatial resolutions. The system includes a source image database including a plurality of mosaic image layers having different spatial resolutions. The system also includes a radiometric normalization module operable to normalize a first mosaic image layer from the source image database relative to a second mosaic image layer based on a normalization function that is at least partially based on a comparison of image metadata from the first mosaic image layer and the second mosaic image layer.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In an embodiment, the system may also include a downsampling module for downsampling source images for use in generation of at least one mosaic image layer. For example, the first mosaic image layer may be downsampled with the downsampling module to produce the second mosaic image layer.

The image metadata may be independent of the spatial resolution of the image layer. For example, the image metadata comprises histogram data (e.g., a cumulative distribution function (CDF) for the first image layer and the second image layer). Accordingly, the radiometric normalization module may be operable to compare the CDF for the first image layer to the CDF for the second image layer to determine the normalization function. Furthermore, the radiometric normalization module may be operable to tabulate a lookup table based on the normalization function.

A third aspect includes a method for creation of a plurality of mosaic layers of an mosaic image for different zoom levels of a geographic area covered by the mosaic image. The method includes first generating a first mosaic image layer having a first spatial resolution. The first mosaic image layer comprises a plurality of source geospatial images. The method also includes second generating at least a second mosaic image layer having a second spatial resolution that is of a lower spatial resolution than the first spatial resolution. The second mosaic image layer comprises downsampled versions of the plurality of source geospatial images used to generate the first mosaic image layer.

A number of feature refinements and additional features are applicable to the third aspect. These feature refinements and additional features may be used individually or in any combination. As such, each of the following features that will be discussed may be, but are not required to be, used with any other feature or combination of features of the third aspect.

In an embodiment, the first generating may include at least one of automatic source selection, automatic cutline generation, or radiometric normalization of the plurality of source geospatial images. In an embodiment, the second generating may include downsampling the first mosaic image layer after generation of the first mosaic image layer. Alternatively, the second generating may include downsampling the source geospatial images to generate a corresponding plurality of low spatial resolution versions of the source geospatial images. In this regard, the second generating may include at least one of automatic source selection, automatic cutline generation, or radiometric normalization performed with respect to the plurality of low spatial resolution versions of the source geospatial images.

In any regard, the method may include first calculating first image metadata for at least a portion of the first mosaic image layer, wherein the first image metadata is independent of the spatial resolution of the first mosaic image layer. The method may further include second calculating second image metadata for at least a portion of the second mosaic image layer, wherein the second image metadata is independent of the spatial resolution of the second mosaic image layer. The method may further include determining a normalization function based on a comparison of the first image metadata for the first mosaic image layer and the second image metadata for the second mosaic image layer and applying the normalization function to at least a portion of the second image to normalize the second mosaic image layer relative to the first mosaic image layer.

DETAILED DESCRIPTION

Figure 1:
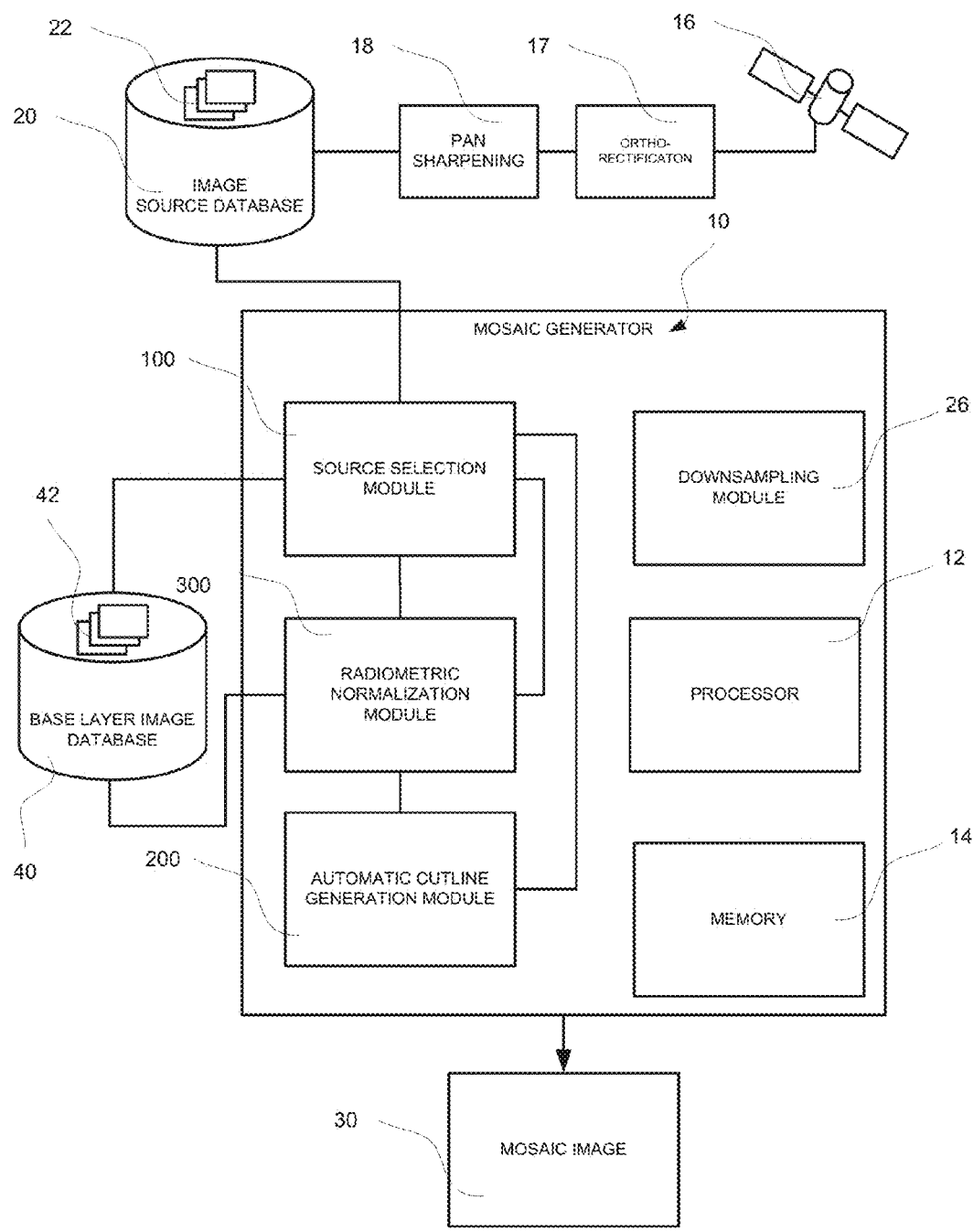
FIG. 1 is a block diagram of an embodiment of a mosaic generator.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The present disclosure generally relates to functionality that may be utilized in connection with geospatial images (e.g., mosaic images or orthomosaic images that may be generated from a plurality of geospatial images). For example, in an embodiment, the geospatial source images for a mosaic described herein may be satellite images acquired using low earth orbit satellites such as QuickBird, WorldView-1, WorldView-2, WorldView-3, IKONOS, GeoEye-1, or GeoEye-2 which are currently operated or proposed for operation by DigitalGlobe, Inc. of Longmont, Colo. However, other geospatial imagery may also be used to generate a mosaic as described herein such as for example, other geospatial imagery obtained from satellites other than those previously listed, high altitude aerial photograph, or other appropriate remotely sensed imagery. The images to be selected for inclusion in a mosaic may comprise raw image data or pre-processed geospatial images (e.g., that have undergone orthorectification, pan-sharpening, or other processes known in the art that are commonly applied to geospatial imagery).

In any regard, according to the present disclosure, a geospatial mosaic comprising a plurality of geospatial images may be generated such that, for example, image source selection occurs automatically (i.e., without requiring a human operators to select images for use in the mosaic). In addition, the present disclosure describes automatic cutline generation for merging a plurality of images such that a cutline defining a boundary between the plurality of merged images may be automatically generated to minimize the radiometric differences at image interfaces in a merged image. In this regard, outlines between images in the mosaic may be less perceivable to human observers of the mosaic images. Furthermore, a technique for radiometric normalization of images is described that may reduce the radiometric differences between different ones of the images comprising the mosaic to achieve a more radiometrically uniform mosaic. Additionally, radiometric normalization techniques may be presented that facilitate radiometric normalization of multiple mosaic layers that may have different spatial resolutions. As such, a plurality of zoom levels may be generated that are radiometrically normalized to provide consistent radiometric characteristics when zooming in and out with respect to an orthomosaic represented by the plurality of zoom levels.

As may be appreciated, for any or all aspects described herein specific processing techniques may also be provided that allow the generation of the mosaic to occur in a relatively short time, thus effectively utilizing computational resources. In turn, specific embodiments of automatic source image selection, automatic cutline generation, and radiometric normalization techniques are described in detail herein in relation to the automatic generation of one or more geospatial mosaic images.

Accordingly, with respect to FIG. 1, a mosaic generator 10 is shown. The mosaic generator 10 may include a source selection module 100, an automatic cutline generation module 200, and a radiometric normalization module 300. As may be appreciated, the mosaic generator 10, source selection module 100, automatic cutline generation module 200, and radiometric normalization module 300 may comprise hardware, software, or a combination thereof. For example, the modules 100-300 may each comprise non-transitory computer readable data comprising computer readable program code stored in a memory 14 of the mosaic generator 10. The program code may include instructions for execution of a processor 12 operable to access and execute the code. As such, upon execution of the processor 12 according to the computer readable program code, any or all of the functionality described below with respect to corresponding ones of the modules 100-300 may be provided. Furthermore, while modules 100-300 are shown in a particular order in FIG. 1, it may be appreciated that the modules may be executed in any appropriate order. Furthermore, in some embodiments, only a portion of the modules may be executed. As such, it will be appreciated that the modules may be executed independently or, as will be described herein, in conjunction to produce a orthomosaic.

While FIG. 1 shows a single processor 12 and memory 14, it may be appreciated that the mosaic generator 10 may include one or more processors 12 and/or memories 14. For example, a plurality of processors 12 may execute respective ones or combinations of the source selection module 100, automatic cutline generation module 200, and radiometric normalization module 300. Furthermore, it may be appreciated that the mosaic generator 10 may be a distributed system such that various ones of the modules 100-300 may be executed remotely by networked processors 12 and/or memories 14. Furthermore, different processes of the modules 100-300 may be executed on different processing units to capitalize on various performance enhancements of the processing units. For example, some processes may be executed on a central processing unit (CPU) while others may be executed by a graphics processing unit (GPU) as will be explained in greater detail below.

The source selection module 100 may be in operative communication with an image source database 20. As mentioned above, the image source database 20 may include raw geospatial images (e.g., corresponding to the direct output of sensor arrays on a satellite 16) or geospatial images that have undergone some amount of pre-processing. For instance, the pre-processing may include orthorectification 17 processes commonly practiced the art. Additionally or alternatively, the pre-processing may include pan-Sharpening 18 as described in U.S. patent application Ser. No. 13/452,741 titled "PAN SHARPENING DIGITAL IMAGERY" filed on Apr. 20, 2012, which is incorporated by reference in its entirety. Other pre-processing techniques may be performed with respect to the geospatial images stored in the image source database 20 without limitation.

In this regard, the image source database may include one or more geospatial source images 22. As may be appreciated, the geospatial source images 22 may comprise relatively high spatial resolution images. The spatial resolution of images is sometimes referred to herein with a distance measure. This distance measure refers to a corresponding distance on Earth each pixel in the image represents. For example, each pixel in a 15 m image represents 15 m of width and length on Earth. As such, the geospatial images 22 may include image resolutions of, for example, 0.25 m, 0.5 m, 1 m, 5 m, 10 m, or even 15 m resolutions.

Further still, the geospatial images 22 may include multiple versions of a single image 22 at different resolutions. For purposes of clarity herein, high resolution and low resolution versions of an image may be discussed. In this regard, a high resolution version of an image described herein may include a reference numeral (e.g., geospatial image 22). A low resolution version of the same image may be described with a single prime designation (e.g., geospatial image 22'). If further resolutions of the same image are referenced, multiple prime (e.g., double prime, triple prime, etc.) reference numerals may be used where the larger the prime designation, the lower the resolution of the image. In this regard, the mosaic generator 10 may include a downsampling module 26 that may be operable to downsample an image from a higher resolution to a lower resolution. Any appropriate downsampling technique may be employed to generate one or more different lower resolution versions of a given image. In this regard, any of the modules 100-300 may be in operative communication with a downsampling module 26 to obtain downsampled versions of images as disclosed below. In various embodiments, at least one of the modules 100-300 may include separate downsampling capability such that a separately executed downsampling module 26 is not required.

In any regard, as shown in FIG. 1, the source selection module 100 may be in operative communication with the image source database 20. As will be described in greater detail below, the image source selection module 100 may be operative to analyze a plurality of geospatial images 22 from the image source database 20 to choose selected images 22 or portions of images 22 for inclusion in a mosaic image 30.

The image source selection module 100 may also be operable to access a base layer image database 40. The base layer image database 40 may include one or more base layer images 42. As will be discussed in greater detail below, the image source selection module 100 may select the images 22 from the image source database 20 at least partially based on a comparison to a corresponding base layer image 42. In this regard, the base layer image(s) 42 may also be geospatial images (e.g., at lower resolutions than the source images 22) that have a known geospatial reference. In this regard, the source images 22 may be correlated to geographically corresponding base layer image(s) 42 such that comparisons are made on geographically concurrent portions of the geospatial source images 22 and base layer image(s) 42.

Upon selection of the images 22 for inclusion in the orthomosaic 30, it may be appreciated that certain portions of at least some of the images 22 may benefit from merging with others of the selected images 22. That is, two selected images 22 may have some region of overlap in the resulting mosaic. In this regard, the source selection module 100 may output at least some of the selected images 22 to the automatic cutline generation module 200. As will be described in greater detail below, the automatic cutline generation module 200 may determine appropriate cutlines for merging overlapping selected images 22 to create a merged image.

Additionally, the selected images 22 (e.g., including merged images that are produced by the automatic cutline generator 200) may be output to the radiometric normalization module 300. In this regard, the radiometric normalization module 300 may be operable to perform a radiometric normalization technique on one or more of the selected images 22. In this regard, the radiometric normalization module 300 may also be in operative communication with the base layer image database 40. As will be described in greater detail below, the radiometric normalization module 300 may be operable to perform radiometric normalization at least partially based on a comparison of a selected image 22 to a corresponding base layer image 42 to normalize radiometric properties (e.g., color) of the selected images 22 relative to the base layer image 42. When referencing "color" in the context of radiometric parameters for an image, it may be appreciated that "color" may correspond with one or more intensity values (e.g., a brightness) for each of a plurality of different spectral bands. As such, a "color" image may actually comprise at least three intensity values for each of a red, blue, and green spectral band. Furthermore, in a panchromatic image (i.e., a black and white image), the intensity value may correspond to gray values between black and white. As such, when comparing "color," individual or collective comparison of intensities for one or more spectral bands may be considered. As such, the selected images 22 may be processed by the radiometric normalization module 300 to achieve a more uniform color (e.g., intensities or brightness for one or more spectral bands) for the mosaic 30. In turn, a mosaic 30 may be automatically and/or autonomously generated by the mosaic generator 10 that may be of very high resolution (e.g., a corresponding resolution to the source images 22) that is relatively uniform in color to produce a visually consistent mosaic 30.

Figure 2:
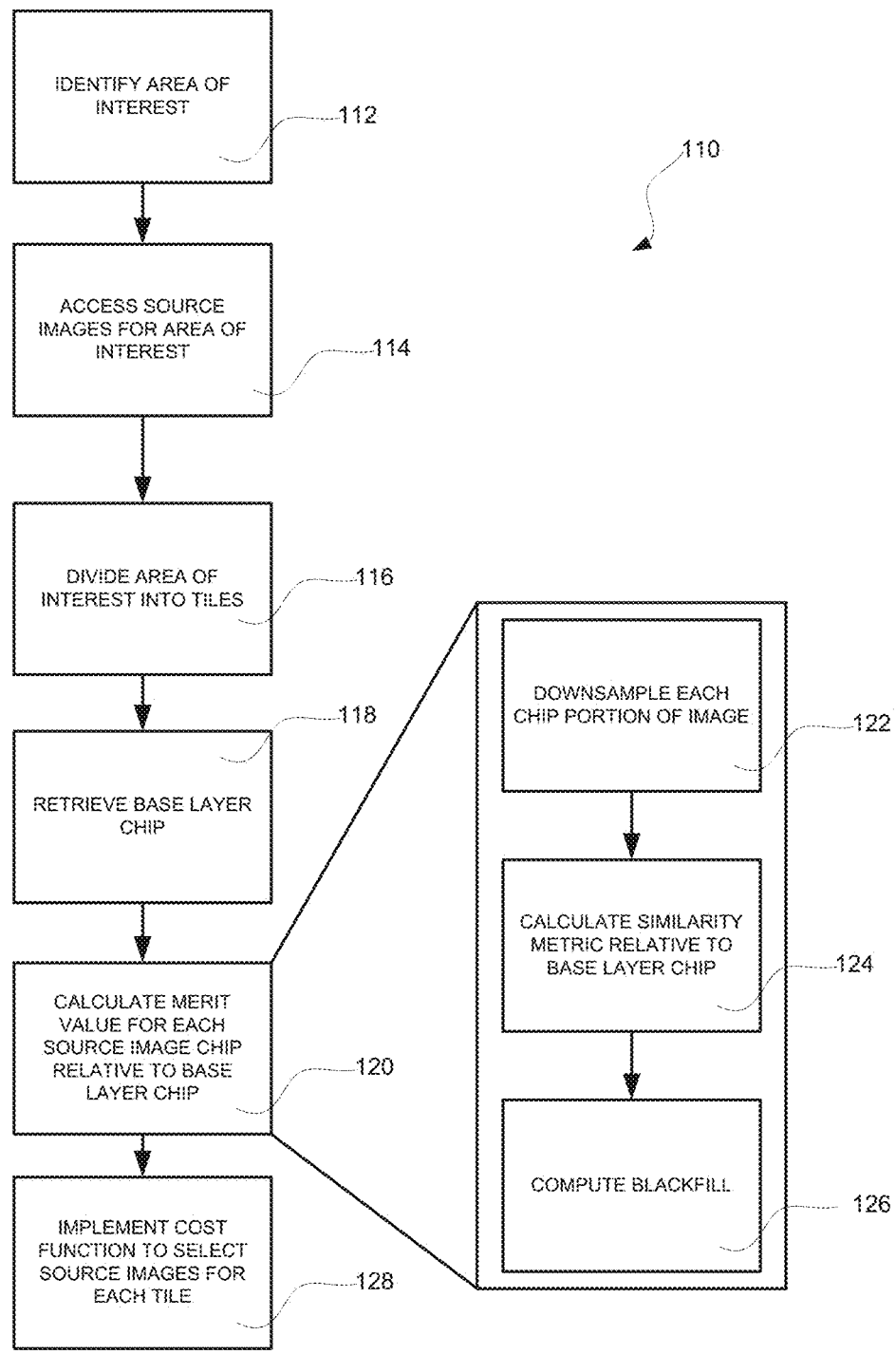
FIG. 2 is a flow chart depicting an embodiment of an automatic source selection process.
Figure 3:
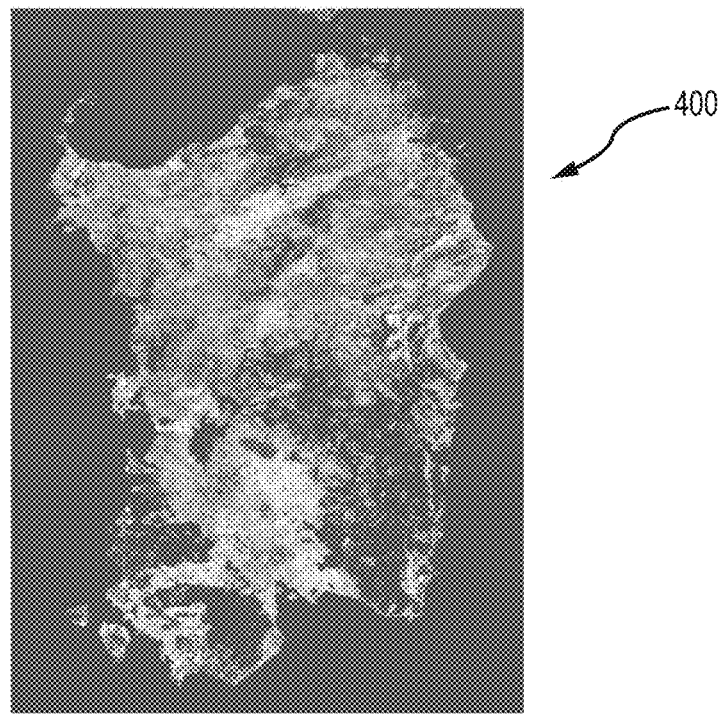
FIG. 3 depicts an example of an area of interest for which a mosaic is to be generated according to an embodiment described herein.

With further reference to FIG. 2, an embodiment of an automatic source selection process 110 is depicted. In this regard, the source selection module 100 may be operable to perform an automatic source selection process 110 represented as a flowchart in FIG. 2. The source selection process 110 will be described with further reference to FIGS. 3-9.

Generally, when selecting source images 22 for inclusion in a mosaic 30, the selection is generally governed by a relatively simple principle that as many pixels should be used from a given geospatial image 22 as possible to avoid creating a mosaic 30 with many pixels from many source images 22. As described above, it has traditionally been difficult to achieve radiometric consistency in a mosaic 30 composed of many source images 22. Accordingly, a human operator selecting images 22 has generally attempted to select as few source images 22 as possible that cover an area of interest to maximize the quality of the mosaic 30.

General considerations for minimizing radiometric distortions between selected source images 22 may include choosing images 22 from the same season, choosing images 22 that were collected within a defined range of off nadir satellite angles and solar elevation angles, choosing images 22 which are not hazy, choosing images 22 that have the same "leaf on/leaf off" status, and/or choosing images 22 which are generally not snow-covered. Some of the foregoing considerations may be relatively easy to automate such as, for example choosing images 22 from the same season and choosing images 22 within a defined range of off nadir angles and solar elevation angles, as these values may be quantifiable in metadata associated with the image 22 when the images 22 are collected. For example, upon collection of the image 22, satellite parameters, time, and/or other appropriate parameters may be attributed to the metadata of an image 22. Thus, this metadata may be filtered to provide consistency in the images 22 with respect to the foregoing attributes.

In an embodiment, the source selection module 100 may be operable to pre-filter source images 22 prior to performing the source selection process 110 detailed below. In this regard, the pre-filtering may employ metadata regarding the images 22 such that only images 22 with certain appropriate metadata are subject to the automatic source selection process 110. For example, the pre-filtering may include filtering images 22 based on the date of acquisition, satellite acquisition parameters (e.g., off nadir satellite angles, satellite attitudes, solar elevation angles, etc.). As such, the pre-filtering may eliminate some images 22 from the processing 110 such that computational overhead may be reduced and the time of execution of the process 110 may be further reduced. In short, metadata filtering may eliminate one or more source images 22 from consideration prior to the source selection process being executed below based on metadata of the images 22.

However, choosing images 22 that are radiometrically consistent images for properties that are not quantifiable with metadata (e.g., choosing images 22 that are not hazy, choosing images 22 with the same "leaf on/leaf off" status, and choosing images 22 which are not snow-covered) may be significantly more difficult due to the lack of metadata regarding such properties. It should be noted that while "leaf on/leaf off" status and/or snow cover may be loosely correlated with date (i.e., leaf on/leaf off and snow cover status may be assumed based on time of year), the variability of these metrics may be too loosely associated with date for metadata regarding date to provide accurate determinations of these values. Accordingly, as described above, image selection to achieve radiometric consistency has generally been left to subjective analysis by a human operator. As may be appreciated, this process may be time-consuming and expensive.

Accordingly, the automated source selection process 110 described below may provide an automated, autonomous approach to selection of images 22 that may account radiometric properties of images to minimize radiometric distortions even if no metadata is provided with the image and without requiring a human operator to review the source images 22.

The source selection process 110 may include identifying 112 an area of interest to be covered by the mosaic 30. With respect to FIG. 3, one such identified area of interest 400 is shown. The area of interest 400 of FIG. 3 generally corresponds to the island of Sardinia, which may be used as an example area of interest 400 throughout this disclosure. In this regard, it may be appreciated the area of interest 400 may be relatively large. For example, the area of interest 400 may cover geographic areas corresponding to large landmasses, entire countries, or even entire continents. However, it may be appreciated that the source selection process 110 may also be performed on much smaller areas of interest 400.

Figure 4:
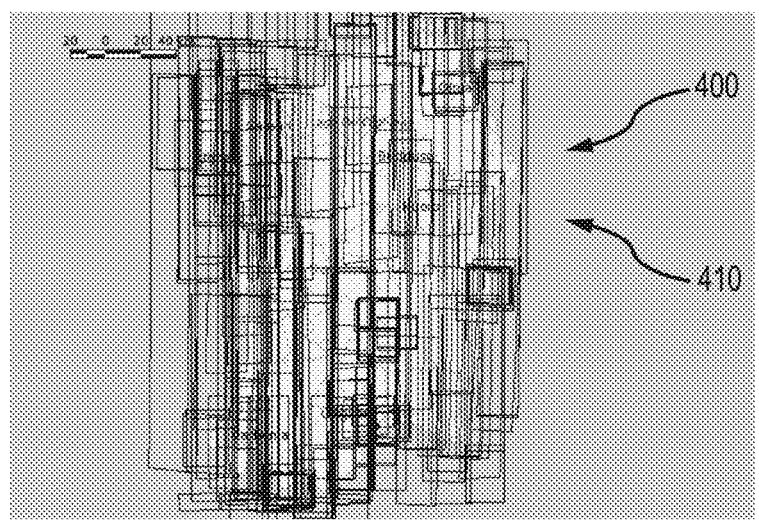
FIG. 4 depicts the area of interest of FIG. 3 with indications of available source images corresponding to the area of interest that are selectable for inclusion in a mosaic for the area of interest.

The source selection process 110 may also include accessing 114 source images 22 for the area of interest 400. With further reference to FIG. 4, the area of interest 400 is depicted along with a plurality of polygons 410 that each represent one source image 22 available for selection for inclusion in the mosaic 30. As may be appreciated in FIG. 4, the number of source images 22 available for the area of interest 400 may be quite large (e.g., totaling in the hundreds or thousands of images 22). This may provide context with respect to the amount of time it may require for a human operator to review each of the source images 22.

Furthermore, it may be appreciated that the source images 22 may vary greatly with respect to the relative size of the source images 22. For example, in one embodiment, the source images 22 may each have a relatively common width as the sensor arrays used to collect the source images 22 may be oriented latitudinally such that as the sensor sweeps the width of the image 22 corresponds to the sensor width. In contrast, the longitudinal extent of the image 22 may be associated with the duration of collection. As such, the longitudinal extent of the source images 22 may vary greatly with some source images 22 having relatively short longitudinal dimensions while others may have very large longitudinal dimensions corresponding with very large source images 22. However, it may be appreciated that a variety of acquisition techniques may be used to acquire source images 22 such that the foregoing is not intended to be limiting. In turn, regardless of the acquisition technique, it may be appreciated that the size of the source images may vary.

Figure 5:
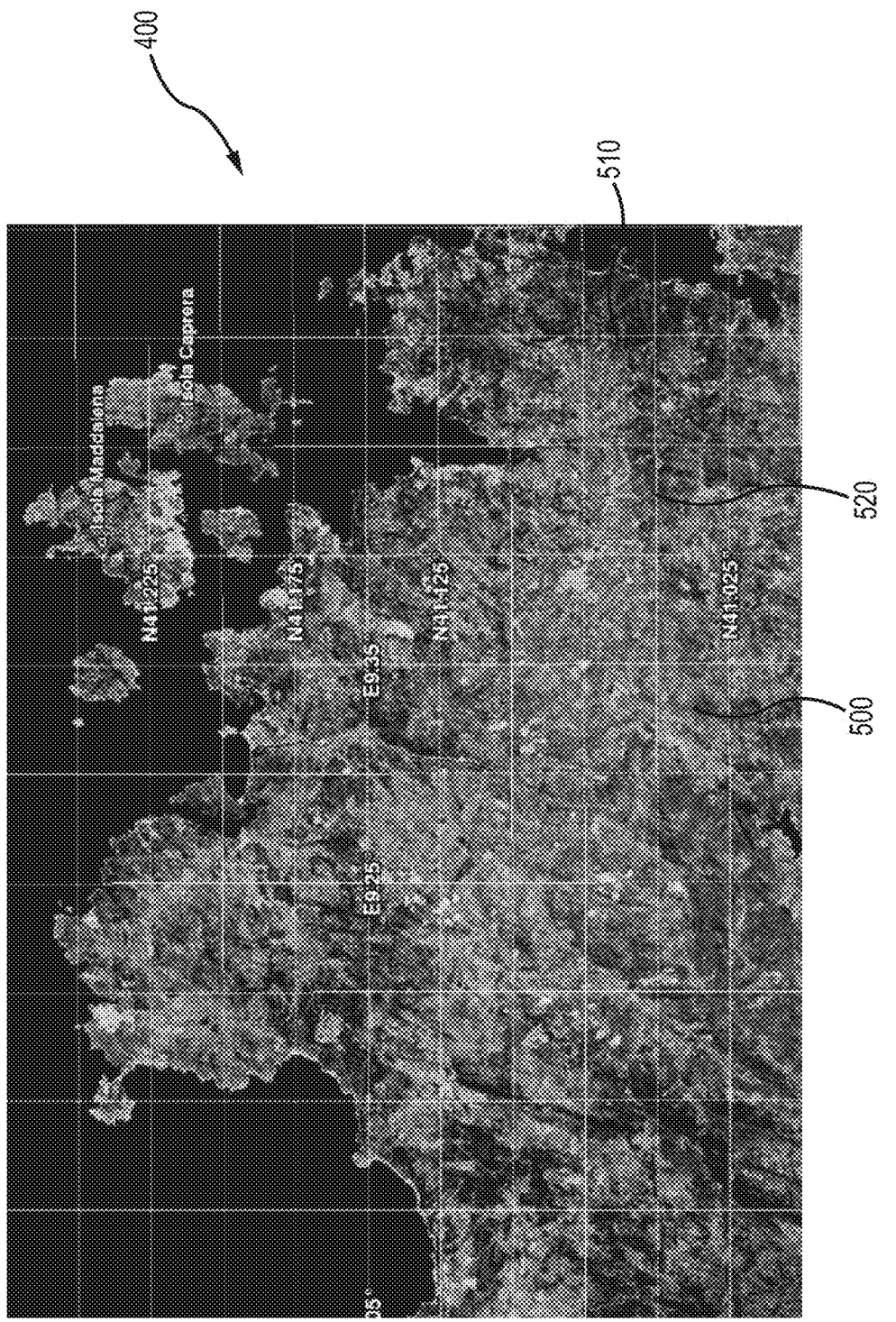
FIG. 5 depicts an embodiment of a portion of the area of interest of FIG. 3 that has been divided into a plurality of polygonal tiles according to an embodiment of an automatic source selection process.

Accordingly, the source selection process 110 may also include dividing 116 the area of interest 400 into a plurality of polygonal subsections or "tiles." With further reference to FIG. 5, a portion of the area of interest 400 is shown as divided into a plurality of tiles 500. In this regard, the tiles 500 may be defined by a grid comprising vertically extending gridlines 510 and horizontally extending gridlines 520 to define polygonal tiles 500. In an embodiment, the polygonal tiles 500 may be regular polygons extending with respect to the entire area of interest 400. In this regard, the gridlines 510 and 520 may be provided at any appropriate increment throughout the area of interest 400. However, as may be appreciated further below, the area of interest 400 may be divided into shapes such as, for example, irregular polygonal shapes, varying sized polygonal shapes, or free-form areas (e.g., defined by a human user, geographical landmarks, etc.)

Figure 6:
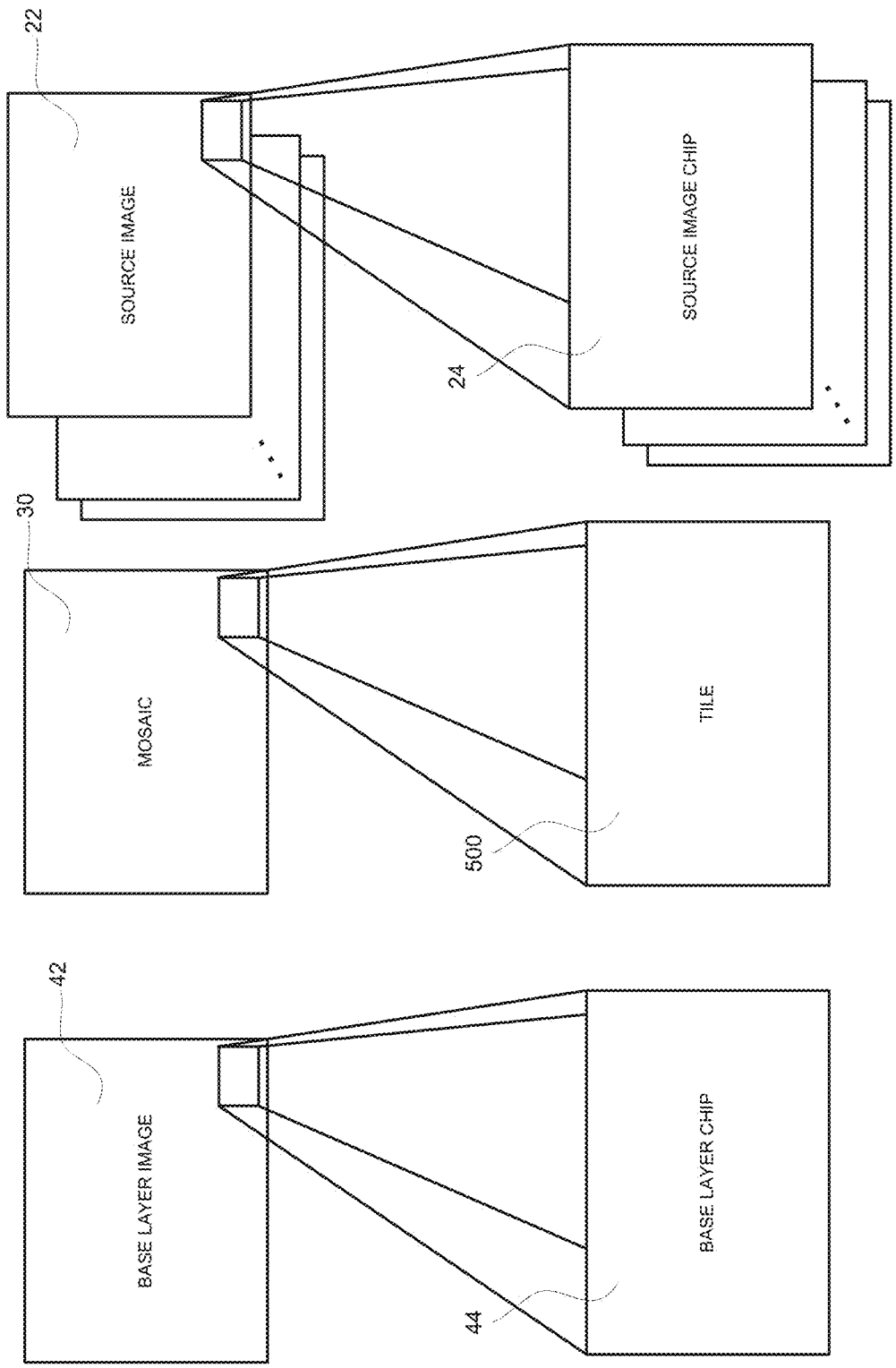
FIG. 6 is a block diagram illustrating an embodiment of a relationship between a base layer image, a base layer chip, and a tile; a relationship between a source image, a source image chip, and the tile; and a relationship between a mosaic and the tile.
Figure 7:
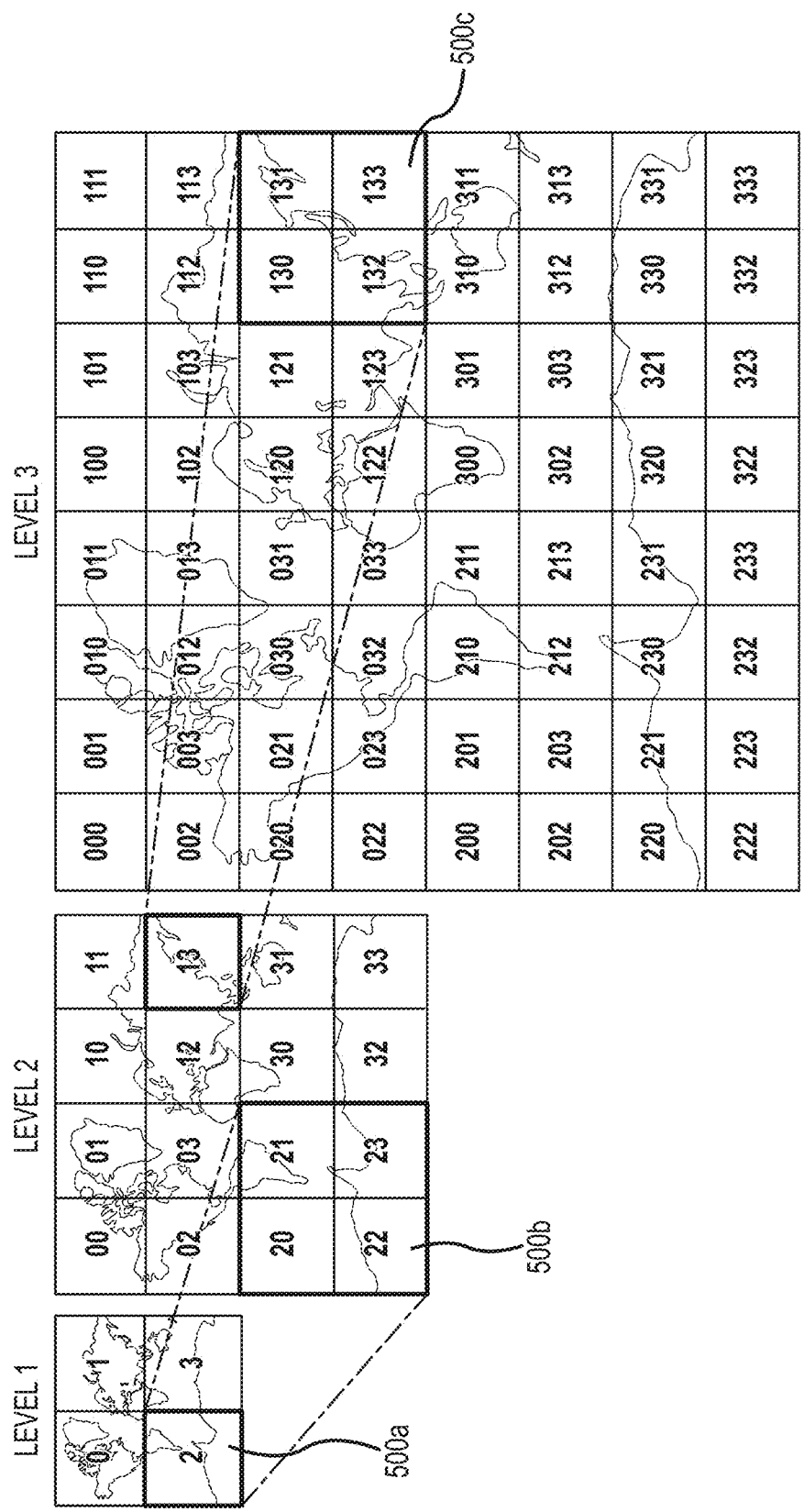
FIG. 7 depicts an embodiment of a tiling technique that may be used to divide an area of interest into a plurality of tiles.

With reference to FIG. 6, the geographical extent of each tile 500 may be known such that source images 22 and base layer images 42 may be correspondingly geographically referenced to a tile 500. For instance, a portion of a source image 22 geographically corresponding to the tile 500 may be referred to as a source image chip 24 and a portion of a base layer image 42 geographically corresponding to the tile 500 may be referred to as a base layer chip 44. In this regard, geographically concurrent comparisons between a base layer image 42 and corresponding portions of the source images 22 with coverage over a given tile 500 may be made. In one example, an orthorectified map of the globe as shown in FIG. 7 may provided that may be divided into increasingly granular levels of tiles 500a-500c according to global tiling scheme. In this regard, the tiles 500 may correspond to a regular polygonal pattern across the area of interest 400.

Figure 8:
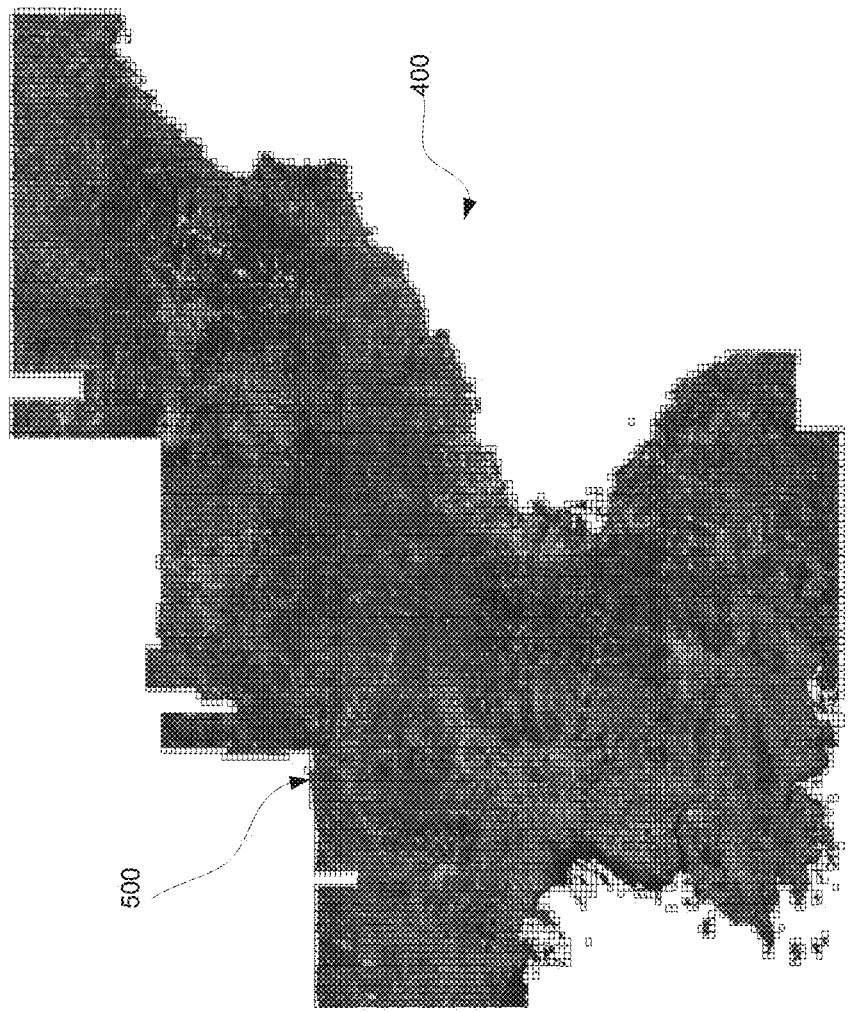
FIG. 8 depicts another embodiment of an area of interest that is divided into a plurality of tiles according to an embodiment of a source selection process.

With reference to FIG. 8, another example of an area of interest 400 divided into a plurality of tiles 500 is shown. The area of interest 400 in FIG. 8 generally corresponds to the country of North Korea. As may be appreciated, the area of interest 400 may be identified so as to extend to landmasses such that areas associated with water (e.g. oceans, seas, large lakes, etc.) may be eliminated from the area of interest 400. As may be appreciated in FIG. 8, only tiles 500 including a portion of land may be included in the area of interest 400. In this regard, while the area of interest 400 may be divided into regular polygonal tiles 500, the area of interest 400 itself may not comprise a regular polygon. Furthermore, as may be appreciated in FIG. 8, the grid (e.g., comprised of vertically extending gridlines 510 and horizontally extending gridlines 520) need not be regular. For instance, with reference to tiles 500a, it can be appreciated that these tiles 500a may be wider than others of the tiles 500. In this regard, while the tiles 500 may be regular, it may be appreciated that non-regular tiles (e.g., 500a) may also be provided. Further still, tiles with irregular shapes or specially defined tile areas (e.g., free form tile areas defined by a human operator or some other parameter such as a natural geographic boundary or the like) may be provided.

With returned reference to FIG. 2, the source selection process 110 may include retrieving 118 a base layer chip 44 corresponding to a tile 500. In this regard, as described above with respect FIG. 1, a base layer image 42 may be a lower resolution global mosaic in which colors have been adjusted manually. Various sources may be used as the base layer image 42 from which the base layer chip 44 may be retrieved 118. For example, one potential base layer image 42 corresponds to a TerraColor global mosaic available from Earthstar Geographics LLC of San Diego, Calif. The TerraColor global mosaic includes primarily imagery captured from the Landsat 7 remote-sensing satellite. In any regard, the base layer image 42 (e.g., such as the TerraColor mosaic) may be a manually color balanced (e.g., using contrast stretching or other color balancing techniques). Accordingly, the base layer image 42, may have a relatively uniform color balancing despite the base layer image 42 having relatively low resolution (e.g., on the order of 15 m or less).

In an embodiment, the base layer image 42 may be a previously generated mosaic 30 (e.g., a mosaic previously generated by execution of the one or more modules 100-300 of the mosaic generator 10 described herein). In this regard, mosaic generation may be iterative such that previous versions of a mosaic 30 may serve as the base layer image 42 for further selection of source images 22 for inclusion in the mosaic in subsequent versions. In this regard, it may be appreciated that the base layer image 42 may, at least some embodiments, be a relatively high resolution image (e.g., on the order of or of equal resolution to the source images 22). In this regard, the base layer image 42 may be downsampled (e.g., by the downsampling module 26) for use in the source selection process 110 described herein to reduce computational overhead and speed the execution of the process. Accordingly, the base layer 40 may be seamlessly updated utilizing the techniques described herein. That is, the base layer 40 may continually evolve with each iteration of mosaic generated. This may occur automatically such that updates to the base layer 40 are made upon each iteration of the process.

The source selection process 110 may also include calculating 120 a merit value for each source image chip 24 with coverage in a given tile 500. The merit value may be at least partially based on the degree to which the source image chip 24 matches a corresponding base layer 44. For example, as shown in FIG. 2 the calculating 120 may include a number of substeps 122-126. For instance, the calculating 120 may include downsampling 122 each source image chip 24 (e.g., utilizing the downsampling module 26). For example, the downsampling 122 may produce a downsampled source image chip 24' at a corresponding resolution to that of the base layer chip 44. However, the downsampled source image need not correspond to the resolution of that of the base layer chip 44. The downsampling 122 may include reducing the resolution in both the horizontal and vertical extents. For example, the downsampling 122 may reduce a geospatial source image 22 from a resolution of 0.5 m or more to 15 m or less.

Furthermore, calculating 120 the merit value may include calculating 124 one or more similarity metrics between the source image chip 24' and the corresponding base layer chip 44. Any one or more of a number of techniques may be utilized to calculate 124 the similarity metric. For example, in practice many different metrics are possible. Some exemplary metrics include:

Spatial Correlation;
Block Based Spatial Correlation;
Wang-Bovik quality index;
Histogram Intersection (HKS);
Blackfill Percentage;
Gabor Textures; and
Image Differencing.

In this regard, while each of the above-noted techniques are described in greater detail below, it may be appreciated that any quantifiable similarity metric (e.g., any appropriate corresponding algorithm) may be provided to provide a numerical indication of the similarity of the source image chip 24' to the base layer chip 44).

In the spatial correlation approach, the cross correlation of two signals (e.g., image A and image B) may be defined as:

$$CC(A, B) = \frac{\sum (A_i - \mu_A)(B_i - \mu_B)}{\sqrt{\sum (A_i - \mu_A)^2 \sum (B_i - \mu_B)^2}} \quad \text{Equation 1}$$

where $\mu_A$ and $\mu_B$ are the means of signals A and B, and the summation runs over all elements (e.g., each pixel) of each signal. The spatial correlation metric may provide values from −1 to 1. For use in calculating 124 a similarity metric, the A signal may correspond to the pixels of the reference image (e.g., quantified intensity values for each of the pixels of the base layer chip 44) and the B signal may corresponds to pixels of the query image (e.g., quantified intensity values for each source image chip 24' available for a tile 500). If the imagery in question is multiband imagery, then the metric may be extended as follows:

$$CC_\lambda = [CC(REF_1, QUERY_1), CC(REF_2, QUERY_2), \ldots, CC(REF_N, QUERY_N)] \quad \text{Equation 2}$$

where $REF_\lambda$ indicates the band λ of the reference image, and $QUERY_\lambda$ indicates band λ of the query image, and N is the number of bands in the image.

For the calculating 124 of a similarity metric, a subset of the spatial correlation method may be applied, which may be referred to as Block Based Spatial Cross Correlation. This metric performs the computation corresponding to the spatial correlation method in blocks of the image rather than the whole image at a time. In this manner the image is broken up into separate square sized blocks and Equation 2 may be computed between the reference and target blocks, for each band in the image. Then the individual block correlation results for a given band are averaged to give a score for that band.

Another potential approach for calculating 124 a similarity metric is the Wang-Bovik quality index. The Wang-Bovik quality index is generally described in Wang, Z., Bovik, A., A Universal Image Quality Index, IEEE Signal Processing Letters, Vol. 9, No. 3, March 2002, the entirety of which is incorporated herein by reference. The Wang-Bovik quality index for two images f (e.g., the base layer chip 44) and g (e.g., a corresponding source image chip 24') may be defined as:

$$Q_{WB} = \frac{\sigma_{fg}}{\sigma_f \sigma_g} \frac{2\mu_f \mu_g}{\mu_f^2 + \mu_g^2} \frac{2\sigma_f \sigma_g}{(\mu_f^2 + \mu_g^2)(\sigma_f + \sigma_g)} \quad \text{Equation 3}$$

where the variances are represented as $\sigma_f$ and $\sigma_g$ and the means are represented as $\mu_f$ and $\mu_g$. Following Wang-Bovik, the first term is the spatial cross correlation between f and g, the second term is a comparison of the means between f and g, and the third term is a comparison of the contrasts. The Wang-Bovik quality index may return values between −1 and 1. Accordingly, $Q_{WB}$ may be considered to measure the quality of g with respect to f. The extension to multiband imagery may be provided where the definition of the quantity $Q_\lambda$ is as follows:

$$Q_\lambda = [Q_{WB}(REF_1, QUERY_1), Q_{WB}(REF_2, QUERY_2), \ldots, Q_{WB}(REF_N, QUERY_N)] \quad \text{Equation 4}$$

where $REF_\lambda$ indicates the band λ of the reference image (e.g., the base layer chip 44), and $QUERY_\lambda$ indicates band λ of the query image (e.g., each source image chip 24'), and N is the number of bands in the image.

Another approach to calculating 124 a similarity metric may be a Histogram Intersection approach (also referred to herein as the HKS metric). Given a pair of cumulative histograms, I (corresponding to the base layer chip 44) and M (corresponding to each source image chip 24'), each containing n bins, the intersection of the histogram may defined to be:

$$\sum_{j=1}^{n} \min(I_j, M_j) \quad \text{Equation 5}$$

Accordingly, to obtain a fractional match value between 0 and 1 the intersection value may be normalized by the number of pixels in the model (M) histogram:

$$H(I, M) = \frac{\sum_{j=1}^{n} \min(I_j, M_j)}{\sum_{j=1}^{n} M_j} \quad \text{Equation 6}$$

The histogram intersection metric may be extremely simple to compute and has been shown to produce acceptable results on color imagery.

Another approach includes use of Gabor textures. Gabor textures or filters are a means of extracting spatial information from an image. A two dimensional Gabor function g(x,y) may be defined as:

$$g(x, y) = \frac{1}{2\pi \sigma_x \sigma_y} \exp\left[-\frac{1}{2}\left(\frac{x^2}{\sigma_x^2} + \frac{y^2}{\sigma_y^2}\right)\right] \cos\left(\frac{2\pi}{\lambda} x\right) \quad \text{Equation 7}$$

where $\sigma_x$ and $\sigma_y$ are the standard deviations of the Gaussian envelopes along the x and y directions. A set of Gabor filters may be obtained by rotating x and y by angle theta θ as follows:

$$g_{mn}(x, y) = a^{-m} g(x', y')$$

$$x' = a^{-m}(x \cos \theta + y \sin \theta)$$

$$y' = a^{-m}(-x \sin \theta + y \cos \theta) \quad \text{Equation 8}$$

where a>1, θ=nπ/K, n=0, 1, 2, ..., K−1 and m=0, 1, 2, ..., S−1. K and S are the number of orientations and scales. The factor $a^{-m}$ is to ensure that the energy is independent of the scale.

The Gabor filter may be computed with a convolution operation on an image. The Gabor transform at a point in an image may be defined as:

$$W_{mn}(x,y) = \int I(x,y) g_{mn}(x-x_1, y-y_1) dx_1 dy_1 \quad \text{Equation 9}$$

where I(x,y) is the image pixel at point x, y.

Figure 24:
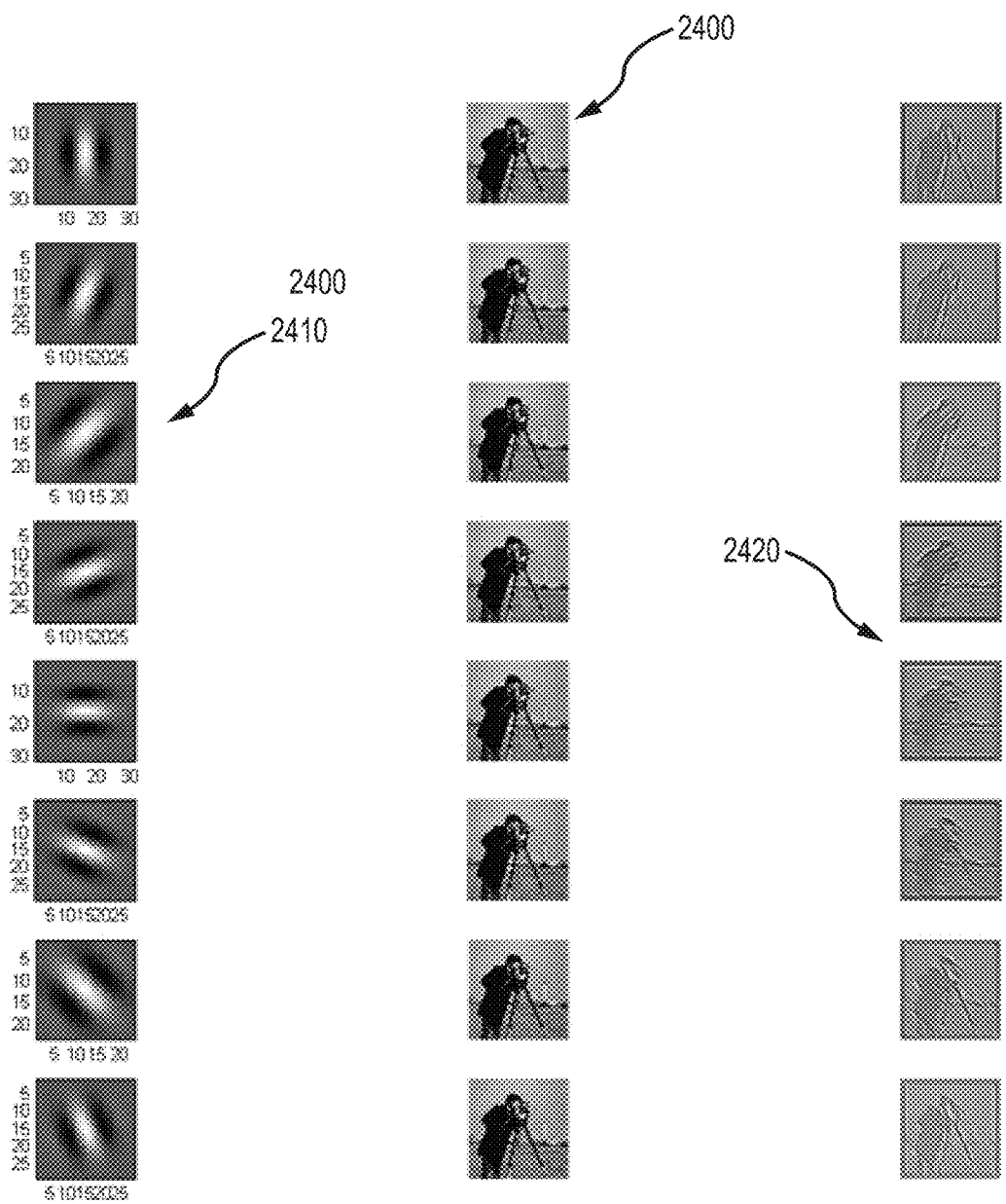
FIG. 24 illustrates a number of Gabor filters applied to an image.

Accordingly, one use of Gabor filters to determine a similar metric may include that the scale is fixed (m=0) and only the orientations of the filters are varied. Eight values of orientations may be chosen starting from zero with step size 180/8=22.5. A pictorial example of Gabor filter on a reference image 2400 is shown in FIG. 24 where the left hand column 2410 shows the filter coefficients displayed as an image. The orientation of the filter changes in steps of 22.5 degrees with each row. The middle column shows the reference image 2400. The rightmost column 2420 shows the result of the convolution of the reference image 2400 with each filter in a corresponding row applied.

In this regard, an image comparison metric based on Gabor textures may be computed using the following algorithm.
1. For each input band of the reference image (e.g., the base layer chip 44), compute the Gabor textures. In this study, for a single band image, the output is an 8 band image. The result may be referred to as $G_{ref}$.
2. For each input band of the query image (e.g., the source image chips 24'), compute the Gabor textures. For example, for a single band image, the output may be an 8 band image. The result may be referred to as $G_{query}$.
3. Compute a feature vector describing the reference image (e.g., the base layer chip 44). For each band in the $G_{ref}$ image the mean and standard deviation may be computed and stored in a feature vector defined as:

$$f_{ref} = [\mu_{ref,0}, \sigma_{ref,0}, \mu_{ref,1}, \sigma_{ref,1}, \ldots, \mu_{ref,N}, \sigma_{ref,N}] \quad \text{Equation 10}$$

4. Compute a feature vector for the query image (e.g., the source image chips 24). For each band in the $G_{query}$ image the mean and standard deviation may be computed and stored in a feature vector defined as:

$$f_{query} = [\mu_{query,0}, \sigma_{query,0}, \mu_{query,1}, \sigma_{query,1}, \ldots, \mu_{query,N}, \sigma_{query,N}] \quad \text{Equation 11}$$

5. Compute the magnitude of the Euclidian difference between the two feature vectors as follows:

$$G = \left\| \frac{f_{ref}}{\|f_{ref}\|} - \frac{f_{query}}{\|f_{query}\|} \right\| \quad \text{Equation 12}$$

In this regard, the quantity G may vary from [0,2], where zero represents identical images. This metric can be easily normalized to the range [0,1] simply by dividing by 2.

In the Imaging Differencing technique, the first image, $image_A$, and a second image, $image_B$, may be compared with the following equations:

$$ID(x, y) = image_A(x, y) - image_B(x, y) \quad \text{Equation 13}$$

$$\text{Mean}(ID) = \frac{1}{nm} \sum_{x=1}^{n} \sum_{y=1}^{m} ID(x, y) \quad \text{Equation 14}$$

where n is the number of columns in the image, and m is the number of lines in the image. In this regard, the intensity values for each pixel may be compared directly between the two images with Equation 13. The average difference in intensity value for each pixel may then be determined with Equation 14. As Mean(ID) provides a metric for a single band, the metric may be extrapolated across the multi-band imagery using the following equation to arrive at a metric with a range from 0.0 to 1.0:

$$Q_{ID} = \frac{\left( \text{Mean}(ID)_{Band1}, \text{Mean}(ID)_{BAND2}, \ldots \text{Mean}(ID)_{BANDn} \right)}{2^{bit\_count} - 1} \quad \text{Equation 15}$$

where $\text{Mean}(ID)_{BAND\_n}$ is the mean intensity value from Equation 14 for the $n^{th}$ band and bit_count is the number of bits in the image.

During the computation of any of the foregoing metrics, the metric may be calculated for all image data not including any blackfill (e.g., a portion of the tile 500 to which the image 22 does not extend). In this regard, each metric may represent a measure of the similarity of only the non-blackfill pixels in the image relative to the base layer. As will be described below, the amount of blackfill may be accounted for in the merit value such that the quality of the non-blackfill pixels is measured independently from the blackfill in the image 22.

Figure 25:
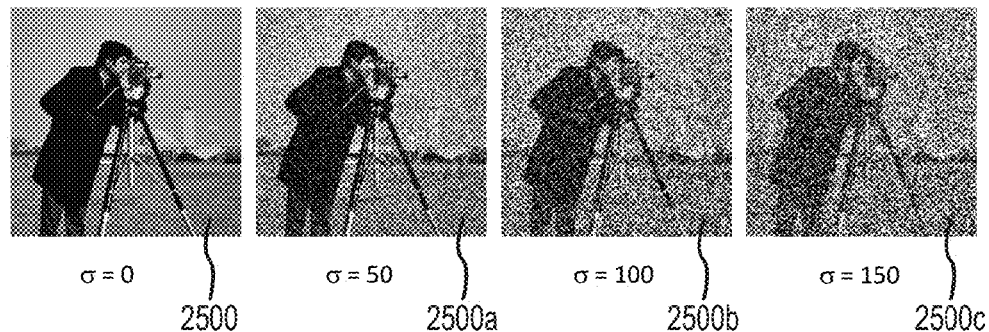
FIGS. 25-33 illustrate examples of query images utilized to test different embodiments similarity metrics and the respective results for each similarity metric for the various tests.
Figure 26:
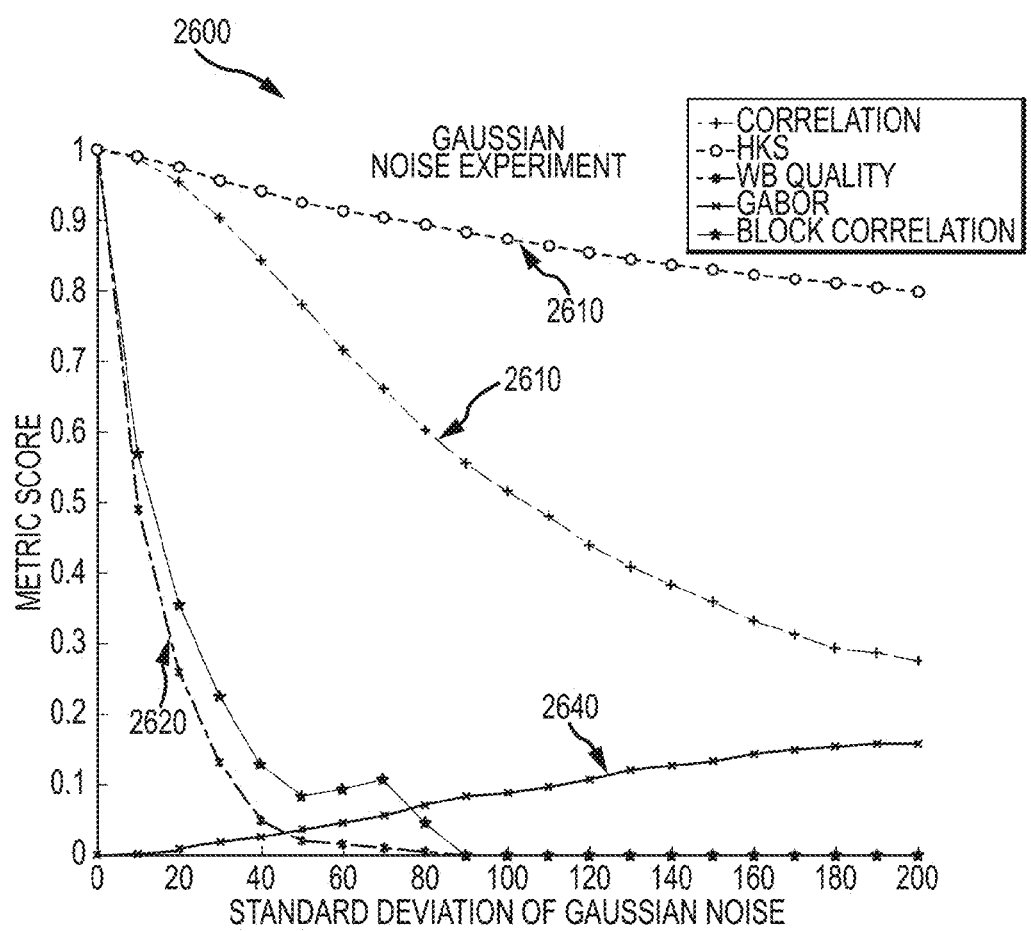

The various similarity metrics identified above were tested in a number of different scenarios to evaluate the efficacy of each. For example, one test included testing the metrics' response to image degradation with Gaussian random noise. Accordingly, a cameraman image 2500 was taken as the reference image. A total of 21 iterations were performed. At each iteration, a query image (e.g., three query images 2500a-2500c are shown in FIG. 25) was formed by degrading the cameraman image by adding a zero mean Gaussian random signal with increasing standard deviation relative to the to the image. For example query image 2500 has a standard deviation of 0 (i.e., no distortion), query image 2500a has a standard deviation of 50, query image 2500b has a standard deviation of 100, and query image 2500c has a standard deviation of 150. The metric set was computed between the query image and the reference image and a plot 2600 as shown in FIG. 26 was produced. Referring to FIG. 26, it may be observed that the spatial correlation 2610, Wang-Bovik 2620, and HKS 2630 metrics all trend downward with image degradation, indicating that the similarly of the images decreases as the amount of noise increases. The Gabor metric 2640 shows the opposite behavior, and increases as the degradation increases. This is due to the definition of the Gabor metric which will show zero difference for identical images.

It is noted that that the Wang-Bovik metric 2620 heavily penalizes the query image based on the presence of noise. The Wang-Bovik metric 2620 is the product of three quantites: the spatial correlation, a comparison of the means, and a comparison of the standard deviations. Since the query image is formed by adding zero mean Gaussian random noise with varying standard deviation, the Wang-Bovik metric 2620 is very sensitive to changes in the standard deviation of the imagery, which is reflected in the results.

Another test involving image degradation by blending two images was also performed. The Gaussian noise experiment described above is illustrative to determine how the metrics respond to the addition of noise. However, this generally may not reflect reality as the reference image and the query image in a real world application may have negligible levels of noise. In this experiment the cameraman image 2500 again serves as the reference image.

Figure 27:
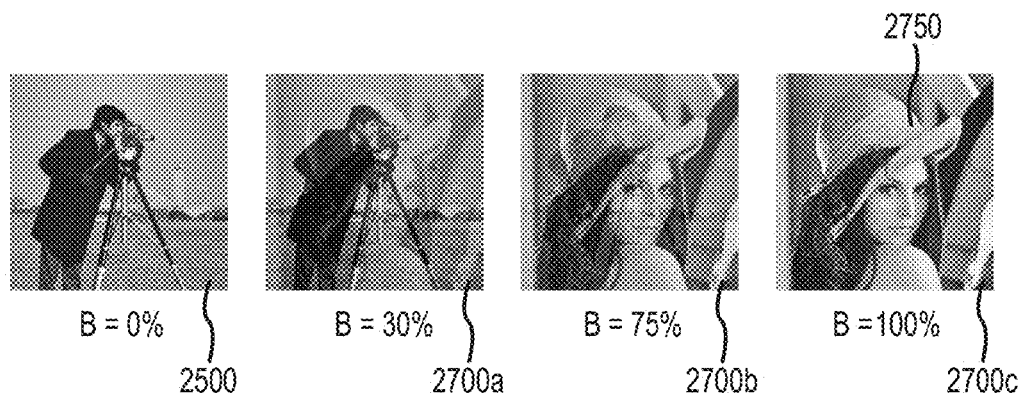

A total of 21 iterations are also performed for the image blending test. For each iteration a series of query images 2700a-2700c were formed by blending the cameraman image 2500 with another image 2750 where the blending factor (B) is a function of the iteration number as shown in FIG. 27. The metric set was computed between the query images (e.g., including 2700a-2700c) and the reference image 2500. In this fashion the reference image 2500 and the query image is initially identical (B=0), and end up being completely different images (B=100) at the last iteration. A pictorial example of the degradation of several iterations (2700a-2700c) is shown in FIG. 27. The performance results of each metric on the image blending dataset are shown in the plot 2800 in FIG. 28.

Figure 28:
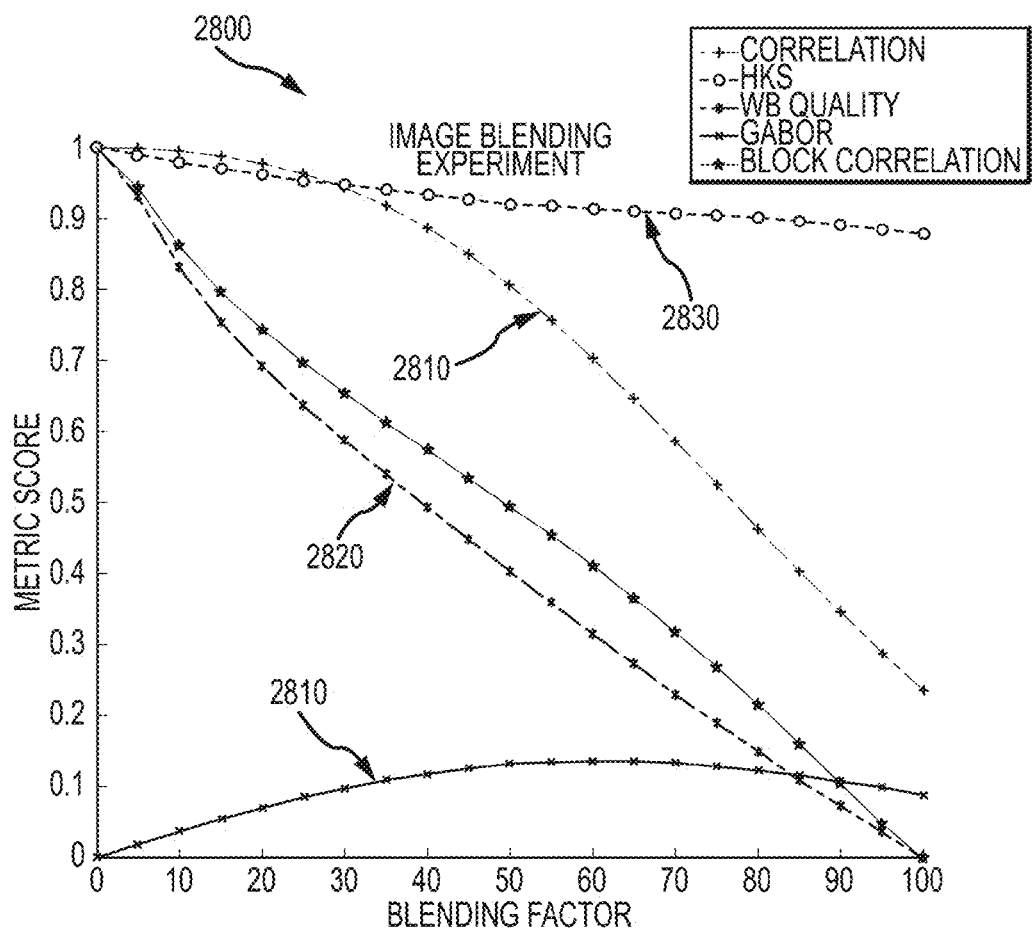

Referring to FIG. 28, the metric scores show much different behavior than in the Gaussian noise experiment. The Wang-Bovik 2820 and the spatial correlation 2810 metrics display general shapes which are nearly the mirror image of each other, reflected through an imaginary straight line between (0,1) and (100,0). For a blending factor of 100, which indicates that the images are totally dissimilar, the Wang-Bovik metric 2820 produces a smaller score than the spatial correlation 2810 metric or the HKS metric 2830. The Gabor metric 2840 appears to increase as the blending factor increases, up to blending factor 60, after which it begins to decrease. This may be problematic since the images become more dissimilar as the blending factor increases. As such the Gabor metric 2840 does not appear to be an ideal metric for discrimination of real world images. The HKS metric 2830 shows a general downward trend as the blending factor increases, however, the coordinate at blending factor 0 is 1.0 and the coordinate at blending factor 100 is 0.9. This is a very small dynamic range and makes it difficult to use this metric for measuring similarity between real world images.

Another test was conducted using image degradation by blending two satellite images. The image blending experiment is illustrative to determine how the metrics respond with real world images. However, the application that this metric selection is targeted to is specifically remotely sensed geospatial source images of the Earth. As such, the image blending experiment was repeated using geospatial source images of the Earth to evaluate performance in the target application.

Figure 29:
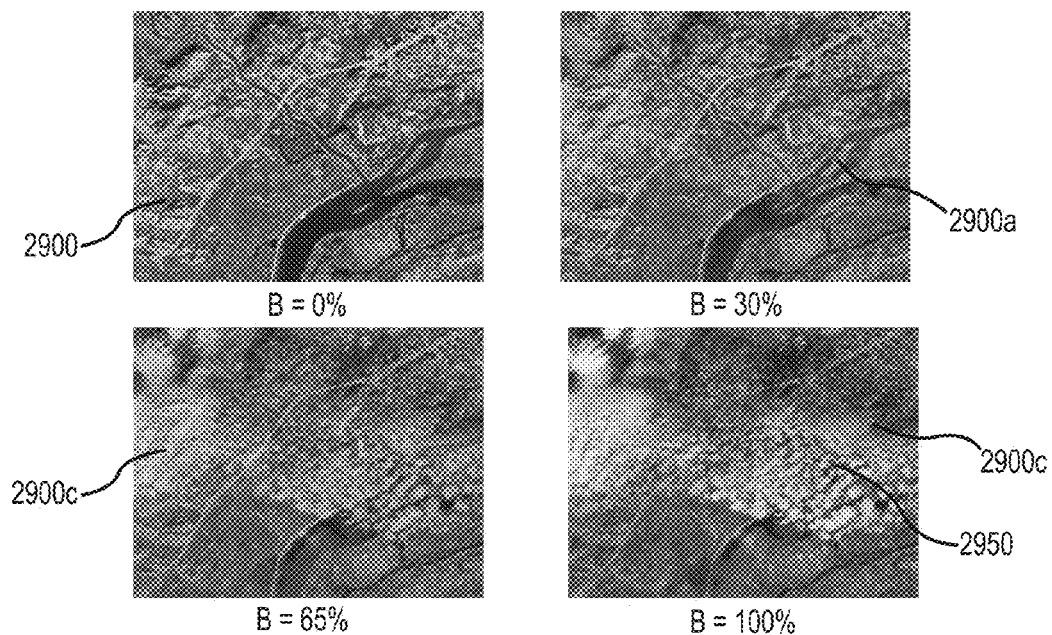

In this test the reference image 2900 is a cloud free image over North Korea at 15 m resolution. A total of 21 iterations were performed. For each iteration the query image was formed by blending the reference image with a second image 2950 over the same area, collected at a different time containing heavy cloud cover. The blending factor (B) is a function of the iteration number. The metric set was computed between the query images having different successively increasing blending factors (B) and the reference image. In this fashion the reference image 2900 and the query images start out to be identical (B=0), and end up being completely different images (B=100) at the last iteration with the query image being the second image 2950 at B=100. A pictorial example of the degradation of several iterations 2900a-2900c is shown in FIG. 29. The performance results of each metric on the image blending dataset are shown in the plot 3000 of FIG. 30.

The advantage of blending a cloud free image 2900 with a cloudy image 2950 is that the query images will simulate the effect of haze in the imagery. Haze is translucent cloud cover and is present in many remotely sensed images of the Earth. In the target application of the automatic image selection module 100, given a choice between a hazy image and a non-hazy image, the non-hazy image should be chosen (barring other environmental factors like seasonal effects, snow cover, massive changes, etc.).

Figure 30:
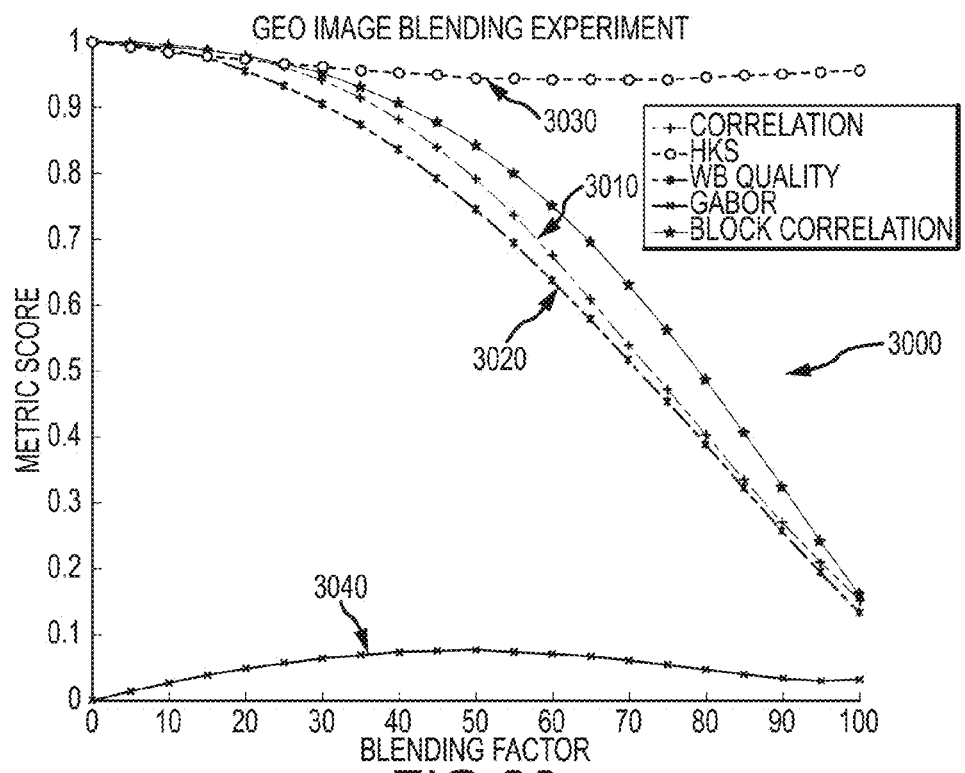

Referring to FIG. 30, the metric scores 3010-3040 show much different behavior than in the previous image blending experiment. The HKS metric 3030 decreases as the blending factor increases until the blending factor reaches B=50 after which it begins to increase with the blending factor. This peculiar behavior shows that the HKS metric 3030 is unreliable as a similarity metric for the target application of automatic image selectin. The Gabor metric 3040 increases with the blending factor until the blending factor reaches B=50, after which it decreases with increasing blending factor. As such, the Gabor metric 3040 appears to be an unreliable metric for the target application of automatic image selection since it falsely indicates that the cloudy image 2950 is a better match to the reference image 2900 than some of the query images (2900a, 2900b) with smaller blending factor. The performance of the spatial correlation 3010 and Wang-Bovik 3020 metrics is nearly identical, with the Wang-Bovik 3020 metric scoring slightly lower than the spatial correlation metric 3010 at most of the iterations. As such, either the spatial correlation 3010 or the Wang-Bovik metric 3020 appears to be a suitable metric for the target application of automatic image selection.

Another test was conducted involving image degradation by blending two color satellite images. In this regard, the experiments described above have dealt only with single band (panchromatic) data. For completeness a repeat of the satellite image blending test above was repeated with color imagery.

Figure 31:
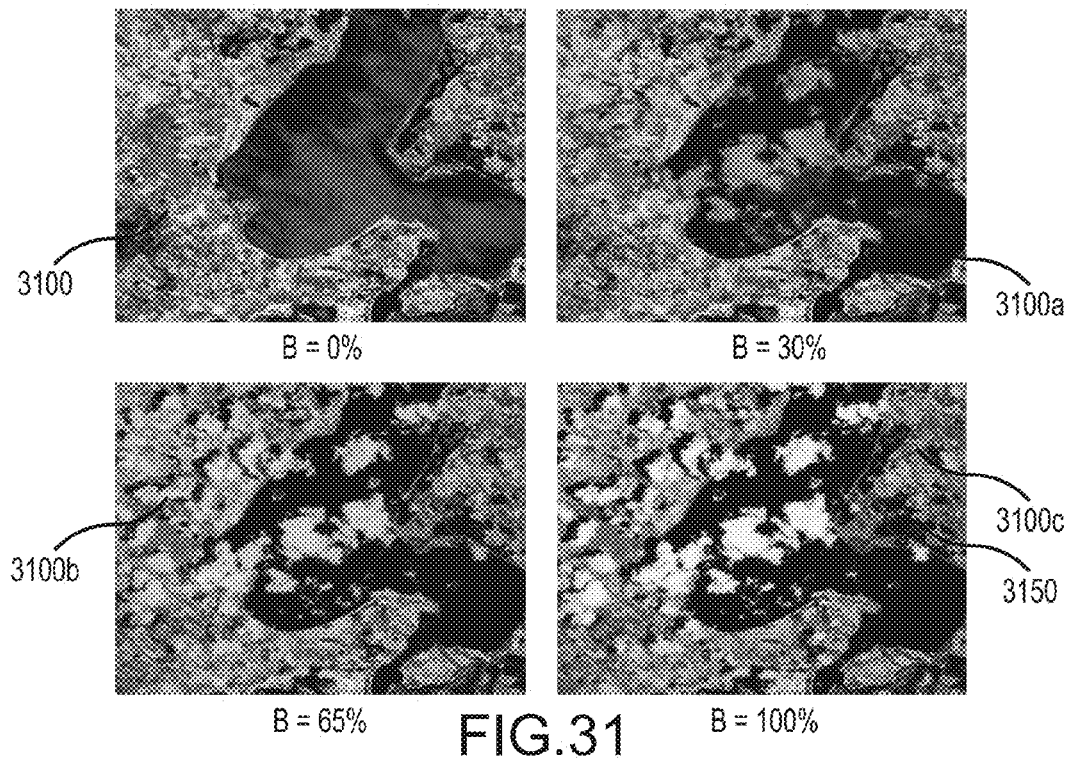
Figure 32:
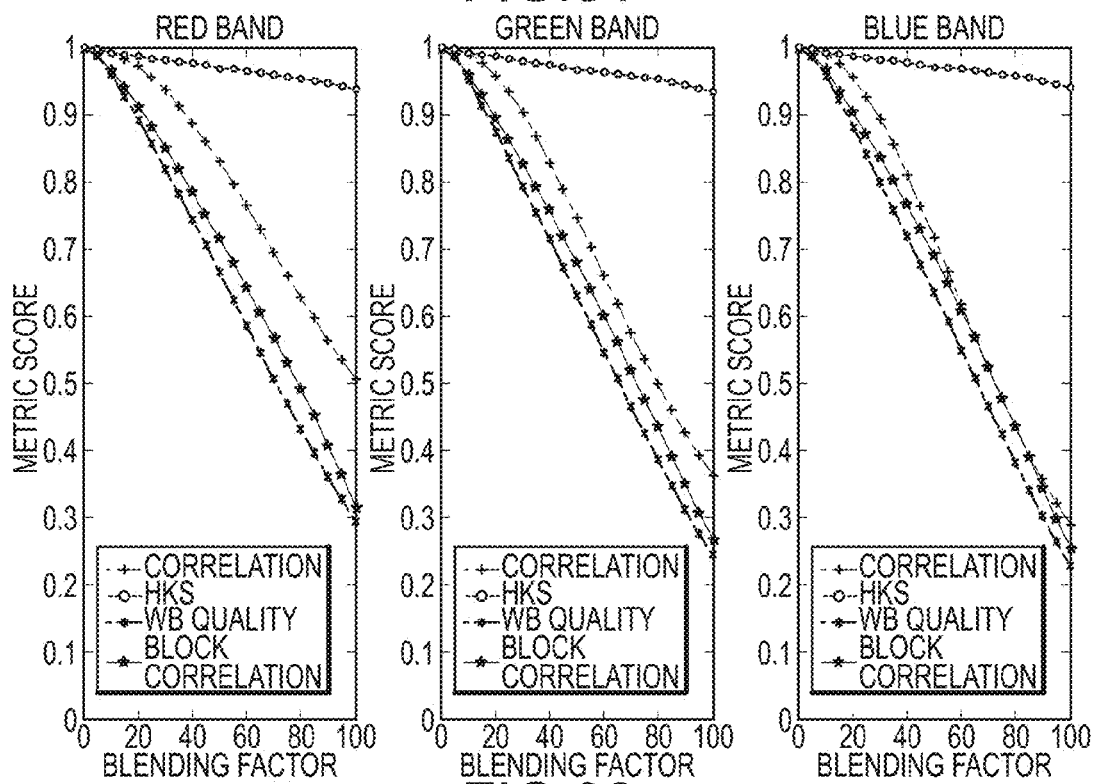

In this test, the reference image 3100 is a cloud free image over Sardinia, Italy at 15 m resolution. A total of 21 iterations were performed. For each iteration the query image was formed by blending the reference image 3100 with a second image 3150 over the same area, collected at a different time containing heavy cloud cover. The blending factor (B) is a function of the iteration number. The metric set was computed between the query images (3100a-3100c) and the reference image 3100. In this fashion the reference image 3100 and the query image start out to be identical (B=0), and end up being completely different images (B=100) at the last iteration where the query image comprises the second image 3150. A pictorial example of the degradation of several iterations is shown in FIG. 31. The performance results of each metric on each band of the image are shown in FIGS. 32A-32C. The metric score for each band in the image was averaged to compute an overall image score, shown in the plot 3300 of FIG. 33.

Figure 33:
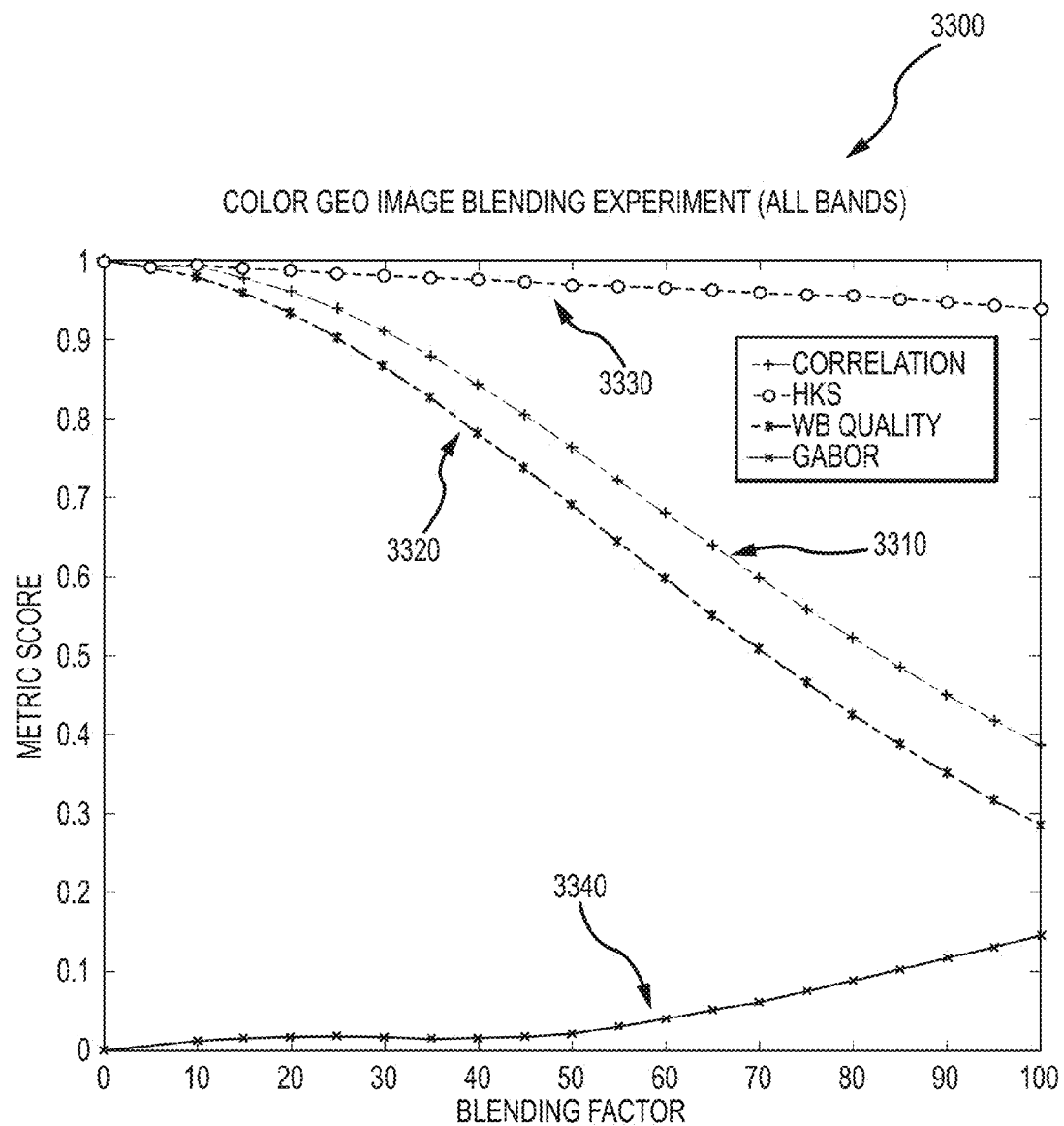

Referring to FIGS. 32A-32C, the performance of each metric separated out by image band is shown in each respective figure. The performance for a given metric is similar in each band, because the degradation pixels (clouds) are generally white and tend to affect all bands equally. Referring to FIG. 33, the HKS metric 3330 generally decreases with increasing blending factor, however, the difference in the HKS metric 3330 between blending factor 0 and blending factor 100 is only 5%. Accordingly, the HKS metric 3300 exhibits very low dynamic range and thus shows lower discriminating power than the other metrics.

The Gabor metric 3340 exhibits poor discriminating power for blending factors between 5% and 50%, after which the increase goes nearly linearly with increasing blending factor. Since it can't detect smaller amounts of degradation as well as the spatial correlation 3310 or Wang-Bovik 3320 metrics, the Gabor metric 3340 may not be a preferred choice for the target application of automatic source image selection. The performance of the spatial correlation 3310 and Wang-Bovik 3320 metrics is very similar, and they both reliably capture the degradation of the imagery as the blending factor increases. The Wang-Bovik 332 metric scores slightly lower than the spatial correlation metric 3310 at all blending factors. As such, either the spatial correlation 3310 or the Wang-Bovik metric 3320 appear to be a suitable metric for the target application of automatic source image selection.

Accordingly, the results described above show that the metrics perform much differently on handheld camera imagery than on the satellite imagery. For example, the HKS and Gabor metrics were generally not as able to reliably measure the incremental degradation of the satellite imagery. These metrics also exhibit low dynamic range, in some cases only measuring a 5% difference between a cloud free image and an image with heavy cloud cover. As such the HKS and Gabor metrics may not be ideal choices for a similarity matching metric for satellite imagery applications. Furthermore, the foregoing results demonstrate the value of performing evaluations using satellite imagery, rather than just handheld camera images. Unfortunately many prior evaluations related to computer vision research are note applicable to the remote sensing domain and thus do not evaluate metrics utilizing satellite imagery. The results of the foregoing results demonstrate that the differences in performance can be significant.

In this regard, for the satellite imagery evaluations, the Wang-Bovik and the spatial correlation metrics perform in a similar fashion. Both metrics reliably measure the incremental degradation of the imagery in both the panchromatic and color experiments. Both metrics provide a wide dynamic range which makes them suitable for measuring the similarity between the images. Note that since the definition of the Wang-Bovik index includes correlation, that these metrics may not be truly independent.

Comparing and contrasting the two metrics, the Wang-Bovik metric penalizes the query image for the presence of noise more than the spatial correlation metric does. This may be less advantageous for some matching experiments dealing with high off-nadir collections. The spatial correlation metric is not as sensitive to the presence of noise, as shown in the results above.

The spatial correlation metric, however, is independent of brightness differences between the reference image and the query image, while the Wang-Bovik metric is very sensitive to brightness differences. This could be a consideration depending on the target application of image source selection, because a 16-bit target image may be evaluated against an 8-bit reference layer using the spatial correlation metric without loss of generality. In general the spatial correlation metric evaluates only the spatial content of the imagery, which may be important for some applications of image source selection.

Conversely, for radiometric matching applications, information regarding the brightness and contrast of the image is desirable. As such the Wang-Bovik metric may be a good choice for similarity matching purposes where radiometric fidelity is important. Additionally, in general, the Wang-Bovik metric scores lower than the spatial correlation metric, and tends to penalize the query image for differences more than the spatial correlation metric does.

As such, it may be that the Wang-Bovik metric is preferred, however, it may be appreciated that more than one metric may be employed with weighting factors in calculating 124 the similarity metric. For example, various ones of the foregoing or other metrics may provide specific sensitivity to certain radiometric differences in the images that may be preferred. As such, those metrics may be weighted more heavily than another metric used in the calculating 124. In this regard, the similarity metric may be provided using the following equation:

$$M_{tile} = \sum_i W_i Q_i \qquad \text{Equation 16}$$

where $W_i$ represent weighting factors and $Q_i$ represent the different quality metrics described above. For example, as described above in determining the similarity of a cloud free image to various images with various amounts of cloud cover artificially imposed on the images, it was found that the spatial correlation and Wang-Bovik metrics appear to be suitable metrics for this application. Moreover, these metrics also appear to apply to color satellite images in the same context. As such, in a preferred embodiment, the calculating 124 may include the calculation of the Wang-Bovik and/or spatial correlation metrics that may in turn be weighted.

Additionally, calculating 120 the merit value for each source image chip 24 may include calculating 126 an amount of blackfill for a source image chip 24' relative to the tile 500.

Figure 9:
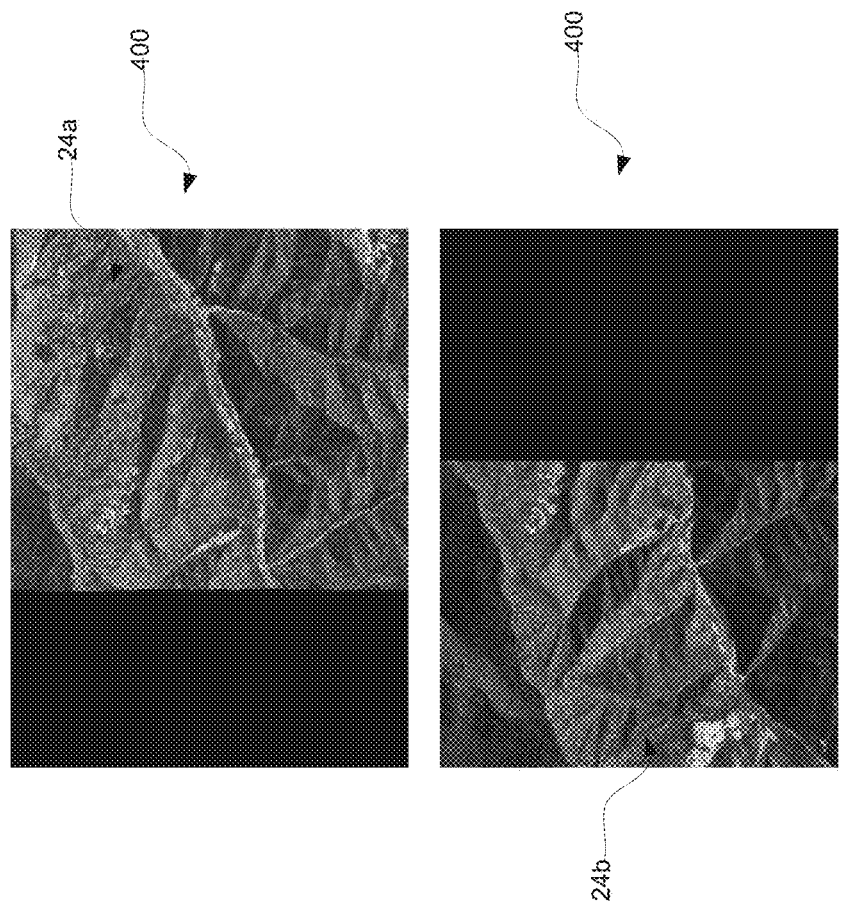
FIG. 9 depicts two images corresponding to a tile that each have different coverage with respect to the tile.

For example, with reference to FIG. 9, the coverage of a first source image chip 24a and a second source image chip 24b are shown relative to a common tile 500 in the upper portion and lower portion of FIG. 9, respectively. As may be appreciated, the first source image chip 24a may cover a larger area of the tile 500 than does the second source image chip 24b. In this regard, the second source image chip 24b may be have a larger blackfill amount calculated 126 than is calculated 126 the first source image chip 24a. The amount of blackfill may be expressed as $Q_{BLACKFILL}$.

In this regard, for each source image chip 24 corresponding to a tile 500, a merit value may be calculated 120 that accounts for both one or more similarity metric(s) (e.g., including a weighted sum of the metrics $Q_{sm}$ as described above) and the calculated 126 amount of blackfill, $Q_{BLACKFILL}$, of the source image chip 24 (e.g., corresponding to a percentage of the blackfill of the source image chip 24 relative to the tile 500). In this regard, the merit value may be an extension of Equation 16 described above, wherein $Q_{BLACKFILL}$ is attributed a weighting value (e.g., a negative weighting value) in Equation 16 above where $Q_{BLACKFILL}$ may be provided as corresponding to the percentage of blackfill in the tile. As may be appreciated, a source image chip 24 with relatively low coverage over a given tile 500 may have a relatively large percentage of blackfill such that the image chip 24 may be relatively heavily penalized. In contrast, an image chip 24 which extends to the entire extent of the tile 500 will have a percentage of blackfill of 0 such that the image chip 24 would not be penalized at all with respect to blackfill.

With returned reference to FIG. 2, the merit value for each source image chip 24 may be used in implementing 128 a cost function that may be used to select source image chips 24 for each tile 500 in the area of interest 400. In this regard, the cost function may include a coverage metric. The coverage metric may be indicative of the degree to which a given source image 22 from which a chip 24 is taken provides unique coverage in the overall mosaic 30. That is, it may be appreciated that a source image 22 which extends to a number of different tiles 500 in the area of interest 400 may be more preferred than a source image 22 that is limited in extent to a few number of tiles 500. That is, for radiometric consistency, it may be desirable to select source images 22 that cover a large portion of the mosaic 30. As such, the coverage metric may be calculated that penalizes non-unique geographic coverage of a source image 22 from which a chip 24 is taken. That is, the coverage metric may be a quantifiable value indicative of the coverage of a source image 22 relate to an image chip 24.

One example of a coverage metric that may be employed may define a value referred to as Unfulfilled Polygon (UFP) which may correspond to the portion of the area of interest 400 which contains no coverage. In this regard, the coverage metric may be defined as follows:

$$CM_k = \frac{\text{Area}(UFP) - \text{Area}(\text{Erode}(UFP, Strip_k))}{\text{Area}(Strip_k)} - \text{Area\_fraction} \qquad \text{Equation 17}$$

where UFP is the unfulfilled polygon, Erode (UFP, Strip) indicates an erosion operation in which the unfulfilled polygon is eroded by the strip polygon of the k'th image, and Area( ) indicates an area operation applied to a polygon, and Area_fraction is a scalar floating point value in the range [0,1]. The Area_fraction variable provides a penalization for source images 22 which provide less than Area_fraction amount of unique coverage.

In this regard, a cost function may be provided that may be stated as an optimization problem utilizing the following equation:

$$Cost_k = CM_k + M_{tile,k} \quad \text{Equation 18}$$

where $Cost_K$ indicates the cost of adding the k'th source image 22 to the mosaic, $CM_k$ is the coverage metric for the k'th source image 22, and $M_{tile,k}$ corresponds to the similarity metric for the k'th source image 22. In this regard, the optimization may include beginning with the following set of input data:

A set of N images 22, possibly overlapping, covering a defined geographical extent (e.g., corresponding to the area of interest 400). Each image consists of the imagery data as well as a polygon outlining the geographic extensive the image 22, along with metadata describing the image. An image in the set is designated by $image_k$. A polygon in the set is designated by $Strip_k$; and A standard base layer image 42 covers the same geographic area as the N input images.

In this regard, implementing 128 the cost function may include forming the UFP as follows:

$$UFP = \text{Union}(Strip_1, Strip_2, \ldots, Strip_N). \quad \text{Equation 19}$$

Initially, the UFP may simply be the unique coverage provided by all the source images 22. In turn, the cost function may be initialized to equal 0. Accordingly, the cost function given above may be used to compute the cost of adding a given image to the solution and in turn, used to maximize the global cost function for the mosaic.

For example, a given source image chip 24 may have a higher merit value ($M_{tile}$) than another source image chip 24 for a given tile 500. However, the source image chip 24 with the higher merit value may be part of a source image 22 that extends to a much smaller area of the area of interest 400 than a second source image 22 corresponding to the source image chip 24 having a lower merit value. That is, the second source image 22 may extend to a much larger portion of the area of interest 400, and in turn, the second source image 22 may have a larger coverage metric (CM). In this example, the overall cost relative to the mosaic 30 as a whole of adding the source image chip 24 with the higher merit value may be lower than the cost of adding the source image chip 24 with the lower merit value because the coverage metric for the second source image 22 may attribute a higher cost to the overall mosaic 30. In this regard, an iterative application of the cost function may be performed such that the source images 22 are selected based on the maximization of the cost function for the overall mosaic 30.

As may be appreciated, this may result in selection of source images 22 to extend over individual tiles 500 that may not represent the absolute highest merit value from among all the source image chips 24 available for that tile 500. However, the optimization with respect to the entire mosaic 30 may result in higher quality overall mosaic 30 with acceptable source image chips 24 being provided for each given tile 500. For example, even if a source image 22 covers a very large portion of the area of interest 400, but has a very large radiometric distortion problem (e.g., was taken during snowfall, during a period with a leaf on/leave off status different than that of the base layer image 40, etc.), even the relatively large coverage metric for the source image 22 may not outweigh the low merit value for the source image chips 24 of the source image 22 such that the source image 22 may not be selected for tiles 500.

In this regard, additional source image selection techniques for a tiled geographic area of interest 400 may be provided that correspond generally with the foregoing image selection concepts. For example, with reference to FIGS. 34 and 35, the area of interest 400 under consideration is first tessellated into tiles 500 based on geography as described above. There exist several schemes for such tiling such as, for example, the Google Maps Tiling Scheme, described in the Google Maps API document available from Google, Inc., Mountain View, Calif., the Bing Maps Tiling Scheme, described in the Bing Maps Tile System available from Microsoft Corporation, Redmond, Wash., or may be provided via a custom tiling scheme that may, for example, be a geographic based projection.

Figure 34:
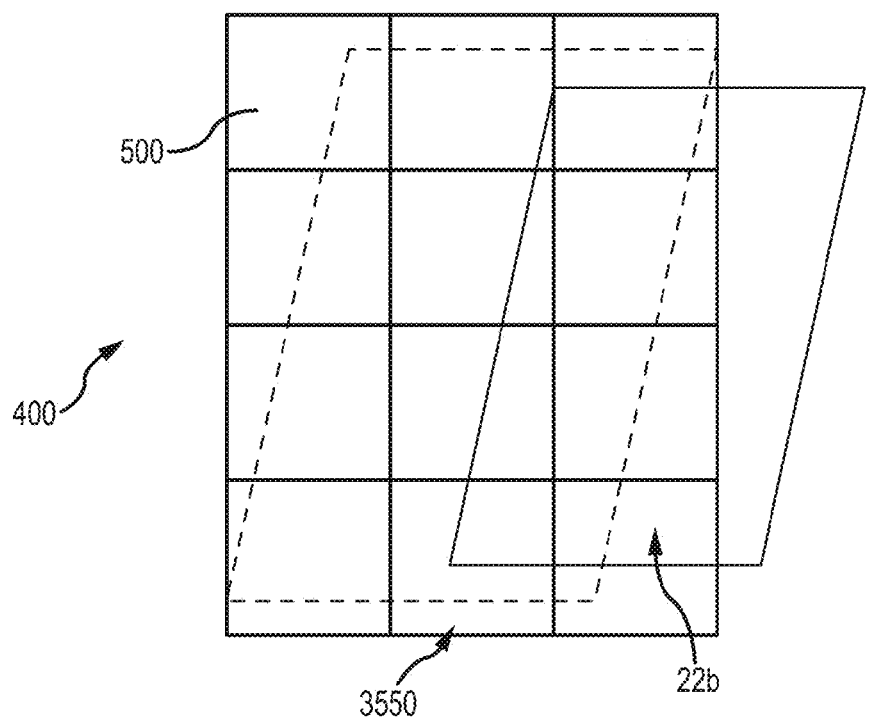
FIG. 34 illustrates an embodiment of an area of interest with multiple images having coverage with respect to a plurality of tiles of the area of interest.
Figure 35:
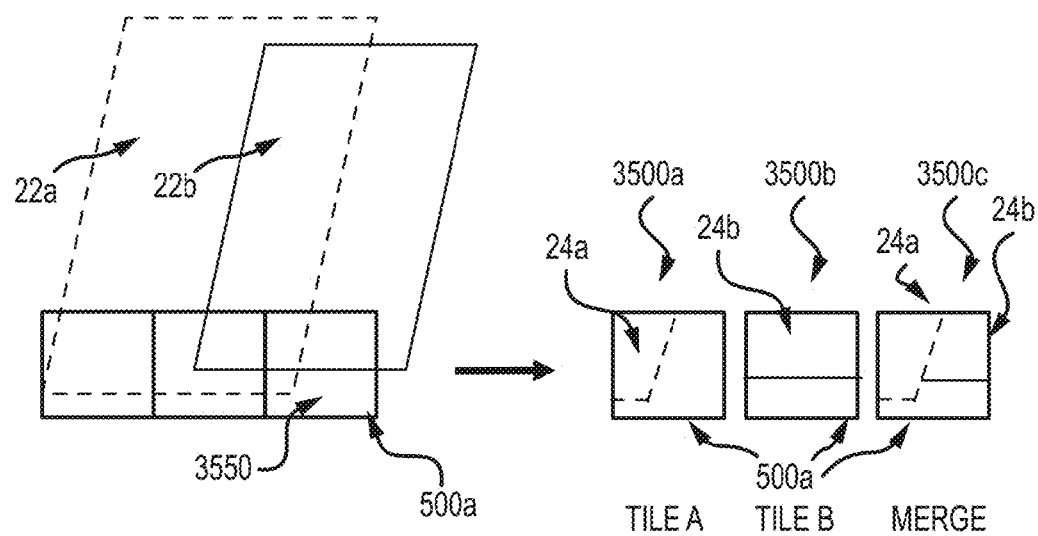
FIG. 35 illustrates an embodiment of various permutations of image combinations for a given tile in the area of interest of FIG. 34 that may be scored using an embodiment of a metric value.

Regardless of the scheme used, the imagery 22a, 22b shown in FIGS. 34 and 35 over the area of interest 400 may be divided into multiple non-overlapping "cells" or chips 24 for a single image as described above. When multiple images are produced in this tiling scheme, the overlap areas of the imagery will produce multiple image tiles 3500a-3500c for a given overlapping cell 500a, as shown in FIG. 35. In this regard, "Tile A" may comprise only the chip 24a corresponding to image 22a, "Tile B" may comprise only the chip 24b for image 22b, and "Merge" may correspond to a merged image in tile 3500c that includes a merged image comprising the chip 24a merged with chip 24b.

Another way of stating this is that the geographic cells 500 may include have multiple permutations of images or potential images that may be produced by way of selection of different combinations of, in this case, a first image chip 24a, a second image chip 24b, or merged combinations thereof. It may be appreciated that additional permutations may be generated with the addition of more images with overlapping coverage in a tile 500. Accordingly, the goal of mosaicking is to create a single image layer, or single set of cells, or single coverage, representing the area of interest 400. With respect to FIG. 34 and FIG. 35, it is clear that the tiling scheme introduces blackfill 3550 into tiles 500 that are near the edge as neither the first image 22a nor the second image 22b has coverage in all areas of some tiles 500. It may be appreciated that in certain situations, image portions may be merged to reduce the blackfill 3550 and create a better image for a given cell 500. For instance, additional detail regarding potential methods for merging images is disclosed in greater detail below.

Accordingly, algorithms or processes for selecting the best coverage in an automated fashion from a set of geographic cells may be generally provided in three steps of:
 tile generation;
 merging; and
 tile selection.
Additional details for each of these three steps are outlined in detail below.

With respect to tile generation, for a given a set of input images 22 that cover an area of interest 400, for each image 22 in the set of images, the area of interest 400 may be divided into tiles 500 as described above. For each tile 500, a score for the tile pixels from an image 22 or image chip 24 as compared to a base layer 42 or base layer chip 44 using a merit value as described above.

Accordingly, when all the tiles 500 have been produced for the area of interest 400, the tiles 500 for which multiple coverages of multiple images 22 exist may be identified. In this regard, for each tile 500 where multiple coverages exist, all the images 22 with coverage for a tile 500 may be found. Again, the merit value may also be determined for merged image chips (e.g., such as the one shown in the "Merge" tile 3500c in FIG. 35). The images 22 or image chips 24 may be ordered by the merit value in order of highest to lowest scoring. Accordingly, for the top scoring image chip 24 for a given tile 500, it may be determined if the blackfill ($Q_{BLACKFILL}$) in the tile exceeds a threshold. In some embodiments, the value of the blackfill threshold may be 0.

If the top scoring image chip 24 does not exceed the blackfill threshold, then no merging may be required (e.g., the top scoring image chip 24 may provide coverage for the entire tile 500). As such, the method may proceed to the next tile 500 and repeat. However, if the top scoring image chip 24 exceeds the blackfill threshold, the image chip 24 may be merged (e.g., as will be described below) with another of the image chips 24 providing coverage to the tile 500 (e.g., the second scoring image chip 24 with the next lowest merit value for the tile 500) to create a new merged image chip. If the merged image chip still exceeds the blackfill threshold, yet another image chip 24 providing coverage to the tile 500 (e.g., the third scoring image chip 24 with the next lowest merit value for the tile 500 that has not already been merged with the original image chip 24) may be merged with the merged image. Accordingly, this process may continue until with pair-wise merging of image chips 24 until either the blackfill threshold (which may be 0) is met or there are no more image chips 24 to merge. This process may represent a "brute force" approach, as computing only the blackfill percentage ($Q_{BLACKFILL}$) doesn't give any information about where the blackfill is in the tile 500 relative to the image chip 24. Thus it is possible to produce merged images which are "worthless" in the sense that the blackfill is not reduced by merging two image chips 24.

Accordingly, a more advantageous method may include again, calculating a merit value for each image chip 24 having coverage in a tile 500 and ordering the image chips 24 in order of descending merit values. Again, beginning with the image chip 24 having the highest merit value, it may be determined if the blackfill in the tile exceeds a blackfill threshold. Again, in some embodiments the value of the blackfill threshold may be 0. Again, if the highest scoring image chip 24 does not exceed the blackfill threshold, then no merging is required as the image chip 24 may extend to the entire tile 500. As such, the process may be repeated with another tile 500.

However, if the blackfill threshold is exceeded, then a merging order may be generated where the highest scoring image chip 24 is the first element in the list. Then, non-blackfill polygons may be computed for each image chip 24 with coverage relative to the tile 400. The non-blackfill polygon may be a defined polygon that encompasses the non-blackfill pixels in the image. As such, the non-blackfill polygon for the highest scoring image chip 24 may be computed. Additionally, the non-blackfill polygon for each image chip 24 with coverage relative to a tile 500 may be computed. In turn, the non-blackfill polygon for the next highest scoring image chip 24 in the merging order list of image chips 24 having coverage with respect to the tile 500 may be determined.

In turn, the non-blackfill polygon of the highest scoring image chip 24 may be intersected with the non-blackfill polygon of the next highest scoring image chip 24. This new value for the non-blackfill polygon corresponding to the non-blackfill polygon of the highest scoring image chip 24 and the next highest scoring image chip 24 is compared to the non-blackfill polygon area of the highest scoring image chip 24. If the area of the combined non-blackfill polygons for the image chips 24 is not increased as compared to the non-blackfill polygon of the original image chip 24 alone, then the image merge of the two images is not carried out and the next image chip 24 in the merging order list is used to determine if the non-blackfill polygon of that image chip 24 contributes to the addition of the non-blackfill polygon of the highest scoring image chip 24.

As such, only image chips 24 that contribute to the non-blackfill area of the polygon are merged. Once the merge order is identified (i.e., with only those image chips 24 whose non-blackfill polygon reduces the amount of blackfill in the tile 500), merges of the image chips 24 may be conducted to create a new combined merged image for use with the tile 500. Accordingly, worthless merges of images that may be computationally intensive are avoided. However, such avoidance of worthless merges are provided at the cost of having to compute the non-blackfill polygons for each image in a tile 500 having image overlap.

When all the merges of image chips 24 for all tiles 500 having overlapping images 22 have been completed there are several ways to select the final images 22 for use in the mosaic 30. One such approach is a "greedy selection." The greedy selection may encompass selecting the highest scoring image 22 and/or merged images based on the merit value for each image 22 and/or merged image for each tile 500. As such, all images 22 and merged images may be produced as described above and may be scored against a base layer image 42 utilizing a merit value described above. The image 22 or merged image having the highest merit value may be selected individually for each tile 500 in the area of interest 400.

In this regard, a mosaic score may be calculated that includes the sum of all scores for each image 22 or merged image selected for each tile 500. As may be appreciated, the mosaic score may be the overall score for the entire mosaic, and may be used for quantitatively reporting the quality metric of the resulting mosaic 30 (e.g., relative to other mosaics). The merit value for each tile 500 in the mosaic 30 can also be reported independently as a metric value in a mapping application (as the tiles 500 are geospatially located). This may provide a location based report, possibly represented as a heat map, of the quality of the individual portions or tiles 500 of the resulting mosaic 30. This information may be used to focus the attention later for quality control or quality assurance activities on certain areas of the mosaic 30. For example, an area in the mosaic 30 with particularly weak merit values may be specifically targeted for subsequent image acquisition, or may provide guidance for particular areas to be subjected to review by a human user.

Additionally, a "constrained greedy selection" process may be provided that may be more complex than the greedy selection. For example, human operators, when creating a mosaic, try to complete the mosaic with as few source images as possible to avoid a patchwork or "quilting" effect in the final mosaic. Using fewer source images 22 enhances the probability that adjacent images 22 will match better radiometically, producing a visually pleasing result with fewer seamlines between images 22. Using fewer images 22 also reduces the probability of finding changes in the images that may be visually distracting to the end user.

For example, one may consider two images 22 extending to two different tiles 500 of an airport in which the airport is under construction in one of the images and has been completed in the second image. If the two images are mosaiced, the resulting mosaic may show the airport in two different physical states (e.g., where the first image is selected for use in one tile 500 and the second image is used in the other tile 500); whereas if either the pre-construction image or the post-construction image is used for both tiles 500 then the airport will look consistent and the result will be more aesthetically pleasing.

Accordingly, with greedy selection there are no constraints on the number of images used in the solution and artifacts described above may not be avoided. With constrained greedy selection, the cost function punishes adding additional images 22 into the mosaic 30. Thus, the constrained greedy selection implements a constraint on the complexity of the mosaic 30 as the cost function of the mosaic is maximized using as few images 22 as possible.

Accordingly, all images 22 having coverage with respect to a tile 500 of the area of interest 400 may be scored against a base layer image 42 to generate a merit value for each image. The mosaic score may be initialized to zero. For each tile 500, the image chips 24 for that tile 500 may be ordered by merit value from highest to lowest score. In turn, a number of variables may be defined. For example, a coverage metric may be defined as described above. In an embodiment, the coverage metric may utilize a complexity penalty subtracted from a merit value of an image chip 24 based on lack of use of the image 22 from which the chip 24 is taken elsewhere in the mosaic 30. The value of the complexity penalty may be adjustable by a user to fine tune the selection process. For example, the following equation may be used:

$$M_{tile\_adjusted} = M_{tile} + P_{complexity} \quad \text{Equation 20}$$

where $M_{tile\_adjusted}$ is the adjusted tile score accounting for the complexity penalty and $P_{complexity}$ is the complexity penalty (e.g., a negative value that is adjustable by a user).

For each image 22 with coverage relative to a tile 500, it is determined if that image 22 is used elsewhere in another tile 500 (recalling that the source image 22 may have coverage in multiple tiles 500). If the image 22 is not used elsewhere, the score for an image chip 24 from that image 22 may be reduced by the amount of the complexity penalty. If the image 22 is used in another tile 500, no penalty may be imposed to the image chip 24 based on coverage. Then it may be determined if the adjusted score of an image chip 24 after application of the complexity penalty is higher than the adjusted score of the highest scoring image chip 24 that has also undergone the scrutiny with respect to coverage such that the complexity penalty determination has also been applied to the highest scoring image chip 24. If the adjusted score of an image chip 24 is now higher than the adjusted score highest scoring image chip 24 after application of the coverage penalty, then the image chip 24 with the highest resulting adjusted score that includes the complexity penalty determination is used. This process may be repeated for each image 22 with coverage for a tile 500.

Accordingly, the coverage of images 22 derived from source images which are not already part of the solution are penalized, forcing the automatic image selection for the mosaic 30 to favor adding images 22 which are already part of the mosaic 30. This method works best when there are many images with multiple areas of coverages for the tiles 500 in the mosaic 30. For example, in the limit where there is only a single coverage for each cell, the solution converges to that found by the greedy selection algorithm.

The amount of complexity allowed in the mosaic may be controlled by adjusting the complexity penalty value. During constrained greedy selection it may be possible to plot the mosaic score value as new tiles 500 are evaluated and images 22 for each tile 500 are added to the mosaic 30. However, this may be a nonlinear function which generally increases, and undergoes sharp decreases every time a new image 22 is added to the solution. Accordingly, adding new images 22 into the mosaic 30 is generally unavoidable as in most large scale areas of interest 400 may not be covered by a single image.

During production of large scale mosaics, the both the greedy selection and constrained greedy selecting process described above have shown satisfactory results in both quality and runtime. However, this is not meant to preclude the use of any other type of optimization scheme such simulated annealing, genetic programming, conjugate gradient search, or other optimization schemes that are well known to practitioners of the art.

As such, it may be appreciated that the foregoing source selection process 110 may be automated such that the process 110 may be performed in at least partially computer autonomous manner. For example, the foregoing calculations provided in connection with automatic source selection may be highly parallel such that the foregoing calculations may be ideal candidates for execution on a GPU rather than a CPU. In certain instances, use of a GPU rather than a CPU may provide performance advantages in performing certain calculations. For example, certain highly parallel calculations may be more efficiently executed by a GPU given the efficiency GPUs have in rapidly manipulating and altering memory as compared to CPUs. As such, for highly parallel computations, such as the foregoing methods for generating a similarity metric, calculating blackfill, determining a merit value, determining a coverage metric, and solving the cost function for large images with many pixels, execution on the GPU may provide considerable performance advantages.

For instance, it is been found that orders of magnitude of speed increases in foregoing calculations may be realized when executing the parallel computations on a GPU. Accordingly, even for very large area of interest 400 with very many source images 22 available for selection, the foregoing source selection process 110 may be executed relatively quickly to select the source images 22 for use in the mosaic 30. As such, at least portions of the execution of the automatic source selection process 110 may be adapted for execution on one or more GPUs. Given the highly parallel nature of the calculations, the calculations involved in the automatic source selection process 110 may be ideal candidates for execution on a number of networked GPUs that may be remote from one another and simultaneously process portions of the calculations to be made. In this regard, parallel computing at one or more GPUs may be utilized.

It may further be appreciated that when generating a mosaic 30 from a plurality of geospatial images 22, the ability to merge two images 22 may be advantageous. For example, in the foregoing image selection process 110, for at least one tile 500 in the area of interest 400, there may be no single source image 22 that provides coverage over an entire area of the tile 500. In this regard, it may be appreciated that the merging of two source images 22 may be utilized to provide full coverage to the entire tile 500 with a merged image. Furthermore, it may be determined (e.g., based on the cost function described above), the use of a plurality of images 22 merged in a tile 500 may provide a higher cost for the global mosaic 30 that use of a single image 22. In any regard, the merging of images may be utilized in the generation of a mosaic 30.

In this regard, when merging a plurality of images 22 a cutline may be determined along which the plurality of images are to be merged. This cutline or boundary between the plurality of images 22 may be selected to minimize the radiometric discontinuities between the two images 22 such that the pixels of the two images 22 on either side of the cutline are relatively similar. In this regard, generation of the cutline may include finding a continuous path that minimizes absolute radiometric differences between the images 22 to be merged. In turn, for an area of overlap between a first and a second image, pixels on one side of the cutline may correspond to the first image and pixels on the other side of the cutline may correspond to the second image.

Figure 10:
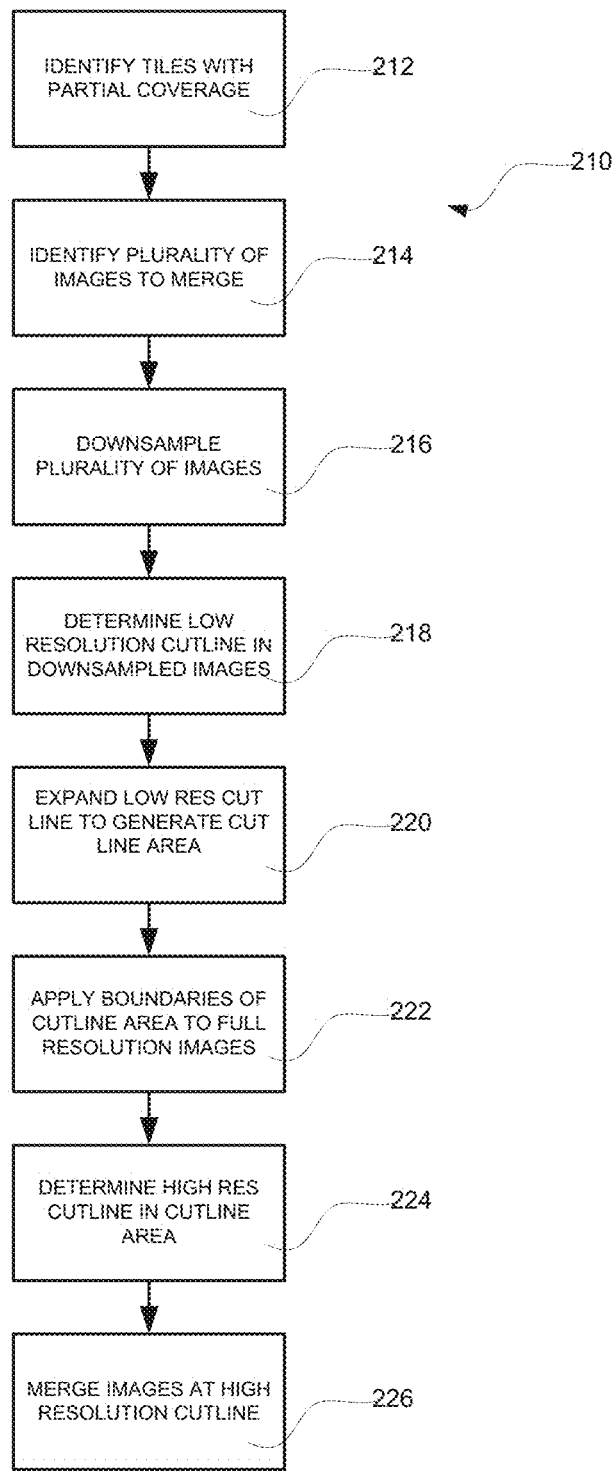
FIG. 10 depicts a flow chart corresponding to an embodiment of an automatic cutline generation process.

With further reference to FIG. 10, an embodiment of an automatic cutline generation process 210 is represented as a flowchart in FIG. 10. In this regard, the automatic cutline generation process 210 will be described with further reference to FIGS. 11-16.

As may be appreciated in FIG. 10, the automatic cutline generation 210 may include identifying 212 tiles 500 of the mosaic 30 with partial coverage. That is, the identifying 212 may include communicating with the source selection module 100 to determine which tiles 500 in the mosaic 30 have partial source image 22 coverage such that merging of a plurality of source images 22 to fully cover the tile 400 may be advantageous. The automatic cutline generation process 210 may also include identifying 214 a plurality of source images 22 to be merged for each of the identified tiles 400. However, it may also be appreciated that the following technique to merging two images may be provided for any images with some portion of overlap (e.g., two geospatial images having at least some geographically concurrent overlap).

Figure 11:
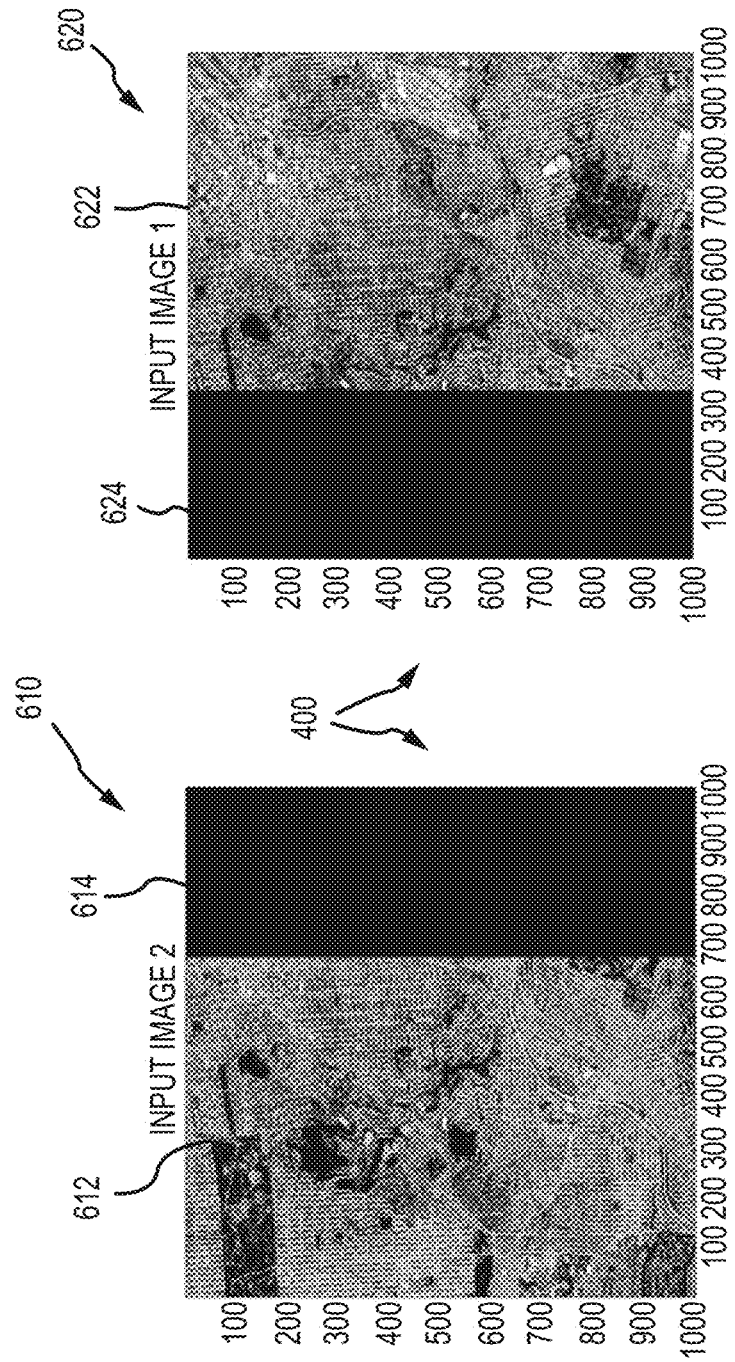
FIG. 11 depicts two images with different coverage with respect to a defined area that are to be merged utilizing an automatic cutline generation process.

For example, with further reference to FIG. 11, a first image 610 is shown which includes image data 612 corresponding to a first portion of the image 610 with the remainder of the image 610 including blackfill 614. As may be appreciated, the image data 612 for the first image 610 is generally provided on the left portion of the image 610 such that the right portion of the tile 400 includes no image data (e.g., is blackfill 614). Also shown in FIG. 11 is a second image 620 which includes image data 622 and the remainder of the tile 400 filled with blackfill 624. As may be appreciated, the second image 620 generally includes image data on the right portion of tile 400. In this regard, it may be appreciated that neither one of the images 610 or 620 alone fully cover the tile 400. In this regard, the first image 610 and the second image 620 may be merged so as to fill the tile 400 with a combined portion of the first image 610 and the second image 620.

In this regard, the automatic cutline generation process 210 may include downsampling 216 the plurality of images 610 and 620 to be merged (e.g., utilizing the downsampling module 26). In this regard, with further reference to FIG. 11, it may be appreciated that the first image 610 and the second image 620 may be relatively high resolution images (e.g., on the order of 0.5 m resolution or higher). In this regard, in a downsampling 216 operation, the first image 610 the second image 620 may be reduced in resolution to generate downsampled images 610' and 620', respectively. For instance, downsampled images 610' and 620' may be on the order of 5 m, 10 m, 15 m, or lower resolution.

Figure 12B:
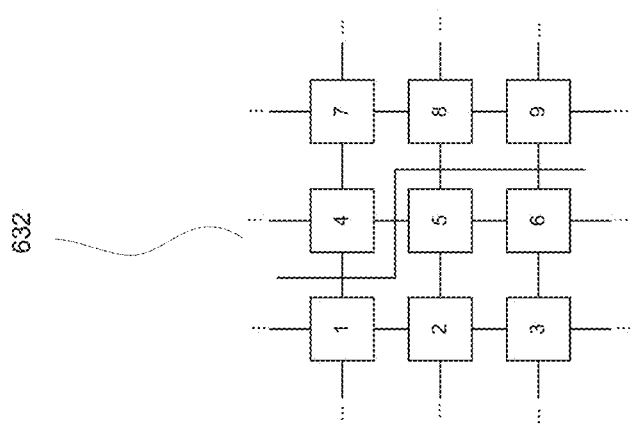
FIGS. 12A and 12B illustrate an example of an application of a cost function to automatically determine a cutline through a plurality of pixels of two images to be merged according to an embodiment of an automatic cutline generation process.
Figure 12A:
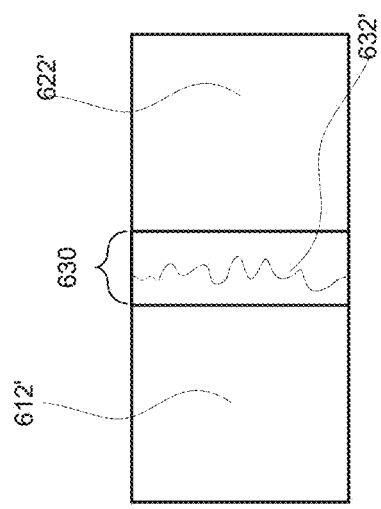

With additional reference to FIGS. 12A and 12B, the automatic cutline generation process 210 may include determining 218 a low resolution cutline 632' in an overlapping portion 630 of the downsampled images 610' and 620'. For example, in an embodiment, the determining 218 may include calculating a cost function between pixels for the overlapping portions of the first image 610' and the second image 620' to determine the low resolution cutline 632' among the overlapping pixels such that the radiometric differences between adjacent pixels of the first image 610' and the second image 620' may be minimized along the low resolution cutline 632'.

For example, with further reference to FIGS. 12A and 12B, one such example of cost function is graphically depicted. In FIG. 12A, the downsampled image data 612' for the first image 610' and the downsampled image data 622' for the second image 620' are overlaid so that an overlapping portion 630 is shown. In this regard, for each pixel in the overlapping portion 630, a pixel value (or multiple pixel values in the case of a multispectral image) may be provided from image data 612' and a pixel value (or multiple pixel values in the case of a multispectral image) may be provided from image data 622'. In this regard, the low resolution cutline 632' may be determined in the overlapping portion 630 of the first image 610' and a second image 620'.

With further reference to FIG. 12B, a subset of pixels numbered 1 through 9 are shown for illustration purposes that correspond to overlapping pixels in the overlapping region 630. While these pixels are described for purposes of illustration, it may be appreciated that additional pixels may be provided. For each of the pixels 1 through 9 shown in FIG. 12B, a pixel exist from both the first image 610' and the second image 620'. An embodiment of a cost function may be employed to quantify the radiometric difference between adjacent pixels taken from each image. That is, for example, for pixel 1, the pixel data from the first image data 612' may be used and for pixel 4, the pixel data from the second image data 622' may be used. In turn, the adjacent pixel values from the two images 610' and 620' may be compared. This comparison may be made for each pixel (e.g., along the horizontal direction, the vertical direction, or both). For example, intensity values for one or more spectral bands (e.g., a color difference) between the pairs of adjacent pixels from the first image 610' and the second image 620' to determine which of the adjacent pixels from the two images has the most similar color. For instance, such a cost function may be expressed as:

$$M(s,t,A,B)=\|A(s)-B(s)\|+\|A(t)-B(t)\|$$ Equation 21 where s and t refer to adjacent pixel positions as shown in FIG. 12B, A(s) corresponds to the pixel intensity data at position s in the first image 610', B(s) corresponds to pixel intensity data at position s in the second image 620', A(t) corresponds the pixel intensity data at position t in the first image 610', B(t) corresponds to the pixel intensity data at position t in the second image 620', and $\|\bullet\|$ denotes an appropriate norm such as the absolute value as shown. As may be appreciated, Equation 21 may be normalized for a plurality of spectral bands. For example, in an embodiment, a given value of A(s) may be expressed as:

$$A(s)=\alpha \times A(s_r)+\beta \times A(s_b)+\gamma \times A(s_g)$$ Equation 22 where $\alpha$, $\beta$, and $\gamma$ are weighting values, $s_r$ is the intensity value for pixel s in the red band, $s_b$ is the intensity value for pixel s in the blue band, and $s_g$ is the intensity value for pixel s in the green band. As may be appreciated, Equation 22 for A(s) may be generalized for application for A(t), B(s), and B(t) in Equation 21.

Accordingly, a cost value between each adjacent pixel pair in the overlap region 630 may calculated using Equation 21 and 22. The low resolution cutline 632' may then be determined based on the value to the cost function between adjacent pixels such that the low resolution cutline 632' passes between pixels with the minimum cost function (i.e., representing the least radiometric difference) between the two pixels.

Figure 13:
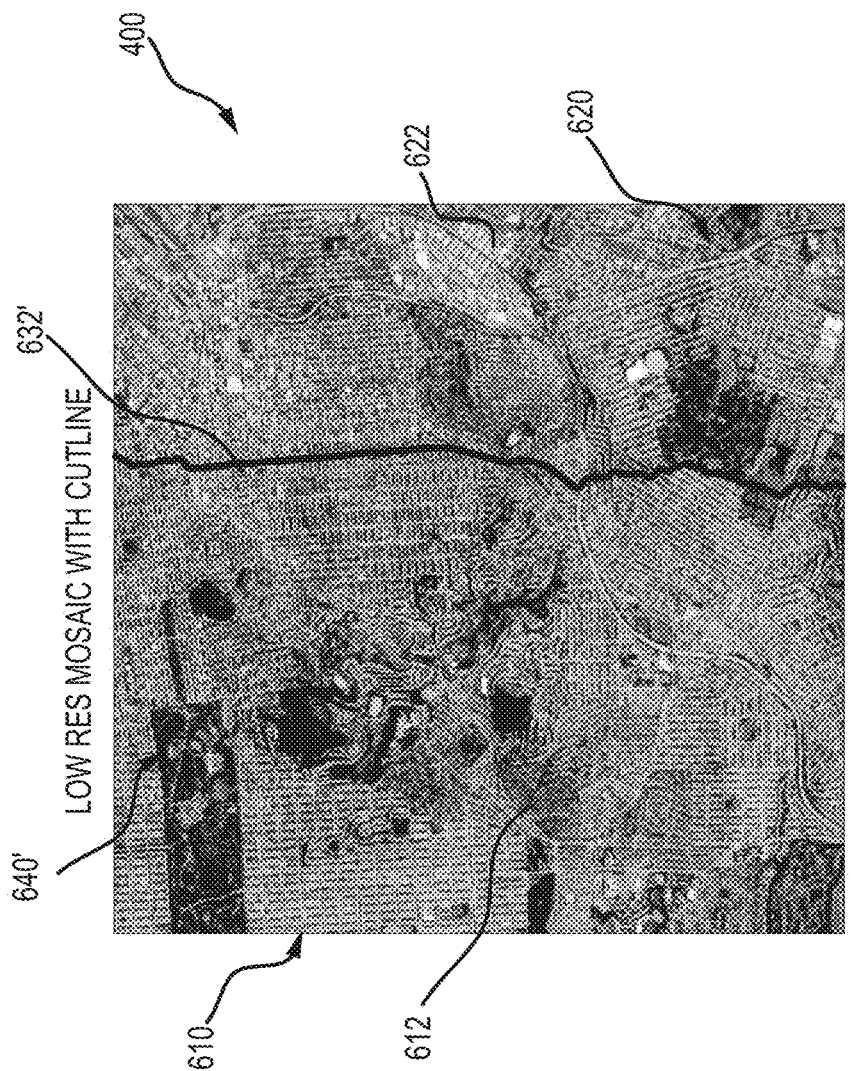
FIG. 13 illustrates a low resolution cutline shown on low resolution images corresponding to the images of FIG. 11 according to an embodiment of an automatic cutline generation process.
Figure 14:
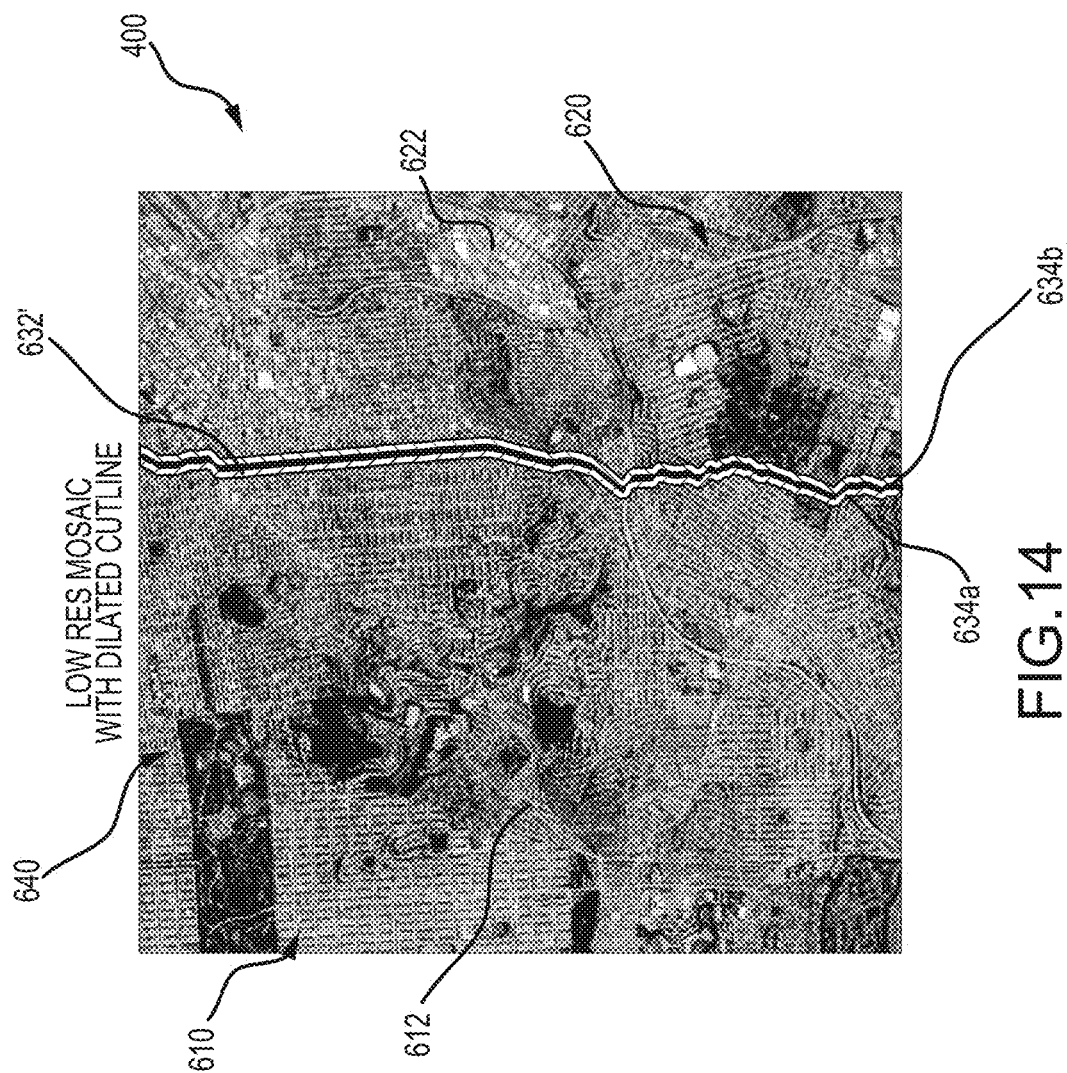
FIG. 14 illustrates an expanded low resolution cutline that defines a cutline area to be analyzed in the high resolution images according to an embodiment of an automatic cutline generation process.

In this regard, shown in FIG. 12B, the minimum costs may be between pixels 1 and 4, pixels 4 and 5, pixels 5 and 8, and pixel 6 and nine 9, such that the low resolution cutline 632' passes between these pixels. In this regard, pixels 1, 2, 3, 5, and 6 in a resulting low resolution merged image 640' (e.g., as shown in FIG. 13) may be pixels from the first image 610' and pixels 4, 7, 8, and 9 may be pixels from the second image 620'. Accordingly, with further reference to FIG. 13, a low resolution merged image 640' is depicted wherein image data 612' is included to the left side of the low resolution cutline 632' and image data 622' is included to the right side of the cutline 632'.

With continued reference to FIG. 10, the automatic cutline generation process 210 may include expanding 220 the low resolution cutline 632' to define a cutline area 636 defined by boundaries 638a and 638b (shown in FIG. 15) corresponding to the expanded 220 low resolution cutline 632'. For example, with reference to FIG. 14, the cutline area 636 may include an expanded portion 634a to the left of the low-resolution cutline 632' (e.g., between the low resolution cutline 632' and boundary 638a) and an expanded portion 634b to the right of the low-resolution cutline 632' (e.g., between low resolution cutline 632' and boundary 638b).

The expanding 222 of the low-resolution cutline 632' may include expansion to a predetermined number of pixels to either side of the low resolution cutline 632' along the length of the cutline 632' to define the cutline area 636. In this regard, the cutline area 636 determined by expanding the low resolution cutline 632' may be defined for images 610' and 620'.

As images 610' and 620' may correspond to full resolution images 610 and 620, upon determination of the boundaries of the cutline area 636 in the low resolution images 610' and 620', the boundaries 638a and 638b may also be applied to the high resolution images 610 and 620. That is, the cutline area 636 (e.g., or the boundaries 638a and 638b thereof) may be applied 222 to the high resolution images 610 and 620 (e.g., an overlapping portion 630 thereof) to define a cutline area 636 in the high resolution images 610 and 620. As may be appreciated, the cutline area 636 in the high resolution images 610 and 620 may correspond to a subset of the total number of pixels in the high resolution images 610 and 620.

Accordingly, the cutline area 636 may define a subset of overlapping pixels from the high-resolution images 610 and 620 in which a second iteration of a cost function may be applied to the overlapping pixels to determine a high-resolution cutline 632 within the cutline area 636 of the high resolution images 610 and 620. In this regard, the automatic cutline generation process 210 may include determining 224 a high resolution cutline 632 in the cutline area 636 defined collectively by the first expanded portion 634a and the second expanded portion 634b (e.g., using a similar approach described above relative to the pixels of the low resolution images).

Figure 15:
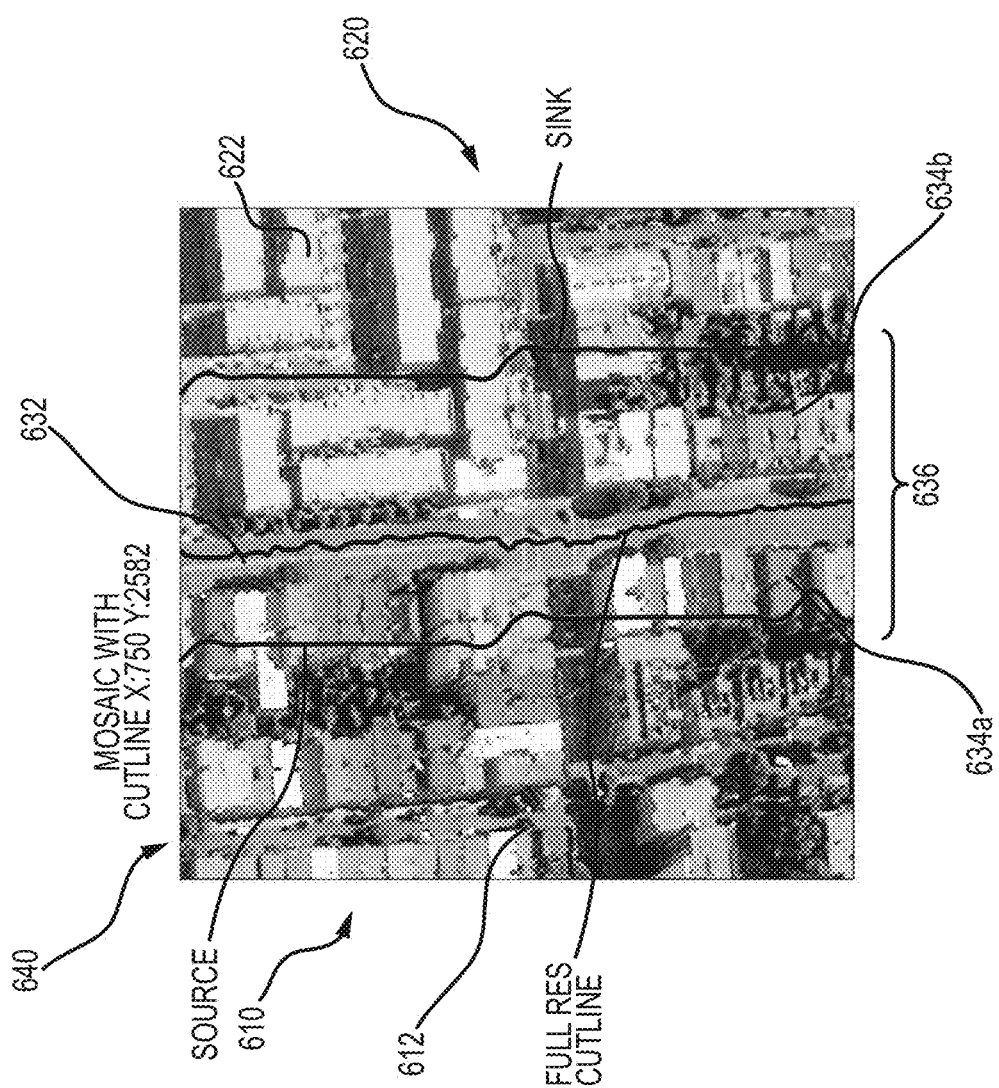
FIG. 15 depicts a detailed view of high resolution images having a cutline area defined therein in which a high resolution cutline is determined according to an embodiment of an automatic cutline generation process.

Accordingly, with further reference to FIG. 15, a portion of a full resolution merged image 640 is depicted. As may be appreciated, the cutline area 636 may extend between the boundaries 638a and 638b of the first expanded portion 634a and the second expanded portion 634b which may be provided a certain number of pixels away from original low-resolution cutline applied to high-resolution images 610 and 620. The pixels contained within the cutline area 636 may then undergo a similar cost function analysis as described above where in the minimum cost function is determined 224 between each of the pixels existing in the cutline area 636 to determine 224 the high resolution cutline 632.

As such, the automatic cutline generation process 210 may include merging 226 the high-resolution images 610 and 620 at the high resolution cutline 632 such that pixels to one side of the high-resolution cutline 632 are be provided from the first image 610 whereas pixels to the other side of the high-resolution cutline 632 are provided from the second image 620. As may be noted from FIG. 15, the high-resolution cutline 632 may deviate from the path of the low-resolution cutline 632' (which would run parallel at the midpoint between the extent of the first expanded portion 634a and the second expanded portion 634b in FIG. 15).

In another approach that may be applied to determine the placement of a cutline (e.g., either a high resolution cutline 632 in the high resolution version or a low resolution cutline 632' in the low resolution version 632), a min-cut/max-flow algorithm may be utilized to determine the placement of the cutline between adjacent pixels from respective ones of the adjacent images. The utilization of such a max flow algorithm is generally described in Boykov, Yuri and Kolmogorov, Vladimir, An Experimental Comparison of Min-Cut/Max-Flow Algorithms for Energy Minimization in Vision, In IEEE Transactions on PAMI, Vol. 26, No. 9, pp. 1124-1137, September 2004, the entirety of which is incorporated herein by reference. The approach generally taken in the min-cut/max-flow algorithm include interpreting each pixel in an image as a node having an edge extending between nodes. The "edges" may have defined attributes (e.g., in relation to the nodes the edges connect). In this regard, the edges may be analogized to pipes with various capacities to carry water. As such, the edges that provide the maximum "flow" of the analogized water from a source (e.g., a first image 610) to a sink (e.g., a second image) may also provide the cutline that minimizes differences between radiometric properties of adjacent nodes, where the characterization of the edges corresponds to the radiometric differences between nodes. It may be appreciated that the min-cut/max-flow may be applied to determine either or both of the low resolution cutline 632' and/or the high resolution cutline 632 in the foregoing description of the automatic cutline generation process 210.

Figure 16:
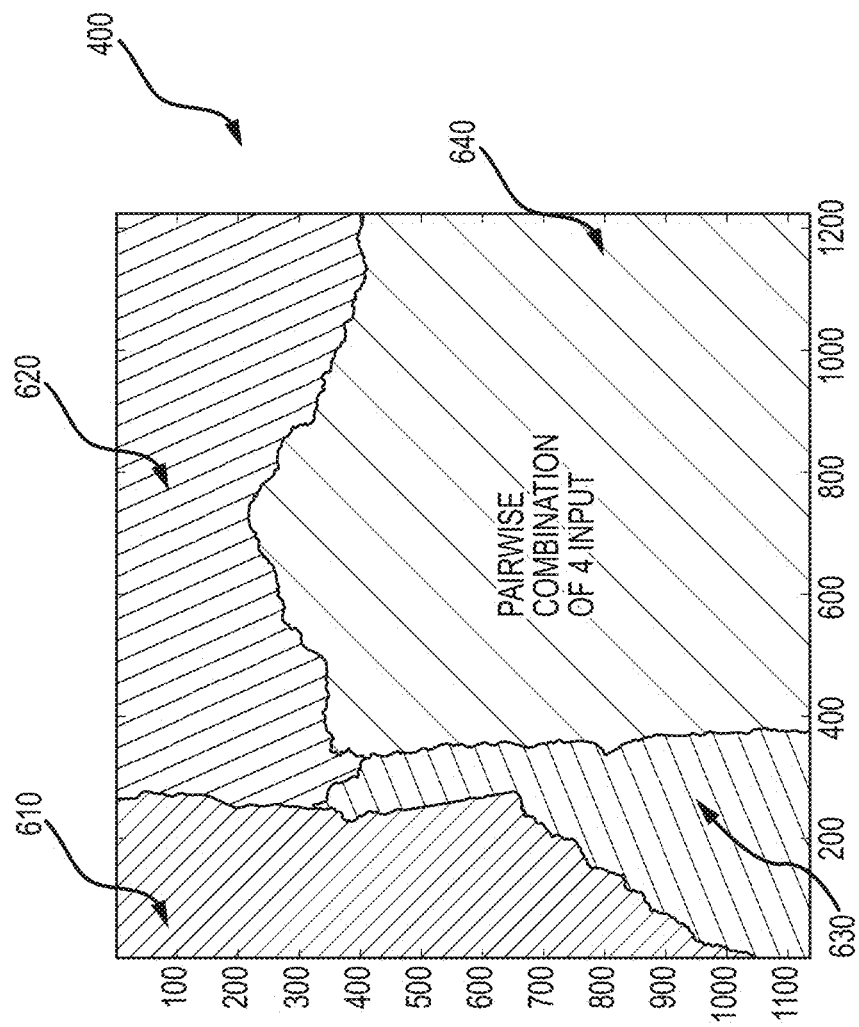
FIG. 16 illustrates the applicability of an embodiment of an automatic cutline generation process to merge more than two images.

FIG. 16 depicts another embodiment for an application of the automatic cutline generation process 210 whereby more than two images may be merged. For example, shown in FIG. 16, a total of four images 610 through 640 may be merged with automatic cutline generation 210 occurring between each of the images. In this regard, the process 210 described above may generally be repeated for these additional images. That is, the process 210 may include downsampling 216 each of the images, determining 218 a low resolution cutline 632' for pairs of the downsampled images, expanding 220 the low-resolution cutline 632' to define a cutline area 636, applying 222 the cutline area to pairs of high resolution images, and then determining 224 a high resolution cutline 632 defining the boundary for merging 226 pairs of the images. In this regard, the process 210 may proceed in a pairwise fashion with respect to pairs of the plurality of images 610-640. The order of operation for the pairs of images may be determined by a heuristic. For example, the heuristic may first select the image from the plurality of images 610-640 with the largest coverage for the area (i.e., the image with the most number of pixels in the area) and merge that image with another of the plurality of images that will add the largest number of merged pixels to the accumulated image. In this regard, this value corresponding to the largest number of pixels that will be added may be determined by separately calculating that value with each other image to determine which image in fact would contribute the largest number of merged pixels to the merged image. This heuristic may continue to merge the image with the next smallest number of pixels that will be added until all images have been merged. In this regard, this application of merging more than two images may be applied in this fashion to any more than two images to be merged.

It has also been found that performing at least a portion of the foregoing automatic cutline generation process 210 with a GPU may provide considerable performance benefits. For example, especially when calculating a cost function to determine the location of the low resolution cutline 632' and the high resolution cutline 632, a GPU may be effectively employed. That is, many highly parallel calculations are involved such that use of one or more GPUs to perform such processing may realize substantial (e.g., one or more orders of magnitude) speed increases as compared to execution using a CPU. Accordingly, at least a portion of the automatic cutline generation process 210 may be adapted for execution at one or more GPUs utilizing parallel computing.

With reference to FIG. 1, the mosaic generator 10 may further include a radiometric normalization module 300. The radiometric normalization module 300 may receive selected source images 22 from the source selection module 100 and/or merged images 640 from the automatic cutline generation module 200. In either regard, the received images (collectively defined by selected source images 22 and merged images 640) may include full resolution images that correspond to a tile 400. While discussed in the context of processing geospatial source images 22, it may be appreciated that the operation of a radiometric normalization module 200 as discussed herein need not be limited to processing geospatial source images 22. The discussion herein may, however, present particular advantages in the context of processing geospatial source images 22 or, as discussed in greater detail below, in the context of radiometric normalization of a plurality of orthomosaic image layers.

As may be appreciated, while the radiometric properties of the various selected images 22 for the mosaic 30 may all be relatively similar based on the automatic source selection process 110 described above utilizing a uniform color base layer image 40, there may still be radiometric differences existing between the images 22 received by the radiometric normalization module 300. In this regard, it may be advantageous to perform some degree of radiometric normalization on the images to produce a mosaic 30 with a more uniform appearance.

Figure 17:
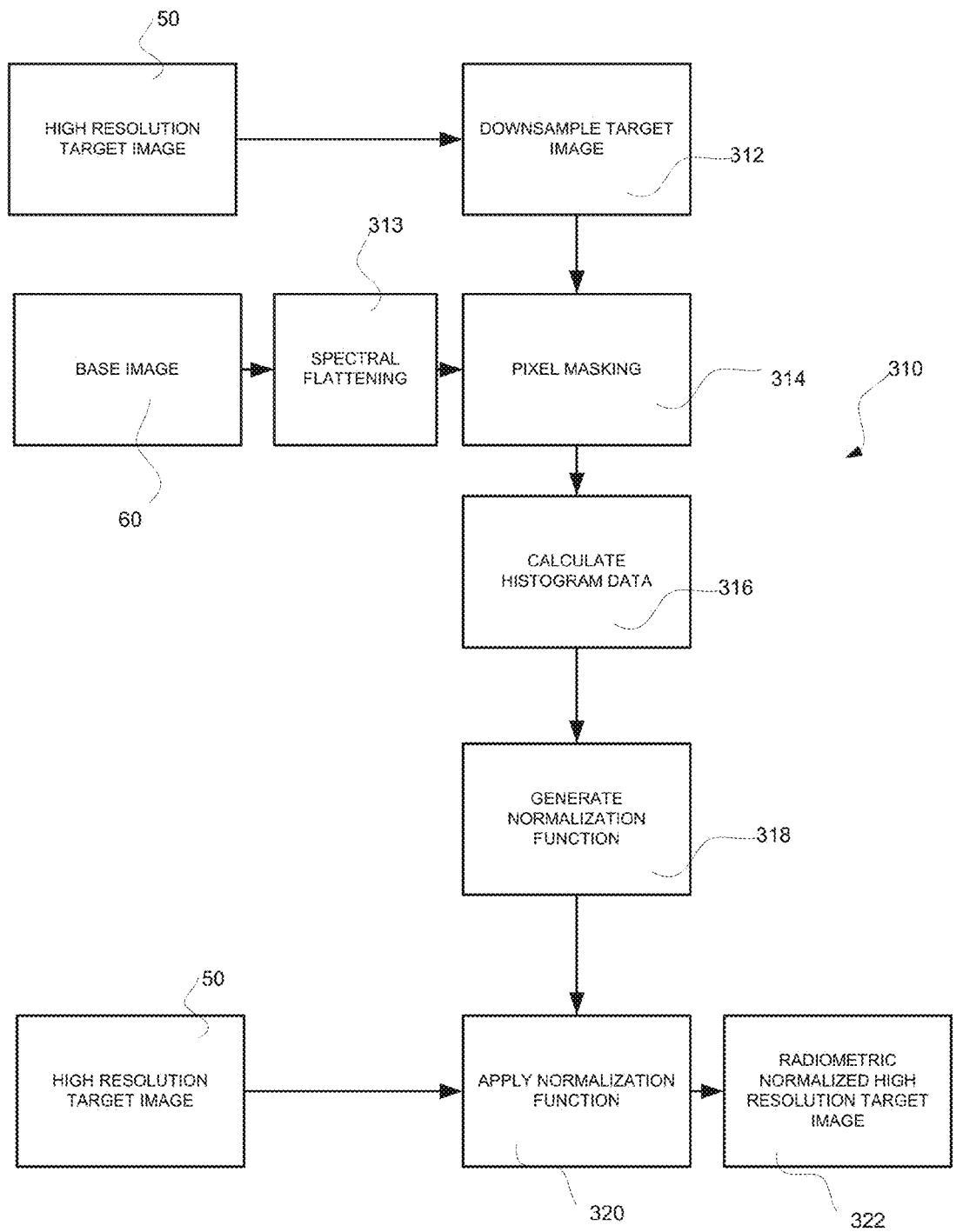
FIG. 17 depicts a flow chart corresponding to an embodiment of a radiometric normalization process.

Accordingly, with reference to FIG. 17, one embodiment of a radiometric normalization process 310 described herein may include analyzing a target image and a base image to produce information (e.g., metadata) regarding the images. From this metadata, a comparison of the images may be made to generate a normalization function that may be applied to the target image to normalize the target image with respect to a base image. For example, the process 310 may include performing histogram matching between a target image 50 to be modified and a base image 60. In this regard, the target image 50 to be modified may correspond to the source images 22 received from the image source selection module 100 and/or merged images 640 received from the automatic outline generation module 200. The base image 60 may be a corresponding base layer chip 44 from a base layer image 40 as described above. In particular, a histogram matching technique may be used that employs histogram data for the target image 50 that is resolution independent such that the histogram data used in the histogram matching may be calculated based on a downsampled or low resolution version of a target image 50' rather than having to calculate the histogram data for a full resolution image 50. In this regard, the speed at which the calculation of the histogram data is performed may be significantly increased. That is, even for high-resolution target images 50, a low-resolution, downsampled version of the high-resolution target image 50' may be created (e.g., utilizing a downsampling module 26) to determine histogram data for use in the histogram matching as is described in greater detail below. In turn, a normalization function may be generated that is applied to the target image 50 based on a comparison of low-resolution histogram data from the image.

Furthermore, it may be appreciated that in some circumstances the target image 50 and/or base image 60 may contain pixels which may influence the image histogram in adverse ways. As such, the radiometric normalization module 300 may employ a masking technique (described in greater detail below) to generate an exclusion mask for those pixels which are not to be included in histogram computation, thus resulting in better histogram matching results and reduced computational overhead as pixels that adversely skew the results may be excluded by way of the exclusion mask and, thus, not be considered for the target image 50 or 50' and/or base image 60 based when calculating histogram data.

Further still, the radiometric normalization module 300 described herein may utilize spectral flattening for at least one of the target image 50 or base image 60 which may allow for production of target images 50 in which the intensity of the target image 50 matches the intensity the base image 60, even if the base image 60 is comprised of multiple spectral channels. In this regard, the radiometric normalization module 300 may be adapted to execute on panchromatic (comprised of a single spectral channel or black-and-white) target imagery 50.

With further reference to FIG. 17, a radiometric normalization process 310 represented as a flowchart in FIG. 17. In this regard, the radiometric normalization process 310 will be described with further reference to FIGS. 18-22.

The radiometric normalization process 310 may include downsampling 312 a high-resolution target image 50 (e.g., corresponding to at least a portion of a full resolution source image 22 or a merged image 640 corresponding portions of different full resolution source images 22) to produce a low resolution target image 50'. As described above, the downsampling 312 may include a reduction in the resolution of the high-resolution target image 50 such as, for example, from about 0.5 m to around 15 m after the downsampling 312. The downsampling 312 may be performed by the downsampling module 26.

The radiometric normalization process 310 may include accessing a base image 60 to which the target image 50 is to be normalized. For example, the base image 60 may correspond to the base layer image 40 described above. The radiometric normalization process 310 may optionally include spectral flattening 313 of the base image 60. As such, the radiometric normalization process 310 may be been adapted to be performed for panchromatic (i.e., comprised of a single spectral channel, or a "black and white" or grayscale image) target imagery 50. The spectral flattening 313 of the base image 60 may allow for radiometric normalization of a panchromatic target image 50 using a base image 60 composed of multiple spectral channels (e.g., a multi-spectral color image). The spectral flattening 313 may be provided via a mathematical operation as follows:

$$f(x, y) = \frac{1}{n}\sum_{i=1}^{n} p_i(x, y) \qquad \text{Equation 23}$$

where f(x,y) indicates the spectrally flattened value at image position x,y; n is the number of spectral channels; and $p_i(x,y)$ indicates the gray level pixel value in band i at location x,y.

The radiometric normalization process 310 may also include masking 314 the base image 60 and/or the downsampled target image 50'. As alluded to above, in some circumstances the target image 50 and/or base image 60 may contain pixels that may adversely influence the calculation of histogram data. For example, a large area of the image may have a relatively uniform color (e.g., such as pixels associated with water or clouds) such that histogram data is skewed based on many pixels of a relatively uniform color.

Figure 18A:
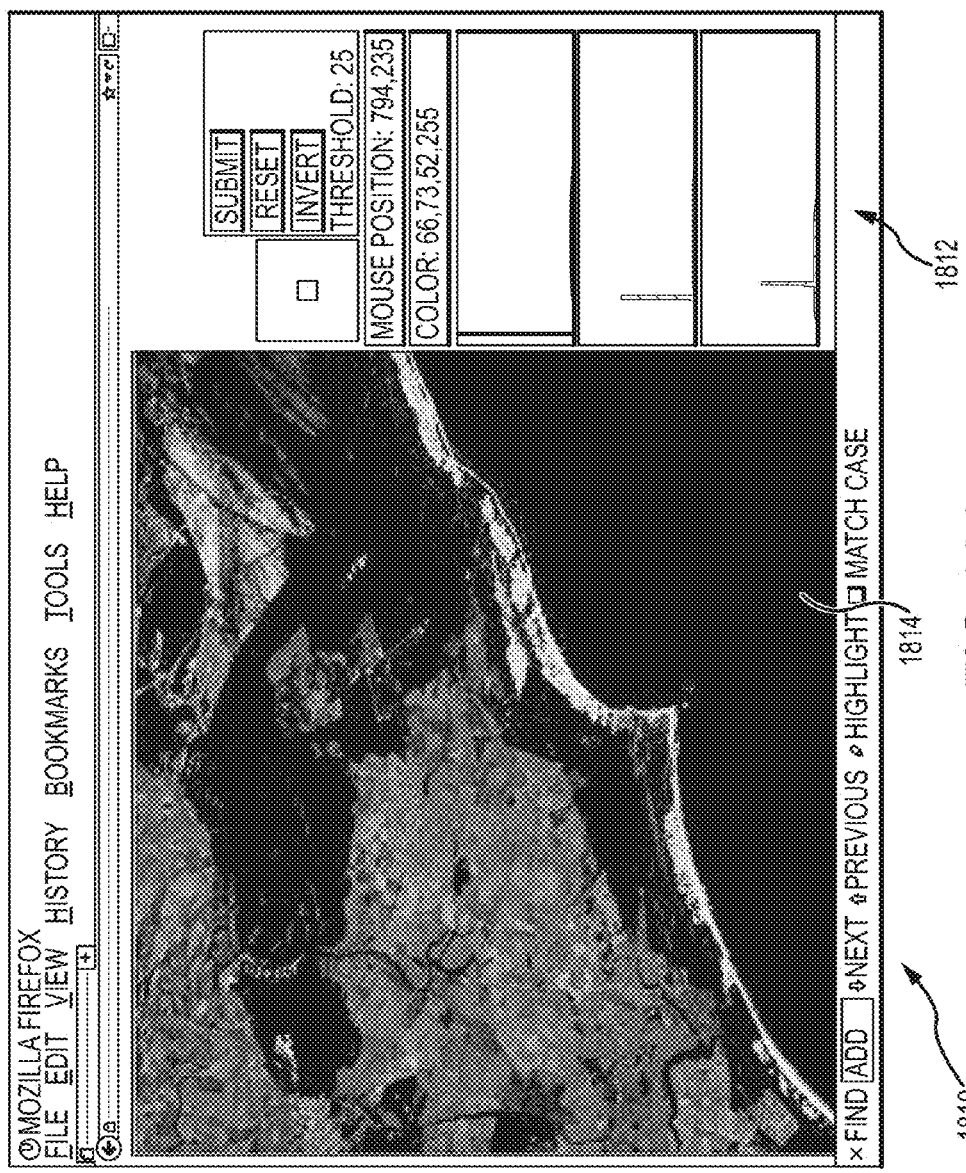
FIG. 18A depicts an embodiment of an image and corresponding histograms to illustrate anomalies created in the histogram when pixels corresponding to water are included.
Figure 18B:
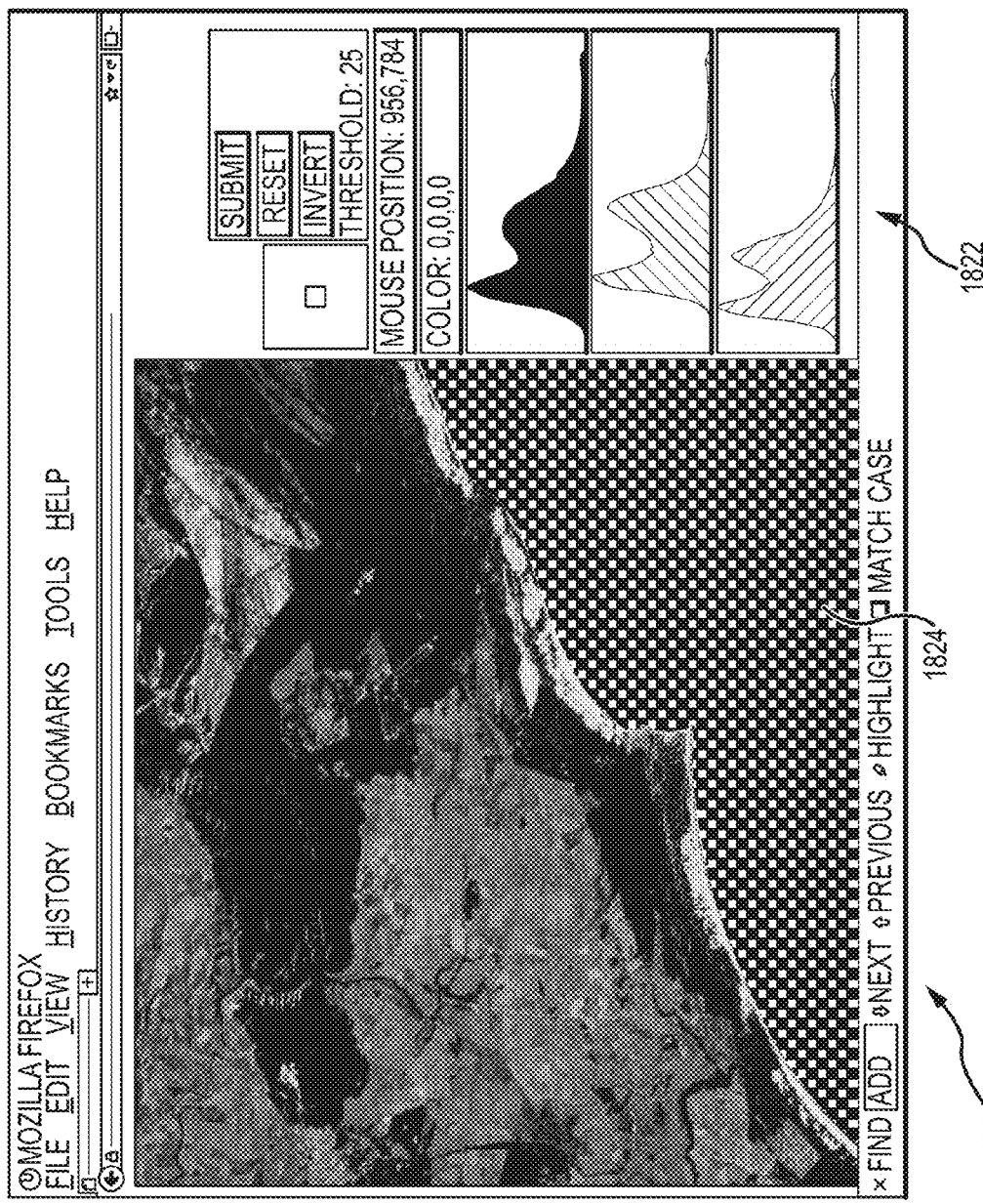
FIG. 18B depicts an embodiment of the image in FIG. 18A with a pixel mask applied to remove the pixels corresponding with water and the resulting histogram forms resulting therefrom.

Accordingly, inclusion of such pixels when calculating histogram data may cause poor results in the radiometric normalization process 310. For example, in remotely sensed imagery from a satellite platform, water and cloudy pixels generally adversely affect the histogram data for an image. Accordingly, pixel masking 314 may be utilized to eliminate those pixels which should not be included in computing histogram data. An example of the effect on the histogram for water is shown in FIG. 18. The image 1810 on the left of FIG. 18 includes a number of pixels corresponding to water 1814. As may be appreciated, the corresponding histogram data 1812 for the image are skewed with very intense spikes occurring at the level associated with the pixels corresponding to water 1814. In contrast, the image 1820 on the right depicts image 1810 with a pixel mask 1824 applied to eliminate the pixels corresponding to the water 1814 from the image 1820. In this regard, the histogram data 1822 for the image 1820 contains a much more uniform distribution that is not skewed by the pixels 1814 corresponding to water.

As such, the pixel mask may be used to eliminate anomalous pixels from the calculation of the histogram data. An anomalous pixel may be associated with water or a cloud in the image. As such, the anomalous pixel may have a saturated value. Further still, anomalous pixels may be identified as a grouping (i.e., one or more pixels) of saturated pixels. In this regard, a saturated value may correspond to an intensity value in at least one spectral band at or near an extreme high or low value of the possible values (i.e., near 0 or 255 for an 8-bit image). For example, a pixel value or a collection of adjacent pixel values in the panchromatic spectrum at or near the high end of the dynamic range of the imagery (i.e., white pixels) may be attributed as an anomaly associated with a cloud. Further still, a pixel value or a collection of adjacent pixel values in the "blue" spectrum at or near the high end of the dynamic range of the imagery (i.e., blue pixels) may be attributed as an anomaly associated with a body of water. Further still, it may be advantageous or desirable to mask shadowed pixels in the imagery. Shadowed pixels may have pixel values on the lower end of the dynamic range of the imagery (i.e., black or nearly black pixels).

The exclusion mask is typically an image with the same dimensions as the input image, and has values of 0 (zero) for pixels which should be ignored during processing. In turn, non-zero values remain for pixels which should be included during processing. In the radiometric normalization process 310 described herein, an optional exclusion mask may be applicable to either the target image 50, the base image 60, or both. Because the exclusion mask may generally have the same resolution as the image to which it is applied, further performance savings in the workflow may be realized by generating the exclusion mask for the downsampled target image 50' versus the high resolution target image 50. In this regard, performance savings may be realized from lower time required to generate the exclusion mask for the downsampled target image 50' as compared to a greater time required to generate an exclusion mask for the full resolution image 50.

The radiometric normalization process 310 may also include calculating 314 histogram data. For example, histogram data may be calculated 314 for both the base image 60 as well as the downsampled target image 50'. As described above, if an exclusion mask is applied 314, the masked pixels may be excluded from the calculating 316. Once the histogram data for the base image 40 and the target image 50' have been calculated, the process 310 may include generating 318 a normalization function to be applied 320 to the target image 50. The generation 318 of a normalization function and application 320 of the normalization function to a target image may be referred to as "histogram matching."

As may be appreciated, histogram matching is an image processing technique that may be used for matching colors between images. The histogram data of an image corresponds to the probability distribution function (PDF) of gray level values in the image (or intensity of a color in a spectral band). Typically, images are composed of an array of discrete pixel values. The data type of the image determines the dynamic range (i.e., maximum/minimum values) of the image pixels. For example, an 8-bit image pixel is represented by a value, which is a minimum of 0 (corresponding to a completely black value) and a maximum value of 255 (corresponding to a completely white value). An 8-bit image with three spectral bands sometimes referred to as a 24-bit color image because the pixels each have eight bits multiplied by three spectral bands (e.g., red, blue, and green) which gives 24-bit color information for each pixel.

Figure 19:
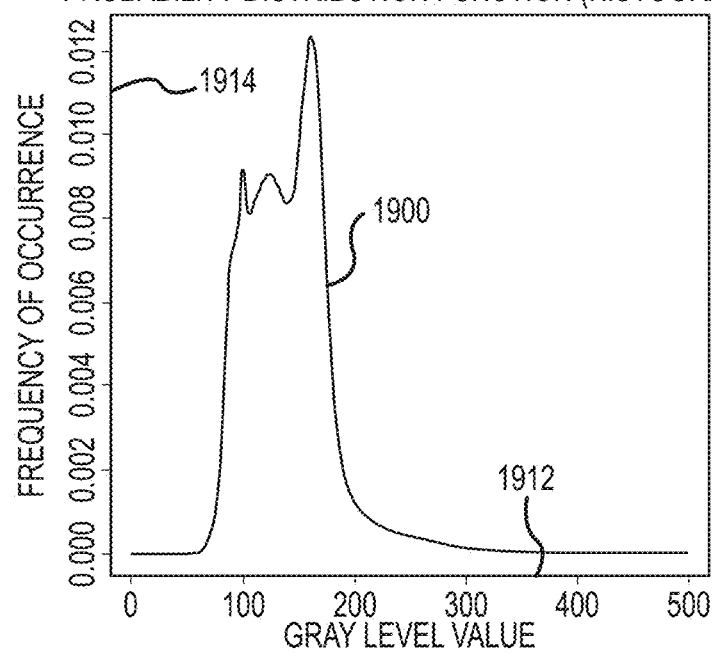
FIGS. 19-20 depict embodiments of plots of histogram data generated from an image.

The histogram data of an image may be represented as a function $m_i$ that counts the number of pixels in the image at a different gray level values, which may also be referred to as "bins." If n is the total number of pixels in the image, then the histogram data satisfies the following condition:

$$n = \sum_{i=0}^{k} m_i \quad \text{Equation 24}$$

where k typically is set to the maximum gray value in the image and $m_i$ represents the number of pixels in bin i. In this regard, for an 8 bit image k=255 (the largest possible gray value) and the number of bins is 256 (the total number of gray values) for the histogram. The histogram may be determined by scanning the image pixel by pixel and determining how many pixels are at each discrete gray level value in the image that may then be plotted. For example, a histogram 1900 of an image is shown in FIG. 19. In FIG. 19, the horizontal axis 1912 corresponds to the plurality of bins and the vertical axis 1914 corresponds to the frequency of occurrence of the gray scale values for each of the pixels for each corresponding one of the plurality of bins 1912. In this regard, the calculating 314 of the histogram data may include calculating the PDF 1900 for a base image 60 as well as a downsampled target image 50'.

In addition to the PDF value described above, a cumulative distribution function (CDF) may also comprise the histogram data that is calculated 314. The CDF describes the probability that a gray value in the image with a given probability distribution will be found at a value less than or equal to a bin value. The CDF may have the same number of bins as the PDF. However, the frequency of occurrence for each pixel in the image for the CDF may be derived from the PDF as follows:

$$M_i = \sum_{j=0}^{i} m_j \quad \text{Equation 25}$$

Figure 20:
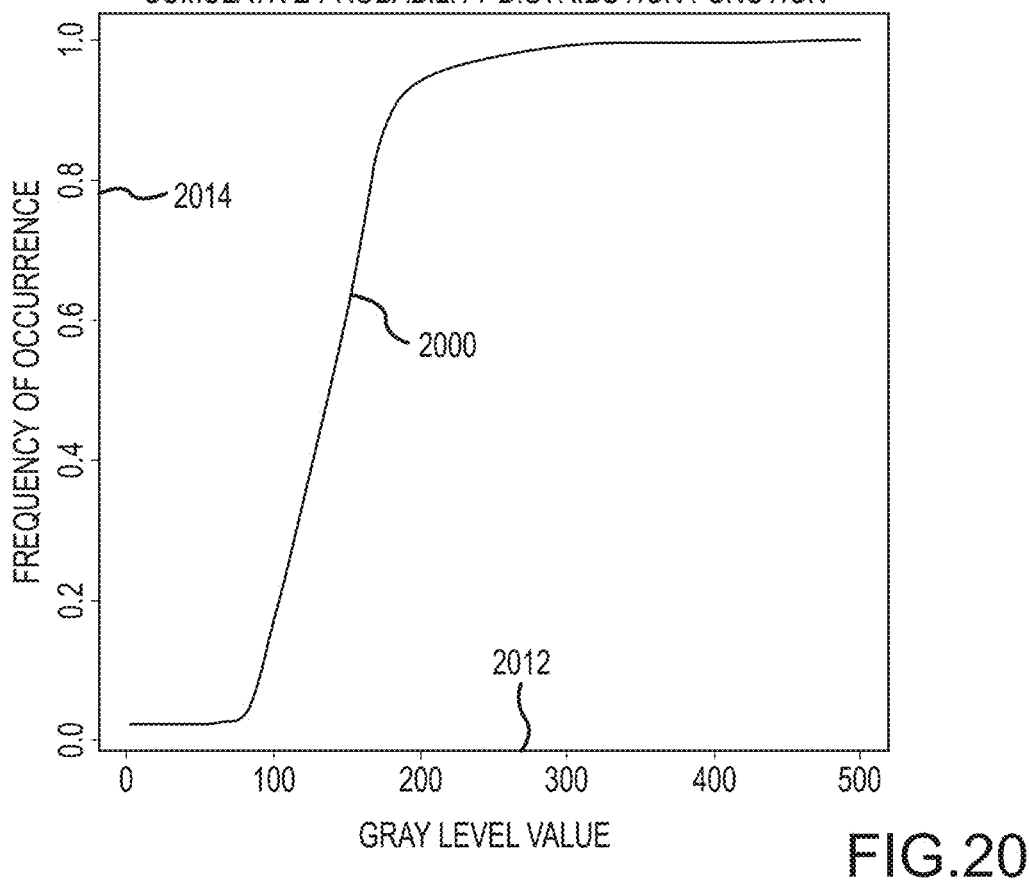

For example, the CDF function 2000 for an image is shown in FIG. 20. In FIG. 20, the horizontal axis 2012 represents the plurality of bins for the image and the vertical axis 2014 represents the probability of the occurrence of a pixel at or less than a given bin value in the image. As such, the calculating 314 of the histogram data may include calculating the CDF 2000 for a base image 60 as well as a downsampled target image 50'.

In this regard, it may be appreciated that a comparison of the CDFs 2000 of the target image 50' and the base image 60 may be used to generate 318 a normalization function that may be applied to a target image 50 to manipulate the target image 50 such that the histogram of the target image 50 may be matched to that of the base image 60. In this regard, the normalization function may provide a nonlinear transformation of gray level values of the target image 50 to the gray level values in the base image 60. The transformation may be based on a comparison of the CDFs 2000 for both the target image 50' the base image 60. Furthermore, because the CDF 2000 is a monotonically increasing function, it may possible to generate the normalization function for images with different bit depths. For example, an 11-bit image may be matched to an 8-bit image.

In this regard, a normalization function may be generated that is mathematically described as:

$$f(x)=g^{-1}(h(x))$$ Equation 26 where x is the original gray level value in the target image 50', h(x) is the cumulative distribution function of the target image 50', and $g^{-1}()$ is the inverse of the cumulative distribution function of the base image 60.

Figure 21:
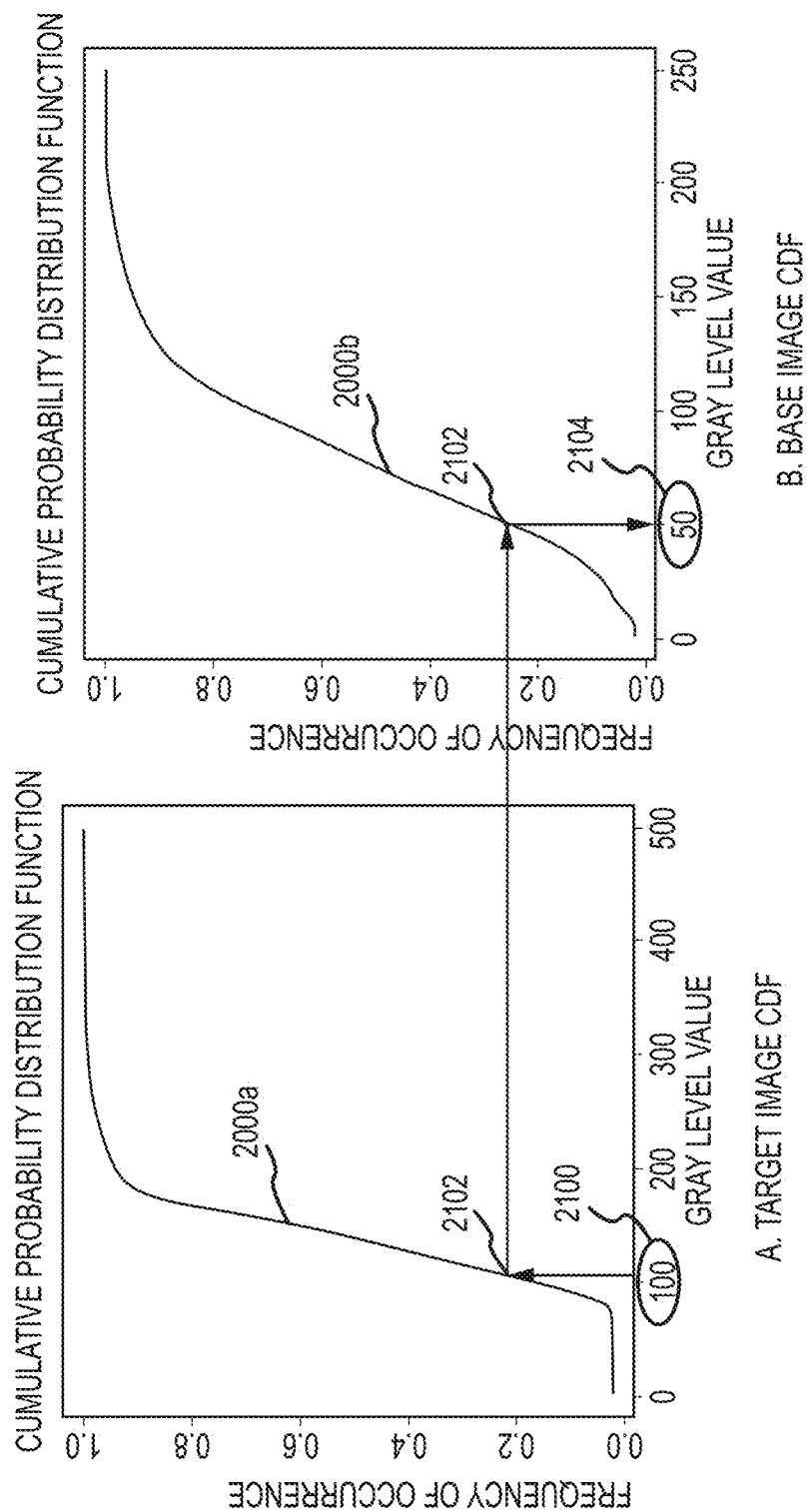
FIG. 21 graphically illustrates an embodiment of determining a normalization function by comparing histogram data of a target image to histogram data of a source image.

The process for generating 318 a normalization function is graphically depicted in FIG. 21. In FIG. 21, for a given gray level value 2100 in the target image 50', a corresponding value 2102 on the CDF 2000a for the target image 50' is determined. That same corresponding value 2102 is located in the CDF 2000b for the base image 60. In turn, a gray level value 2104 for the base image 60 is determined that corresponds to the value 2102 in the CDF 2000b for the base image 60. In turn, the gray level values 2100 in the target image 50 may be manipulated to correspond to the gray level value 2104 from the base image 60 by way of a normalization function. As may be appreciated, performing the foregoing correlation between each gray level value may provide a result in the form of a function f(x). The function f(x) may be represented as a look up table (LUT) matching target image 50 gray scale values to base image 60 gray scale values according to the process depicted in FIG. 21 for efficiency.

In turn, the radiometric normalization process 310 may include applying the normalization function f(x) to the full resolution target image 50 to produce a radiometrically normalized target image 322 for inclusion in the mosaic 30.

The advantage of downsampling 312 of the high resolution target image 50 may be appreciated when considering that computing the PDF 1900 of a large image can be very time consuming. As an example, for a test image 50 with 16-bit depth (pixel values ranging from 0-65535) and 4 spectral bands, with dimensions 42,840 samples×242,352 lines, computing the PDF 1900 of the image 50 was measured to take 28 minutes, 45 seconds. In contrast, computing the PDF 1900 of a downsampled version of the original image 50' is much faster. For this test the original full resolution image 50 was reduced in size by a factor of 30 in both the x and y directions. The time to compute the PDF 1900 for the reduced resolution image 50' was measured to be 1.48 seconds. This represents a speedup of 1165 times. With very large images, reading data off of disk becomes the major limiting factor for performance. Accordingly, a significant performance improvement for histogram matching has been realized by skipping entirely the computation of the PDF 1900 of the full resolution image 50. Instead, the PDF 1900 of the reduced resolution image 50' is computed, which represents significant time savings. In this manner the histogram matching proceeds indirectly, since the histogram of the reduced resolution image 50' (rather than the histogram of the full resolution image 50) is used during histogram matching. As such, the radiometric normalization process 310 may be referred to as an indirect histogram matching approach.

Figure 22:
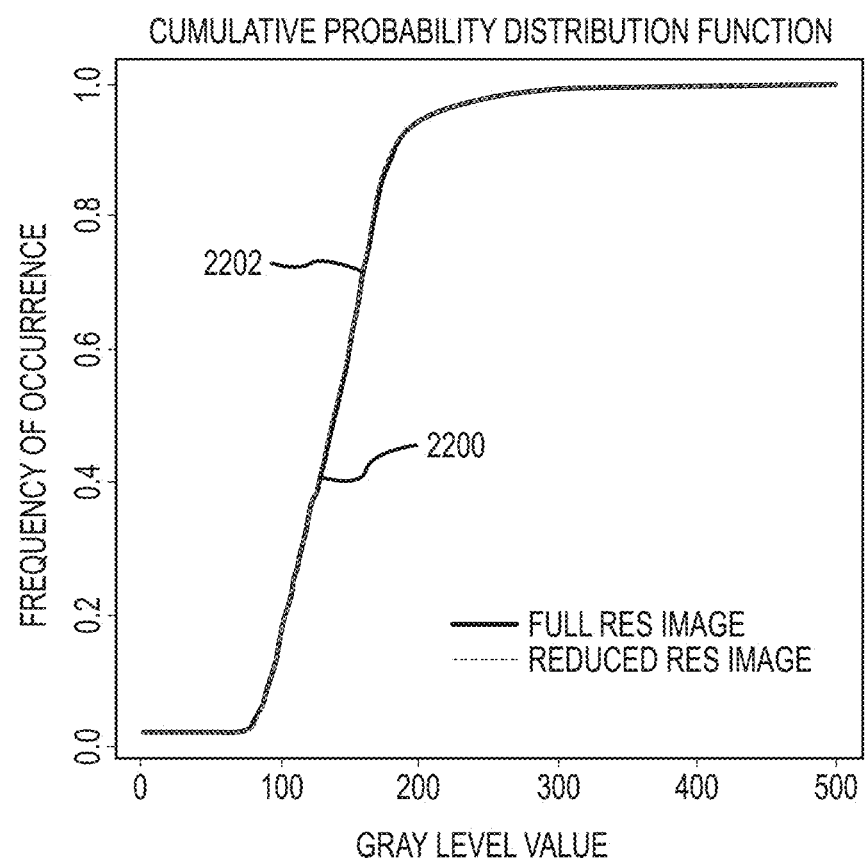
FIG. 22 graphically illustrates the similarity in histogram data for a downsampled image compared to histogram data for a full resolution image of the downsampled image.

In turn, the CDF 2000 may also only be calculated for the low resolution target image 50' during the calculating 314 of the histogram data. This modification may be possible because the CDFs 2000 of the full resolution target image 50 and the reduced resolution target image 50' may be very similar, as shown in FIG. 22. In FIG. 22, line 2200 represents the CDF of a full resolution image 50 and line 2210 represents the CDF of a downsampled image 50'. As may be appreciated, the results are nearly identical. As such, there is no perceptible loss of image quality by using the CDF 2210 of the reduced resolution image 50' in place of the CDF 2200 of the full resolution image 50. For instance, in Table 1, the statistics of the direct and indirect matched images are presented for each band of the images. The statistics of the images are virtually identical, demonstrating negligible loss of image quality as a result of using the indirect matching method. In some systems the downsampled image 50' may be generated efficiently by processing parts of the image in parallel or processing the imagery on the GPU.

TABLE 1

| Measurement | Min | Max | Mean | Std. Dev |
|---|---|---|---|---|
| Direct Band 1 | 0 | 249 | 110.98 | 51.60 |
| Indirect Band 1 | 0 | 249 | 111.48 | 51.66 |
| Delta Band 1 | 0 | 0 | −0.5 | −0.06 |
| Direct Band 2 | 0 | 250 | 115.18 | 45.28 |
| Indirect Band 2 | 0 | 250 | 115.41 | 45.64 |
| Delta Band 2 | 0 | 0 | −0.23 | −0.36 |
| Direct Band 3 | 0 | 227 | 81.52 | 41.09 |
| Indirect Band 3 | 0 | 227 | 82.02 | 41.66 |
| Delta Band 3 | 0 | 0 | −0.5 | −0.57 |

It has also been found that performing at least a portion of the foregoing radiometric normalization process with a GPU may provide considerable performance benefits. That is, many highly parallel calculations are involved such that use of one or more GPUs to perform such processing may realize substantial (e.g., one or more orders of magnitude) speed increases as compared to execution using a CPU. Accordingly, at least a portion of the radiometric normalization process may be adapted for execution at one or more GPUs utilizing parallel computing.

Figure 23:
FIG. 23 depicts an embodiment of the completed mosaic generated by an embodiment of automatic mosaic generation.

In view of the foregoing, it may be appreciated that each of the automatic source selection, automatic outline generation, and radiometric normalization may be utilized to produce a high spatial resolution orthomosaic image from source geospatial images as described above. For instance, a finished orthomosaic 30 for the area of interest 400 corresponding with Sardinia is shown in FIG. 23. In this regard, for each tile 400 in the area of interest 400, the selected chip 24 may be disposed in the mosaic based on the corresponding geographic coverage of the chip 24. That is, the selected images 22 may be located in the mosaic 30 based on their geographic coverage.

Notably, the foregoing description includes automated processes such that upon identification of an area of interest and an identification of source of geospatial images, the process for generating a mosaic may be, in at least some embodiments, completely automated. Further still, given the highly parallel nature of the processes, execution with one or more GPUs performing parallel processing may significantly speed the generation of an orthomosaic 30. For example, traditional orthomosaic generation utilizing human operators making subjective decisions regarding images and placement has taken from around one to three days to complete an orthomosaic covering roughly 150,000 km². In contrast, automated orthomosaic generation utilizing the foregoing techniques has provided for about 720,000 km² of orthomosaics to be generated per day utilizing four GPU processing nodes. It is estimated that up to about 5,700,000 km² of orthomosaics may be generated per day utilizing 32 GPU processing nodes.

As may be appreciated, the ability to quickly provide such large, high spatial resolution orthomosaics 30 may be particularly useful in a number of contexts. Given the speed at which the foregoing process allows for orthomosaic generation, situations such as natural disasters, manmade disasters, war, large scale social events, or other situations may be documented or monitored much more quickly than previously possible. Further still, the efficient generation of orthomosaics may allow for increased archiving of orthomosaic "snapshots" to assist in research or monitoring of long term phenomena such as climate change research or the like.

Furthermore, it may be appreciated that one or more orthomosaic images 30 may be presented to a user via a user interface of a computing device (e.g., a desktop computer, a laptop computer, a tablet computing device, a smartphone, etc.) to allow the user to visualize a geographic area covered by the orthomosaic images. When viewing orthomosaic images of a geographic area, it may be beneficial to provide zooming functionality to allow a user to zoom in and out with respect to the geographic area and/or panning functionality to allow a user to pan a displayed area relative to the geographic area. Reference to "zooming" may correspond to changing the scale of the geographic area displayed such that more or less of a geographic area may be visible at any one time. In this regard, zooming in may result in a smaller portion of the geographic area being displayed, but at a greater magnification. When zooming out, more of the geographic area may be displayed to the user, albeit at a lesser magnification. As such, a plurality of zoom levels may be provided (e.g. predefined).

Additionally, when displaying a zoomable geospatial image to a user, it may be beneficial to provide a plurality of images having different spatial resolutions. For example, when at the lowest zoom level (e.g., when the largest amount of the overall geographic area is displayed), most or even substantially all of the geographic area may be viewable by a user. In the example of a global mosaic, because the magnification of the image is low when zoomed out, the corresponding spatial resolution may also be relatively low as fine features appearing in the image may not be capable of being displayed due to limitations in the output form. Furthermore, such fine features may not be perceivable by a user even if such output capability existed. For instance, neither a display nor a printed output may be capable of displaying the details of a large scale high resolution image viewed at very low zoom levels. As such, it may be that different image layers are generated having different spatial resolutions for presentation to a user depending upon the zoom level selected. In this regard, an image layer having an appropriate spatial resolution may be selected for display to a user that corresponds to the zoom level selected. In this regard, when a low zoom level is selected such that a relatively large portion of the geographic area is visible, a relatively low spatial resolution image layer may be retrieved for display because the fine details associated with a higher resolution image layer may be lost or unperceivable when output to the user. In this regard, the size of the image in memory may also be smaller such that the image is more easily transmitted to and/or manipulated by the device executing the user interface. However, when a user zooms in on an image, at least a portion of a higher spatial resolution image layer may be retrieved for display to a user as the details of the higher spatial resolution may be output and perceived by the user given the increased magnification of the geographic area displayed when zoomed in.

Furthermore, when dynamically zooming in or out, a different spatial resolution image layer may be loaded, even if temporarily, during the dynamic zoom process to populate a newly appearing portion of the image. For instance, when zooming out from a high zoom level to a low zoom level, additional portions of the image may come into view. These new portions may be initially populated with a low spatial resolution image that may be retrieved and/or received at the user device. As the image data continues to load, the low resolution image may be replaced with higher resolution images as they are retrieved and/or received at the device executing the user interface. Furthermore, when panning, lower spatial resolution portions of the image may be initially displayed and subsequently replaced with higher spatial resolution images to facilitate rapid loading of images when panning.

In any regard, it may be that when a user manipulates an image by zooming or panning, different spatial resolution images may be displayed. Accordingly, in view of the foregoing, it may be appreciated that images having different spatial resolutions may have radiometric discontinuities that may be perceived by a user. For instance, when dynamically zooming in or out on an orthomosaic image, a portion of the image, when replaced by a different spatial resolution layer of the geographic area, may have a radiometric discontinuity between the image portions having different spatial resolutions. This may result in an abrupt change in color or other radiometric characteristic when zooming relative to the image. Discontinuous radiometric characteristics may be present in either vector graphics based image presentation or raster graphics based image presentation, both of which are familiar to those of skill in the art.

In this regard, it may be beneficial to perform radiometric normalization between orthomosaic image layers having different spatial resolutions (e.g., as are often used to facilitate a plurality of zoom levels of a geographic area covered by very large orthomosaic images in a manner generally described above). By performing such radiometric normalization between image layers, zooming or panning relative to the image may be provided with more consistent radiometric properties with reduced radiometric inconsistencies that tend to provide a more visually appealing user experience. In certain embodiments, the plurality of orthomosaic image layers may be generated using one or more mosaic generation approaches discussed above.

Figure 36:
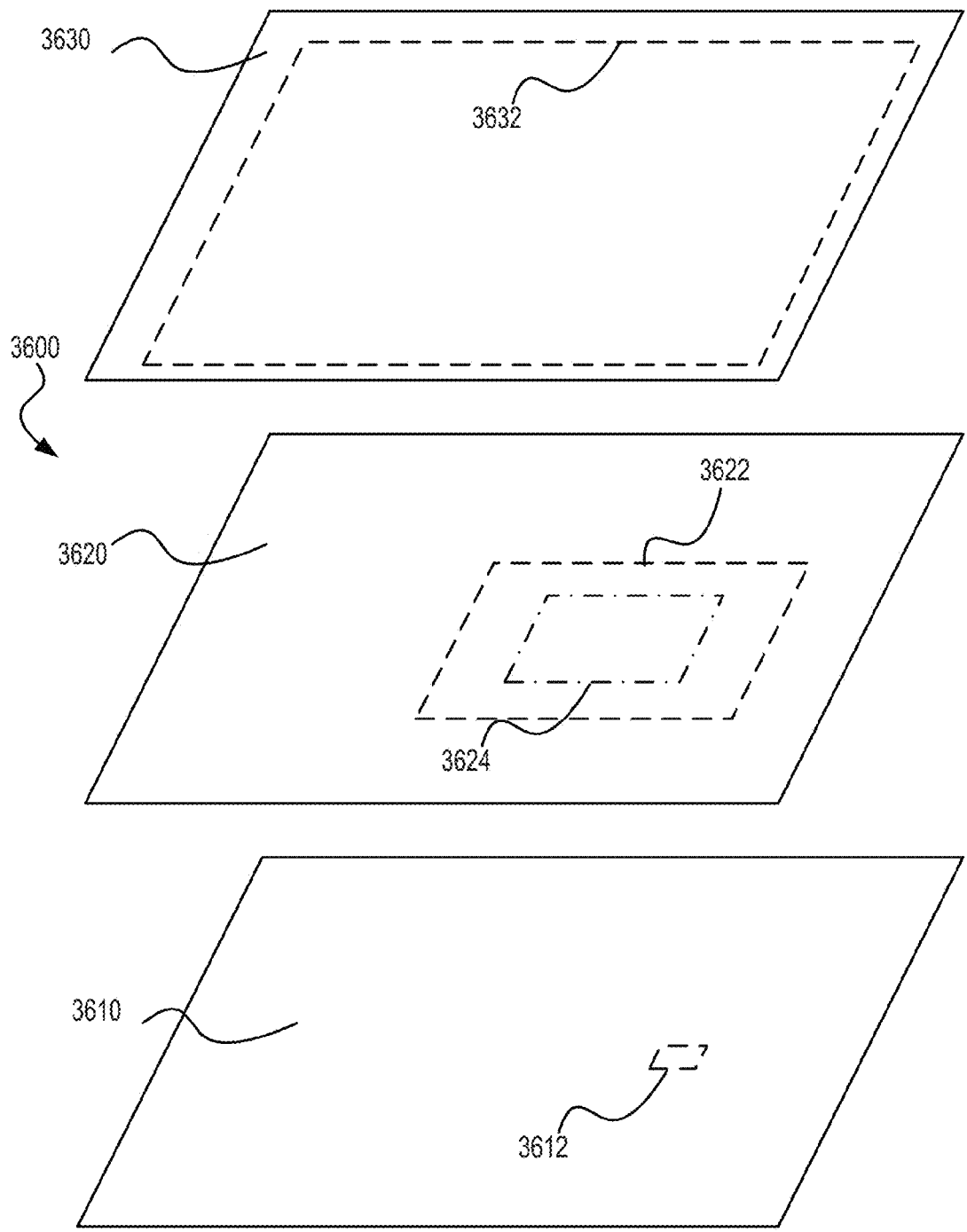
FIG. 36 illustrates an embodiment of a plurality of orthomosaic image layers that may be used to facilitate efficient zooming capability with respect to a geographic area that is imaged.

With further reference to FIG. 36, a plurality of orthomosaic image layers 3600 are shown. While three image layers 3610, 3620, and 3630 will be discussed in relation to FIG. 36, it may be appreciated that a plurality of image layers may generally be provided without limitation to the number of layers. As such, more or fewer than three layers may be provided in accord with the general description presented below. In any regard, image layer 3610 may correspond to the image layer that has the highest spatial resolution. Image layer 3620 may have a lower spatial resolution than image layer 3610. Image layer 3630 may have still lower spatial resolution then layer 3620 or layer 3610. In this regard, the plurality of image layers 3600 may all generally correspond to the same geographic area, yet have different spatial resolutions. In an embodiment, the image layers 3600 may each include one or more geospatial source images. Accordingly, at least portions of the image layers 3600 may be geographically concurrent such that the layers 3600 may extend to the same geographical area. However, the image layers need not be strictly concurrent. That is, one image layer (e.g., one of the lower spatial resolution layers such as layer 3620 or layer 3630) may extend to a larger geographic area than another higher spatial resolution layer (e.g., layer 3610). In this example, a high spatial resolution image layer (e.g., layer 3610) may provide coverage for only limited areas of the geographic extent covered by a lower spatial resolution image layer (i.e., layer 3620 or layer 3630). In this regard, areas of particular interest (e.g., cities, particular geographic formations, etc.) may be imaged at a higher resolution such that higher resolution images are available to prepare a high resolution image layer for the areas of particular interest. However, other areas (e.g., desolate geography, ocean expanses, etc.) may be imaged only at lower spatial resolutions such that portions of the high resolution image layer may not extend to such areas. In any regard, in portions of the layer corresponding to areas of concurrent geographic coverage different spatial resolutions, radiometric normalization may be provided. As such, the radiometric normalization need not be performed over the entire coverage of an image layer, but rather may be provided in portions corresponding areas of concurrent geographic coverage between layers.

When the geographic area covered by the plurality of image layers 3600 is displayed to a user, a portion of one of the image layers 3600 may be selected for presentation to a user. For instance, as shown in FIG. 36, a display area 3612 of image layer 3610 may be selected for output to a user. As may be appreciated, the display area 3612 may correspond to a relatively small area of the geographic area imaged by the orthomosaic layer 3610. Accordingly, the display area 3612 may correspond to a high zoom level selected by a user. Accordingly, the geographic area corresponding to the display area 3612 may be presented at relatively high magnification such that fine details of the image layer 3610 in the display area 3612 may be presented. That is, the display area 3612 may be output to a user to display a highly zoomed in portion of the image. In this regard, it will be appreciated that the image layer 3610 may be of high spatial resolution in that the user may be viewing only a small portion of the image layer 3610 such that the details captured by the high resolution image may be renderable in the output to the user. In some embodiments, the user may be capable of panning relative to image layer 3610 such that a different portion of the image layer 3610 is selected as the display area 3612.

Furthermore, the user may select to zoom out relative to the geographic area covered by the plurality of image layers 3600. Display area 3622 may correspond to a lower zoom level selected by the user such that more of the geographic area represented by the image layers 3600 is visible to the user. It may be appreciated that the larger display area 3622 could be populated with images from the first image layer 3610. However, using such a high resolution image, which may be larger per unit area in memory than image layer 3620, may be inefficient as the retrieval, receipt, or manipulation of the larger image may consume more computational resources. Furthermore, limitations in the output method such as limits on display or print resolutions may limit the detail that may be displayed from image layer 3610. Accordingly, for display area 3622, a portion of image layer 3620 having a lower spatial resolution may be retrieved to be presented to the user. In this regard, the zoom level corresponding to display area 3622 may be adjacent to the zoom level corresponding to display area 3612 in a plurality of zoom levels such that when selecting the zoom level associated with display area 3622, new imagery from the image layer 3620 is preferably loaded for output to the user. Because the zoom levels may be adjacent replacement of imagery from the first image layer 3610 with images from the second image layer 3620 may occur and any discontinuations in radiometric properties may be perceivable by a user. Further still, should a user select to zoom out even further, a display area 3632 may be selected by a user that corresponds to yet another zoom level that is lower that corresponding to the display area 3622. In this regard, it may be beneficial for the same reasons previously discussed to select a portion of image layer 3630 for display in the display area 3632.

Furthermore, it may be appreciated that multiple zoom levels may be supported with a single image layer. With reference to image layer 3620, for instance, both display area 3622 and display area 3624 that correspond to different zoom levels as each display area extends to different geographic extends of the orthomosaic image layer may both include images from image layer 3620. As may be appreciated, in either a vector graphics based approach or a raster graphics based approach, images from the second image layer 3620 may be scaled to support the different zoom levels represented by display area 3622 and 3624. However, it may be further appreciated that a practical limit to the ability to support multiple zoom levels with a single image layer may be limited such that different zoom levels may be rendered using the different image layers 3600 as described above.

Accordingly, when a user selects different zoom levels corresponding to the different display areas 3612, 3622/3624, and 3632, the different display areas may be populated with images from different orthomosaic image layers 3600 to efficiently provide image coverage with respect to the geographic area desired to be viewed by the user with an appropriate spatial resolution. In turn, radiometric differences between the image layers 3600 may lead to radiometric discontinuities when dynamically zooming or panning by a user.

Accordingly, the plurality of image layers 3600 may be created and/or manipulated to reduce the radiometric discontinuities between the layers. For instance, in an embodiment, image layer 3610 may be created for a given geographic extent using one or more of the approaches detailed above including, for example, automatic source selection, automatic cutline generation, and/or radiometric normalization. In turn, image layers 3620 and 3630 may be generated. In an embodiment, creation of image layer 3620 may include performing a downsampling operation with respect to image layer 3610 once image layer 3610 has been generated. For example, image layer 3610 may be generated using automatic source selection, automatic cutline generation, and radiometric normalization. The finished image layer 3610 may then be downsampled to produce a lower spatial resolution image layer 3620 or 3630 based on the first image layer 3610.

In another embodiment, a lower spatial resolution image layer 3620 or 3630 may be independently generated using one or more of automatic source selection, automatic cutline generation, and radiometric normalization. For example, a plurality of geographic source images of lower spatial resolution may be accessed and utilized to generate image layer 3620 or 3630. The source images used to generate the lower resolution image layers (e.g., layer 3620 or layer 3630) may use the same source images provided to generate image layer 3610. These source images may be downsampled to generate low resolution versions of the source images which are in turn subjected to automatic source selection, automatic cutline generation, and/or radiometric normalization to generate image layer 3620 or image layer 3630. Additionally or alternatively, the lower resolution source images may be separately acquired lower spatial resolution source images available for selection. In an embodiment, the base layer used in the automatic source selection and/or radiometric normalization for a given layer, as described in detail above, may correspond to a different one of the image layers 3600 or a downsampled version of the layers 3600. Either or both of the foregoing approaches to generation of image layers with different spatial resolution may be repeated to further generate additional image layers (e.g., image layer 3630).

Accordingly, a plurality of image layers having different spatial resolutions may be generated based on, for example, (a) downsampling an orthomosaic image that has been generated, (b) downsampling source images and generating the layer based on the downsampled source images, (c) acquiring separate images at a different spatial resolution, or (d) some other technique. In this regard, the number of image layers created may be predetermined for a given geographical area covered by the orthomosaic image layers. For instance, the geographic area may correspond to a relatively large area such as a country, region, or even a global mosaic. A predetermined number of zoom layers may be determined, and a corresponding number of image layers may be generated. As such, the resolution of the image layer may be at least partially based on the zoom level to which the layer corresponds.

Furthermore, the forgoing discussion may be utilized to create a plurality of image layer sets that correspond to different conditions. For example, orthomosaic image layer sets for different seasons may be generated (e.g., to create a summer image layer set, a fall image layer set, a winter image layer set, and a spring image layer set). Furthermore, specific conditions for a given geographic area may be used to generate an image layer set. For instance, images of the Rocky Mountains covered in snow may be used to create a specific image layer set specific to that condition.

In any regard, the image layers of an image set may undergo radiometric normalization without reference to the source and/or method of generation of the layers. In this regard, regardless of how the layers of an image layer set are generated, any two or more of the image layers may be subjected to radiometric normalization with respect to the layers to reduce radiometric discontinuities between the layers.

The radiometric normalization of two orthomosaic image layers may include generation of first image metadata for at least a portion of a first of the orthomosaic image layers and generation of second image metadata for at least a portion of a second of the orthomosaic image layers. The portions of the image layers for which image metadata is generated may be geographically concurrent. That is, when performing normalization between the layers, portions of the layers may be analyzed that are geographically concurrent. In this regard, the radiometric normalization may provide more consistent radiometric properties for a given portion of the geographic area that is imaged when represented with either of the image layers that are subjected to the normalization.

The image metadata may be independent of the spatial resolution of the images such as in the case of a cumulative distribution function (CDF) as described above. In this regard, as described above, a CDF for at least a portion of the first image layer and a CDF for at least a portion of the second image layer may be generated in the manner as described above. In turn, the CDFs for the portion of the first image layer and the portion of the second image layer may be compared, and the comparison may be used to generate a normalization function. For example, a normalization function such as Equation 26 described above may be generated. In turn, the normalization function may be applied to the portion of the second image layer to normalize at least a portion of the second image layer with respect to the portion of the first image layer in a manner as described above. In this regard, any or all of the foregoing discussion regarding radiometric normalization of a target and base image may be applied herein, wherein in the target image may be at least a portion of an orthomosaic image layer and the base image may be at least a portion of another orthomosaic image layer. As may be appreciated, the portion of the image layers used in the normalization may, but need not, extend to the entire extent of the two image layers. The target image, which is to be normalized, may correspond to a lower spatial resolution orthomosaic image layer and the base image may correspond to a higher spatial resolution orthomosaic image layer. Further still, the first image may be downsampled prior to calculating the metadata to reduce the computational demand required to do so. As one specific example, the radiometric normalization could be based purely on histogram data, created by season of the year. Further, radiometric normalization may include matching colors (RGB) as well as other wavelength bands.

While the preceding discussion has specifically referenced orthomosaics, the teachings and concepts disclosed herein apply equally to other types of images and mosaics of images.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A method for radiometric normalization of a plurality of mosaic image layers having different spatial resolutions, comprising:

first calculating first image metadata for at least a first image portion of a base image layer of a portion of the Earth, the base having a first spatial resolution, wherein the first image metadata is independent of the first spatial resolution, wherein the first image metadata relates to the color of the base image layer;

second, subsequently capturing a second image that includes at least some of the portion of the Earth, and calculating second image metadata for at least a second image portion of the second image, the second image having a second spatial resolution is greater than the first spatial resolution, wherein the second image metadata is independent of the second spatial resolution, wherein the second image metadata relates to the color of the second image;

determining a normalization function based on a comparison of the first image metadata for the first image layer and the second image metadata for the second image layer;

applying the normalization function to the second image layer to normalize at least a portion of the second image layer relative to the first image layer;

downsampling the second image to create a third image having a resolution less than the second resolution and greater than the first resolution, and to create a fourth image having a resolution less than the third resolution and greater than the first resolution; and allowing a user to zoom between the second, third, and fourth images.

2. The method of claim 1, wherein the second image comprises at least one geospatial image having a geographical extent and the third image comprises at least one geospatial image that is geographically concurrent with the geographical extent of the second image.

3. The method of claim 1, further comprising:
displaying at least a portion of the second image to a user when a first zoom level is selected by the user and displaying at least a portion of the third image to the user when a second zoom level is selected by the user.

4. The method of claim 3, wherein the zoom levels are adjacent in a corresponding predetermined plurality of zoom levels.

5. The method of claim 1, wherein the first image metadata comprises histogram data corresponding to the first image portion and the second image metadata comprises histogram data corresponding to the second image portion.

6. The method of claim 5, wherein the first calculating comprises calculation of a first cumulative distribution function (CDF) for the first image portion and the second calculating comprises calculation of a second CDF for the second image portion.

7. The method according to claim 6, wherein the determining comprises comparing the first CDF for the first image portion to the second CDF for the second image portion to determine the normalization function.

\* \* \* \* \*